US009429288B2

(12) United States Patent
Ueki et al.

(10) Patent No.: US 9,429,288 B2
(45) Date of Patent: Aug. 30, 2016

(54) LIGHTING FILM, WEB ROLL FOR LIGHTING FILM, WINDOW PANE, ROLL SCREEN, AND LIGHTING LOUVER

(71) Applicant: Sharp Kabushiki Kaisha, Osaka-shi, Osaka (JP)

(72) Inventors: Shun Ueki, Osaka (JP); Tomoko Nangou, Osaka (JP); Tsuyoshi Kamada, Osaka (JP); Kazuyoshi Sakuragi, Osaka (JP); Masahiro Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/432,822

(22) PCT Filed: Sep. 30, 2013

(86) PCT No.: PCT/JP2013/076522
§ 371 (c)(1),
(2) Date: Apr. 1, 2015

(87) PCT Pub. No.: WO2014/054574
PCT Pub. Date: Apr. 10, 2014

(65) Prior Publication Data
US 2015/0226394 A1    Aug. 13, 2015

(30) Foreign Application Priority Data

Oct. 2, 2012   (JP) .................................. 2012-220283
Jun. 3, 2013   (JP) .................................. 2013-116788

(51) Int. Cl.
*F21S 11/00* (2006.01)
*E06B 9/24* (2006.01)
(Continued)

(52) U.S. Cl.
CPC ................ *F21S 11/007* (2013.01); *E06B 9/24* (2013.01); *E06B 9/386* (2013.01); *E06B 9/42* (2013.01);
(Continued)

(58) Field of Classification Search
CPC .. G02B 5/00; G02B 19/0042; G02B 17/006; F21S 11/00; F21S 11/0027; E06B 9/24
USPC .......................................................... 359/595
See application file for complete search history.

(56) References Cited

U.S. PATENT DOCUMENTS 8,824,050 B2 *   9/2014   Vasylyev ...................... 359/595
2009/0009870 A1   1/2009   Usami
(Continued)

FOREIGN PATENT DOCUMENTS

JP          2001-82057 A     3/2001
JP          2008-40021 A     2/2008
(Continued)

OTHER PUBLICATIONS

Official Communication issued in International Patent Application No. PCT/JP2013/076522, mailed on Oct. 29, 2013.

*Primary Examiner* — Christ Mahoney
(74) *Attorney, Agent, or Firm* — Keating & Bennett, LLP

(57) ABSTRACT

A lighting film 1 includes a base member 10 which has light-transmitting properties, a plurality of protrusion portions 11 which have light-transmitting properties and are formed on one surface of the base member 10 so as to be adjacent to each other, and a gap portion 12 which is formed between the protrusion portions. In the protrusion portion 11, a first end surface 11*a* on the base member 10 side or a second end surface 11*b* on an opposite side to the base member 10 is configured as a light incidence end surface, and a side surface 11*c* which comes into contact with the gap portion 12 is configured as a reflective surface of totally reflecting light which is incident from the light incidence end surface. The base member 10 or a member that is formed on one surface of the base member 10 and has light-transmitting properties is exposed in the gap portion 12.

11 Claims, 53 Drawing Sheets

(51) Int. Cl.
    *E06B 9/42*     (2006.01)
    *G02B 17/00*    (2006.01)
    *E06B 9/386*    (2006.01)
    *F21V 8/00*     (2006.01)
    *G02B 19/00*    (2006.01)
    *F21V 5/00*     (2015.01)
    *F21V 7/00*     (2006.01)
    *G02B 5/02*     (2006.01)
    *E06B 3/67*     (2006.01)

(52) U.S. Cl.
    CPC ............... *F21V 5/00* (2013.01); *F21V 7/0091* (2013.01); *G02B 5/0242* (2013.01); *G02B 5/0278* (2013.01); *G02B 6/0001* (2013.01); *G02B 17/006* (2013.01); *G02B 19/0028* (2013.01); *G02B 19/0042* (2013.01); *E06B 3/6715* (2013.01); *E06B 2009/2417* (2013.01); *G02B 2207/123* (2013.01)

(56) References Cited

U.S. PATENT DOCUMENTS

2011/0310473  A1     12/2011  Yoshida et al.
2013/0038928  A1*    2/2013   Padiyath et al. .............. 359/359

FOREIGN PATENT DOCUMENTS

| JP | 2011-123478 A | 6/2011 | |
| JP | 2012-3025 A | 1/2012 | |
| WO | 2011/084303 A2 | 7/2011 | |
| WO | WO 2011/084303 A2 * | 7/2011 | ............... G02B 5/04 |

\* cited by examiner

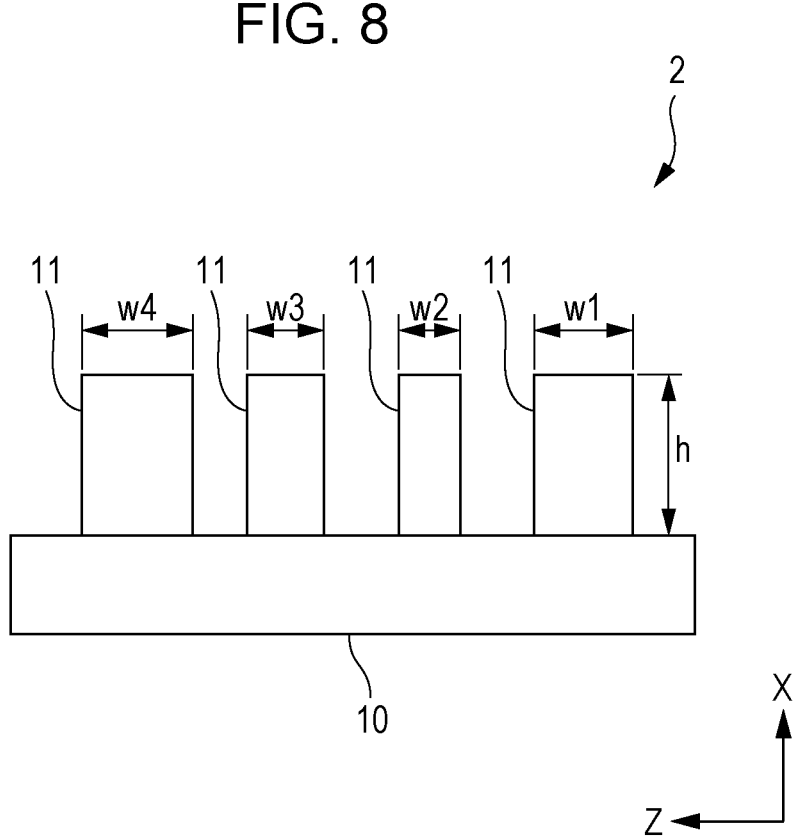

FIG. 31

| No. | L | S | β1 | β2 | H | A | n | θin | θn, air | θn, resin |
|---|---|---|---|---|---|---|---|---|---|---|
| 1 | 20 | 2 | 75 | 75 | 20 | 9.3 | 1.5 | 30 | 47 | 19 |
| 2 | 20 | 2 | 80 | 80 | 20 | 12.9 | 1.5 | 30 | 49 | 19 |
| 3 | 20 | 2 | 83 | 83 | 20 | 15.1 | 1.5 | 30 | 51 | 19 |
| 4 | 20 | 2 | 75 | 75 | 20 | 9.3 | 1.5 | 45 | 56 | 28 |
| 5 | 20 | 2 | 80 | 80 | 20 | 12.9 | 1.5 | 45 | 58 | 28 |
| 6 | 20 | 2 | 83 | 83 | 20 | 15.1 | 1.5 | 45 | 59 | 28 |
| 7 | 20 | 2 | 75 | 75 | 25 | 6.6 | 1.5 | 30 | 47 | 19 |
| 8 | 20 | 2 | 80 | 80 | 25 | 11.2 | 1.5 | 30 | 49 | 19 |
| 9 | 20 | 2 | 83 | 83 | 25 | 13.9 | 1.5 | 30 | 51 | 19 |
| 10 | 20 | 2 | 75 | 75 | 25 | 6.6 | 1.5 | 45 | 56 | 28 |
| 11 | 20 | 2 | 80 | 80 | 25 | 11.2 | 1.5 | 45 | 58 | 28 |
| 12 | 20 | 2 | 83 | 83 | 25 | 13.9 | 1.5 | 45 | 59 | 28 |
| 13 | 20 | 2 | 75 | 75 | 30 | 3.9 | 1.5 | 30 | 47 | 19 |
| 14 | 20 | 2 | 80 | 80 | 30 | 9.4 | 1.5 | 30 | 49 | 19 |
| 15 | 20 | 2 | 83 | 83 | 30 | 12.6 | 1.5 | 30 | 51 | 19 |
| 16 | 20 | 2 | 75 | 75 | 30 | 3.9 | 1.5 | 45 | 56 | 28 |
| 17 | 20 | 2 | 80 | 80 | 30 | 9.4 | 1.5 | 45 | 58 | 28 |
| 18 | 20 | 2 | 83 | 83 | 30 | 12.6 | 1.5 | 45 | 59 | 28 |
| 19 | 20 | 2 | 75 | 75 | 35 | 1.2 | 1.5 | 30 | 47 | 19 |
| 20 | 20 | 2 | 80 | 80 | 35 | 7.7 | 1.5 | 30 | 49 | 19 |
| 21 | 20 | 2 | 83 | 83 | 35 | 11.4 | 1.5 | 30 | 51 | 19 |
| 22 | 20 | 2 | 75 | 75 | 35 | 1.2 | 1.5 | 45 | 56 | 28 |
| 23 | 20 | 2 | 80 | 80 | 35 | 7.7 | 1.5 | 45 | 58 | 28 |
| 24 | 20 | 2 | 83 | 83 | 35 | 11.4 | 1.5 | 45 | 59 | 28 |

NON-TAPER STRUCTURE

| No. | L | S | β1 | β2 | H | A | n | θin | θn, air | θn, resin |
|---|---|---|---|---|---|---|---|---|---|---|
| 25 | 20 | 2 | 90 | 90 | 20 |  | 1.5 | 30 | 55 | 19 |
| 26 | 20 | 2 | 90 | 90 | 20 |  | 1.5 | 45 | 62 | 28 |

FIG. 32

| No. | θ2 | n × sinθ2 | CONFIGURATION A | CONFIGURATION B | H × tanθn, resin | CONFIGURATION D | θ3 | n × sinθ3 | CONFIGURATION C |
|---|---|---|---|---|---|---|---|---|---|
| 1 | 58 | 1.27 | ○ | × | 7.1 | × | 86 | 1.50 | ○ |
| 2 | 51 | 1.16 | ○ | × | 7.1 | × | 81 | 1.48 | ○ |
| 3 | 46 | 1.08 | ○ | × | 7.1 | × | 78 | 1.46 | ○ |
| 4 | 49 | 1.14 | ○ | × | 10.7 | ○ | 77 | 1.46 | ○ |
| 5 | 42 | 1.01 | ○ | × | 10.7 | ○ | 72 | 1.43 | ○ |
| 6 | 38 | 0.93 | × | × | 10.7 | ○ | 69 | 1.40 | ○ |
| 7 | 58 | 1.27 | ○ | × | 8.8 | × | 86 | 1.50 | ○ |
| 8 | 51 | 1.16 | ○ | × | 8.8 | × | 81 | 1.48 | ○ |
| 9 | 46 | 1.08 | ○ | ○ | 8.8 | × | 78 | 1.46 | ○ |
| 10 | 49 | 1.14 | ○ | ○ | 13.4 | ○ | 77 | 1.46 | ○ |
| 11 | 42 | 1.01 | ○ | ○ | 13.4 | ○ | 72 | 1.43 | ○ |
| 12 | 38 | 0.93 | × | ○ | 13.4 | ○ | 69 | 1.40 | ○ |
| 13 | 58 | 1.27 | ○ | × | 10.6 | ○ | 86 | 1.50 | ○ |
| 14 | 51 | 1.16 | ○ | ○ | 10.6 | ○ | 81 | 1.48 | ○ |
| 15 | 46 | 1.08 | ○ | ○ | 10.6 | ○ | 78 | 1.46 | ○ |
| 16 | 49 | 1.14 | ○ | ○ | 16.0 | ○ | 77 | 1.46 | ○ |
| 17 | 42 | 1.01 | ○ | ○ | 16.0 | ○ | 72 | 1.43 | ○ |
| 18 | 38 | 0.93 | × | ○ | 16.0 | ○ | 69 | 1.40 | ○ |
| 19 | 58 | 1.27 | ○ | × | 12.4 | ○ | 86 | 1.50 | ○ |
| 20 | 51 | 1.16 | ○ | ○ | 12.4 | ○ | 81 | 1.48 | ○ |
| 21 | 46 | 1.08 | ○ | ○ | 12.4 | ○ | 78 | 1.46 | ○ |
| 22 | 49 | 1.14 | ○ | ○ | 18.7 | ○ | 77 | 1.46 | ○ |
| 23 | 42 | 1.01 | ○ | ○ | 18.7 | ○ | 72 | 1.43 | ○ |
| 24 | 38 | 0.93 | × | ○ | 18.7 | ○ | 69 | 1.40 | ○ |

NON-TAPER STRUCTURE

| 25 | 35 | 0.87 | × | ○ | 7.1 | × | 71 | 1.41 | ○ |
|---|---|---|---|---|---|---|---|---|---|
| 26 | 28 | 0.71 | × | ○ | 10.7 | ○ | 62 | 1.32 | ○ |

FIG. 42
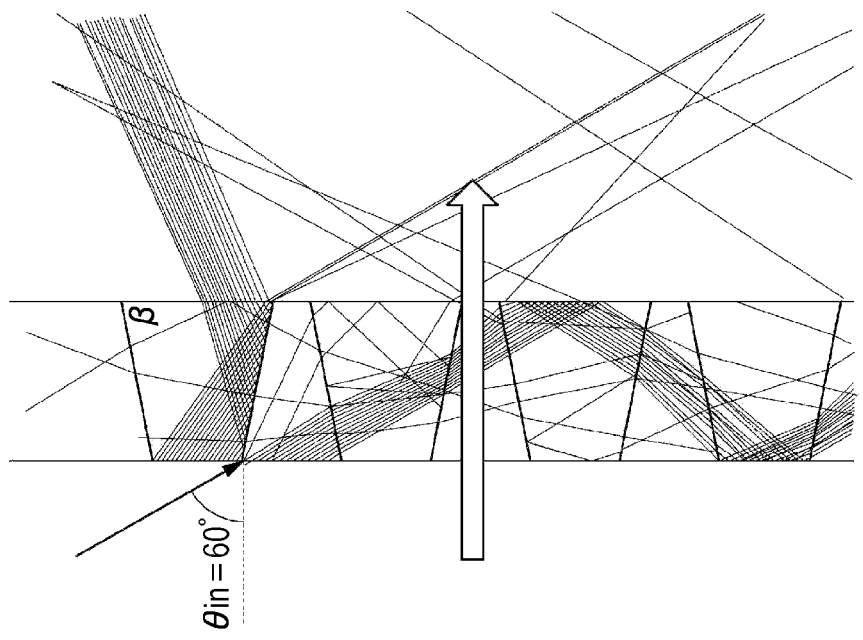
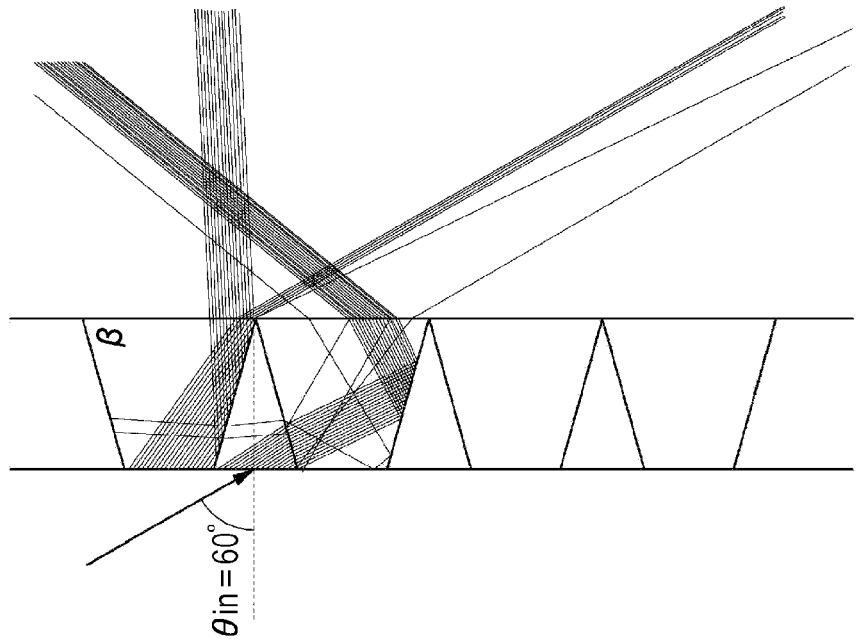

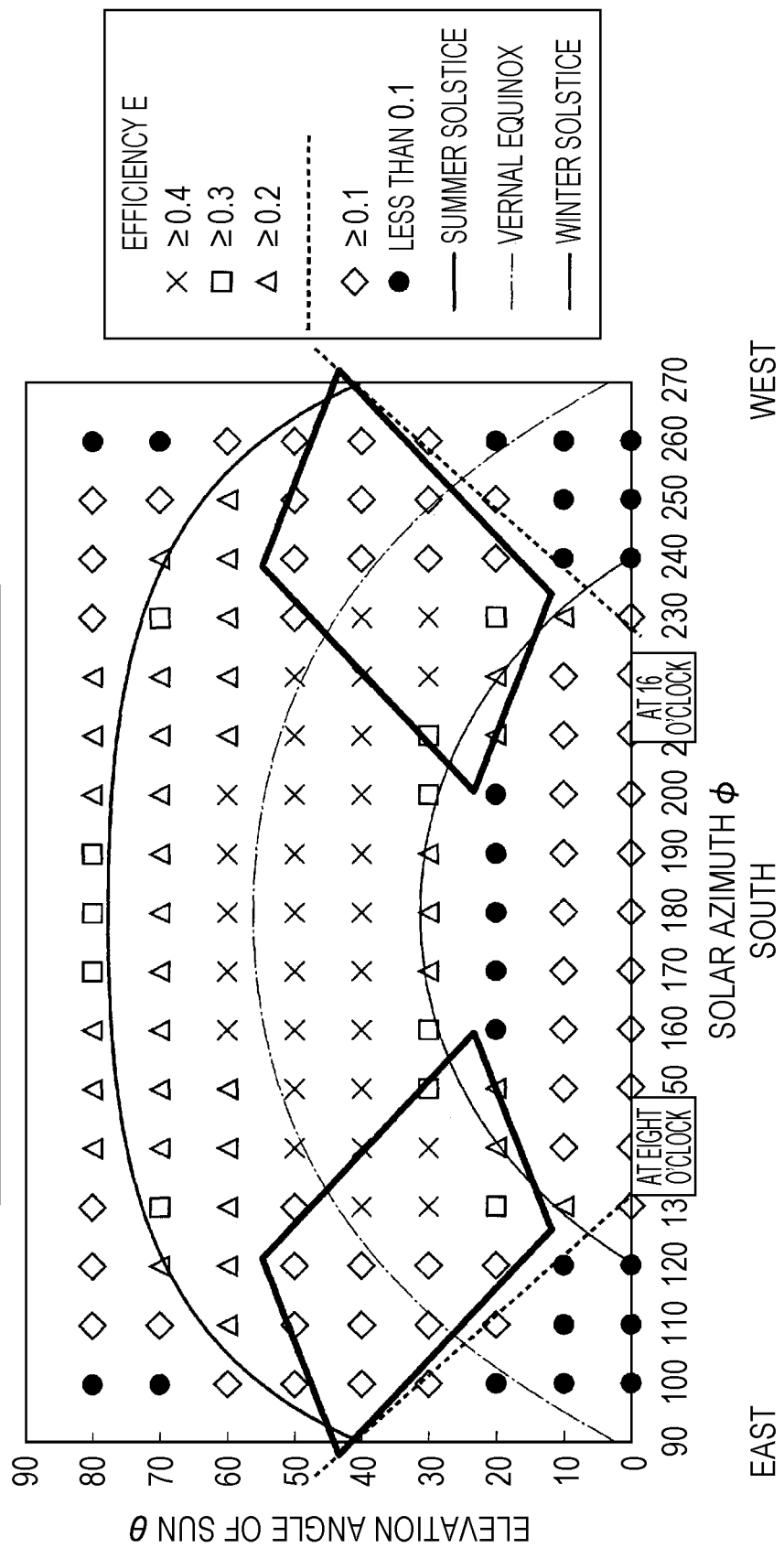

LIGHTING FILM, WEB ROLL FOR LIGHTING FILM, WINDOW PANE, ROLL SCREEN, AND LIGHTING LOUVER

TECHNICAL FIELD

The present invention relates to a lighting film, a web roll for the lighting film, a window pane, a roll screen, and a lighting louver.

This application is based upon and claims the benefit of priorities from Japanese Patent Application No. 2012-220283, filed Oct. 2, 2012 and Japanese Patent Application No. 2013-116788, filed Jun. 3, 2013; the entire contents of which are incorporated herein by reference.

BACKGROUND ART

As a technology for guiding light which is incident on a window pane to the inside of a house with high efficiency, a technology disclosed in PTL 1 has been known. In the technology disclosed in PTL 1, a lighting sheet obtained by forming a plurality of prism units on one surface of a transparent support base adheres to an external surface (surface on the outside of a house) of a window pane so as to cause the prism unit side to be directed toward the outside of a house. Light which is incident from the prism unit side is refracted by a surface of the prism unit, passes through the prism unit, the support base, and the window pane, and then the light is incident to the inside of the house.

CITATION LIST

Patent Literature

PTL 1: Japanese Unexamined Patent Application Publication No. 2008-40021

SUMMARY OF INVENTION

Technical Problem

However, in this method, since light is introduced into a lighting sheet by refraction, it is impossible to significantly bend light so as for the light to reach the ceiling or the innermost part of a house. For this reason, when light passes through a window pane from a high altitude position and then is incident to the inside of the house, such as during the day or in summer, the light is illuminated only in the vicinity of the window pane and thus a sufficient effect is not obtained.

An object of the present invention is to provide a lighting film, a web roll for the lighting film, a window pane, a roll screen, and a lighting louver which enable light which is incident on the window pane to be guided to the ceiling or the innermost part of a house with high efficiency.

Solution to Problem

A lighting film according to a first aspect of the present invention includes a base member which has light-transmitting properties, a plurality of protrusion portions which have light-transmitting properties and are formed on one surface of the base member so as to be adjacent to each other, and a gap portion which is formed between the protrusion portions. In the protrusion portion, a first end surface on the base member side or a second end surface on an opposite side to the base member is configured as a light incidence end surface, and a side surface which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of protrusion portions substantially has one direction as a longitudinal direction and the one direction may be disposed in a direction parallel with one side of the base member which has a rectangular shape.

Each of the plurality of protrusion portions may be formed as a protrusion portion which is extended in the one direction and has a strip shape with a predetermined width.

When the width of the protrusion portion in a transverse direction is set to be w, the height of the base member of the protrusion portion in a normal direction is set to be h, a ratio h/w of w and h is set as an aspect ratio of the protrusion portion, and light (wavelength 560 nm) which travels in a direction parallel with an arrangement direction of the plurality of protrusion portions is incident to a surface of the base member on an opposite side to a side on which the plurality of protrusion portions are formed, at an incident angle of 60 degrees, and if the minimum of aspect ratios of the protrusion portion, which allows the light to be reflected by the side surface of the protrusion portion once is set as the minimum aspect ratio, an aspect ratio of each of the plurality of protrusion portions may be equal to or more than the minimum aspect ratio.

If the maximum of aspect ratios of the protrusion portion, which allows the light to be reflected by the side surface of the protrusion portion only once is set as the maximum aspect ratio, an aspect ratio of each of the plurality of protrusion portions may be less than the maximum aspect ratio.

When the width of the protrusion portion in the transverse direction is set to be w, the height of the base member of the protrusion portion in the normal direction is set to be h, a ratio of h and w is set as an aspect ratio, the plurality of protrusion portions may include a plurality of protrusion portions having different aspect ratios from each other.

The plurality of protrusion portions may be disposed to be adjacent to each other with irregular intervals therebetween.

A shape of a cross-section parallel with a width direction of the protrusion portion in each of the plurality of protrusion portions may be rectangular.

A lighting film according to a second aspect of the present invention includes a base member which has light-transmitting properties, a protrusion portion which is formed on one surface of the base member and has light-transmitting properties, a plurality of opening portions which are formed on the protrusion portion and are adjacent to each other, and a gap portion which is formed on the opening portion. In the protrusion portion, a first end surface on the base member side or a second end surface on an opposite side to the base member is configured as a light incidence end surface, and a side surface of the opening portion which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of opening portions substantially has one direction as a longitudinal direction and the one direction may be disposed in a direction parallel with one side of the base member which has a rectangular shape.

A member which blocks ultraviolet light and transmits visible light may be formed as the member having the light-transmitting properties in an area on one surface of the base member except on a formation area of the protrusion portion.

A protective member having light-transmitting properties may be provided on an opposite side to the base member with the protrusion portion interposed between the base member and the protective member.

A light scattering film may be provided on an opposite side to a side of the base member on which the protrusion portion is formed.

A heat-insulating film having light-transmitting properties may be provided on an opposite side to a side of the base member on which the protrusion portion is formed.

A web roll according to a first aspect of the present invention is a web roll for a lighting film which is obtained by winding a long lighting film, and the lighting film includes a base member which has light-transmitting properties, a plurality of protrusion portions which have light-transmitting properties and are formed on one surface of the base member so as to be adjacent to each other, and a gap portion which is formed between the protrusion portions. In the protrusion portion, a first end surface on the base member side or a second end surface on an opposite side to the base member is configured as a light incidence end surface, and a side surface which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of protrusion portions substantially has one direction as a longitudinal direction and the one direction may be disposed in a direction parallel with or orthogonal to a longitudinal direction of the lighting film.

A web roll according to a second aspect of the present invention is a web roll for a lighting film which is obtained by winding a long lighting film and the lighting film includes a base member which has light-transmitting properties, a protrusion portion which is formed on one surface of the base member and has light-transmitting properties, a plurality of opening portions which are formed on the protrusion portion and are adjacent to each other, and a gap portion which is formed on the opening portion. In the protrusion portion, a first end surface on the base member side or a second end surface on an opposite side to the base member is configured as a light incidence end surface, and a side surface of the opening portion which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of opening portions substantially has one direction as a longitudinal direction and the one direction may be disposed in a direction parallel with or orthogonal to a longitudinal direction of the lighting film.

A window pane according to a first aspect of the present invention includes a glass substrate and a lighting film adhering to one surface of the glass substrate. The lighting film includes a base member which has light-transmitting properties, a plurality of protrusion portions which have light-transmitting properties and are formed on one surface of the base member so as to be adjacent to each other, and a gap portion which is formed between the protrusion portions. In the protrusion portion, a first end surface on the base member side or a second end surface on an opposite side to the base member is configured as a light incidence end surface, and a side surface which comes into contact with the gap portion is configured as a reflective surface for totally reflecting light which is incident from the light incidence end surface. The base member or a member that is formed on one surface of the base member and has light-transmitting properties is exposed in the gap portion. The lighting film adheres to the one surface of the glass substrate so as to cause an opposite side to a side of the base member on which the plurality of protrusion portions are formed, or the side of the base member on which the plurality of protrusion portions are formed, to be directed outwardly.

Each of the plurality of protrusion portions substantially has one direction as a longitudinal direction and the one direction may be disposed in a direction parallel with one side of the glass substrate which has a rectangular shape.

A protective member having light-transmitting properties may be provided on an opposite side to the glass substrate with the protrusion portion interposed between the glass substrate and the protective member.

A window pane according to a second aspect of the present invention includes a glass substrate and a lighting film adhering to one surface of the glass substrate. The lighting film includes a base member which has light-transmitting properties, a protrusion portion which is formed on one surface of the base member and has light-transmitting properties, a plurality of opening portions which are formed on the protrusion portion and are adjacent to each other, and a gap portion which is formed on the opening portion. In the protrusion portion, a first end surface on the base member side or a second end surface on an opposite side to the base member is configured as a light incidence end surface, and a side surface of the opening portion which comes into contact with the gap portion is configured as a reflective surface for totally reflecting light which is incident from the light incidence end surface. The base member or a member that is formed on one surface of the base member and has light-transmitting properties is exposed in the gap portion. The lighting film adheres to the one surface of the glass substrate so as to cause an opposite side to a side of the base member on which the plurality of protrusion portions are formed, or the side of the base member on which the plurality of protrusion portions are formed, to be directed outwardly.

Each of the plurality of opening portions substantially has one direction as a longitudinal direction and the one direction may be disposed in a direction parallel with one side of the glass substrate which has a rectangular shape.

A protective member having light-transmitting properties may be provided on an opposite side to the glass substrate with the protrusion portion interposed between the glass substrate and the protective member.

A window pane according to a third aspect of the present invention includes a glass substrate, a plurality of protrusion portions which has light-transmitting properties and is formed on one surface of the glass substrate so as to be adjacent to each other, and a gap portion which is formed between the protrusion portions. In the protrusion portion, a first end surface on the glass substrate side or a second end surface on an opposite side to the glass substrate is configured as a light incidence end surface, and a side surface which comes into contact with the gap portion is configured as a reflective surface for totally reflecting light which is incident from the light incidence end surface. The glass substrate or a member that is formed on one surface of the glass substrate and has light-transmitting properties, is exposed in the gap portion.

Each of the plurality of protrusion portions substantially has one direction as a longitudinal direction and the one direction may be disposed in a direction parallel with one side of the glass substrate which has a rectangular shape.

A protective member having light-transmitting properties may be provided on an opposite side to the glass substrate with the protrusion portion interposed between the glass substrate and the protective member.

A window pane according to a fourth aspect of the present invention includes a glass substrate, a protrusion portion which has light-transmitting properties and is formed on one surface of the glass substrate, a plurality of opening portions which are formed on the protrusion portion so as to be adjacent to each other, and a gap portion which is formed on the opening portion. In the protrusion portion, a first end surface on the glass substrate side or a second end surface on an opposite side to the glass substrate is configured as a light incidence end surface, and a side surface of the opening portion which comes into contact with the gap portion is configured as a reflective surface for totally reflecting light which is incident from the light incidence end surface. The glass substrate or a member that is formed on one surface of the glass substrate and has light-transmitting properties is exposed in the gap portion.

Each of the plurality of opening portions substantially has one direction as a longitudinal direction and the one direction may be disposed in a direction parallel with one side of the glass substrate which has a rectangular shape.

A protective member having light-transmitting properties may be provided on an opposite side to the glass substrate with the protrusion portion interposed between the glass substrate and the protective member.

A roll screen according to a first aspect of the present invention includes a lighting film, a winding mechanism which winds the lighting film around a shaft center, and an accommodation portion which accommodates the shaft center and the winding mechanism. The lighting film includes a base member which has light-transmitting properties, a plurality of protrusion portions which have light-transmitting properties and are formed on one surface of the base member so as to be adjacent to each other, and a gap portion which is formed between the protrusion portions. In the protrusion portion, a first end surface on the base member side or a second end surface on an opposite side to the base member is configured as a light incidence end surface, and a side surface which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of protrusion portions substantially has one direction as a longitudinal direction and the one direction may be disposed in a direction parallel with one side of the base member which has a rectangular shape.

A protective film having light-transmitting properties may be provided on an opposite side to the base member with the protrusion portion interposed between the base member and the protective film.

A roll screen according to a second aspect of the present invention includes a lighting film, a winding mechanism which winds the lighting film around a shaft center, and an accommodation portion which accommodates the shaft center and the winding mechanism. The lighting film includes a base member which has light-transmitting properties, a protrusion portion which is formed on one surface of the base member and has light-transmitting properties, a plurality of opening portions which are formed on the protrusion portion and are adjacent to each other, and a gap portion which is formed on the opening portion. In the protrusion portion, a first end surface on the base member side or a second end surface on an opposite side to the base member is configured as a light incidence end surface, and a side surface of the opening portion which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of opening portions substantially has one direction as a longitudinal direction and the one direction may be disposed in a direction parallel with one side of the base member which has a rectangular shape.

A protective film having light-transmitting properties may be provided on an opposite side to the base member with the protrusion portion interposed between the base member and the protective film.

A lighting louver according to a first aspect of the present invention includes a plurality of lighting films which are spaced apart from each other with a predetermined interval and are tiltably supported. The lighting film includes a base member which has light-transmitting properties, a plurality of protrusion portions which have light-transmitting properties and are formed on one surface of the base member so as to be adjacent to each other, and a gap portion which is formed between the protrusion portions. In the protrusion portion, a first end surface on the base member side or a second end surface on an opposite side to the base member is configured as a light incidence end surface, and a side surface which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of protrusion portions substantially has one direction as a longitudinal direction and the one direction may be disposed in a direction parallel with one side of the base member which has a rectangular shape.

A protective film having light-transmitting properties may be provided on an opposite side to the base member with the protrusion portion interposed between the base member and the protective film.

A lighting louver according to a second aspect of the present invention includes a plurality of lighting films which are spaced apart from each other with a predetermined interval and are tiltably supported. The lighting film includes a base member which has light-transmitting properties, a protrusion portion which is formed on one surface of the base member and has light-transmitting properties, a plurality of opening portions which are formed on the protrusion portion and are adjacent to each other, and a gap portion which is formed on the opening portion. In the protrusion portion, a first end surface on the base member side or a second end surface on an opposite side to the base member is configured as a light incidence end surface, and a side surface of the opening portion which comes into contact with the gap portion is configured as a reflective surface for totally reflecting light which is incident from the light incidence end surface. The base member or a member that is formed on one surface of the base member and has light-transmitting properties is exposed in the gap portion.

Each of the plurality of opening portions substantially has one direction as a longitudinal direction and the one direction may be disposed in a direction parallel with one side of the base member which has a rectangular shape.

A protective film having light-transmitting properties may be provided on an opposite side to the base member with the protrusion portion interposed between the base member and the protective film.

The light emitting end surface may have an area larger than an area of the light incidence end surface.

Light which is incident toward the gap portion between the protrusion portions may be incident into the protrusion portion from one side surface of the protrusion portion, travel in the protrusion portion, and be incident to another side surface of the protrusion portion. Preferably, the light which is incident to another side surface of the protrusion portion is totally reflected by another side surface of the protrusion portion.

In this case, preferably, the entirety of the light which is incident into the protrusion portion from one side surface of the protrusion portion is incident to another side surface of the protrusion portion.

For example, at least a portion, preferably, the entirety of light which is incident toward the gap portion between the protrusion portions at an incident angle of 30° or 45° and then is incident into the protrusion portion from the one side surface of the protrusion portion travels in the protrusion portion and is incident to the another side surface of the protrusion portion.

The half or more of the light which has been incident toward the light incidence end surface of the protrusion portion at the incident angle of 30° or 45° may be incident into the protrusion portion from the light incidence end surface of the protrusion portion, travel in the protrusion portion, and may be incident to the side surface of the protrusion portion. Preferably, the light which has been incident to the side surface of the protrusion portion is totally reflected by the side surface of the protrusion portion.

Each of the plurality of protrusion portions has one direction as a longitudinal direction, and an angle of the light emitting end surface of the protrusion portion and the side surface of the protrusion portion may be 72° or more and 83° or less in a cross-section of the protrusion portion obtained by cutting the protrusion portion with a surface orthogonal to the longitudinal direction.

The plurality of the protrusion portions which have a strip shape and have different extension directions from each other may be formed on the one surface of the base member.

The protrusion portion which continuously changes the extension direction when viewed from a normal direction of the base member may be formed on the one surface of the base member.

The protrusion portion may be an arc protrusion portion which has a central angle of less than 90°.

A plurality of tiling areas may be provided on the one surface of the base member and the plurality of protrusion portions which have a strip shape and are disposed parallel with each other may be formed in each of the plurality of tiling areas. The protrusion portions in two tiling areas which are adjacent to each other may have different extension directions from each other.

A plurality of tiling areas may be provided on the one surface of the base member, and the plurality of protrusion portions which have an arc shape and are concentrically disposed when viewed from the normal direction of the base member may be formed in each of the plurality of the tiling areas. Directions of a convex portion of the arc in two tiling areas which are adjacent to each other may be different from each other.

Advantageous Effects of Invention

According to the present invention, it is possible to provide a lighting film, a web roll for the lighting film, a window pane, a roll screen, and a lighting louver that enables light which is incident on the window pane to be guided to the ceiling or the innermost part of a house with high efficiency.

BRIEF DESCRIPTION OF DRAWINGS

FIG. 8 is a partial cross-sectional view of a lighting film according to a second embodiment.

FIG. 31 is a diagram illustrating various structural parameters of samples 1 to 26.

FIG. 32 is a diagram illustrating a relationship of the samples 1 to 26 and configurations A to D.

FIG. 42 is a diagram illustrating a simulation result of transmitting light of the lighting film when the taper angles of the protrusion portion are set to 73° and 80°.

FIG. 52 is a diagram illustrating an efficiency of the lighting film when a solar azimuth and the elevation angle of the sun are changed.

DESCRIPTION OF EMBODIMENTS

Hereinafter, embodiments according to the present invention will be described with reference to the accompanying drawings. In the following drawings, an X direction is set as a normal direction of a base member of a lighting film. A Y direction is set as a direction orthogonal to the X direction. A Z direction is set as a direction orthogonal to the X direction and the Y direction.

First Embodiment

Figure 1A:
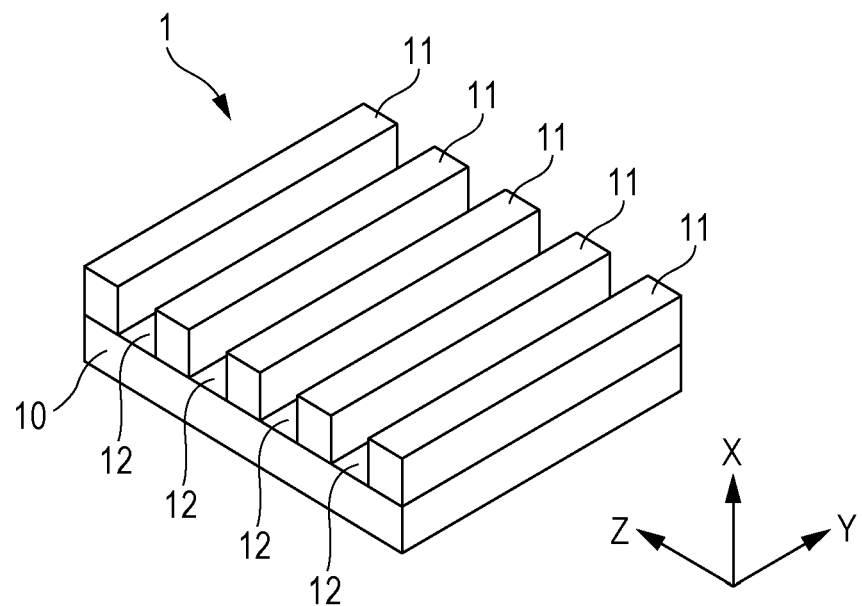
FIG. 1A is a schematic configuration diagram of a lighting film according to a first embodiment.
Figure 1B:
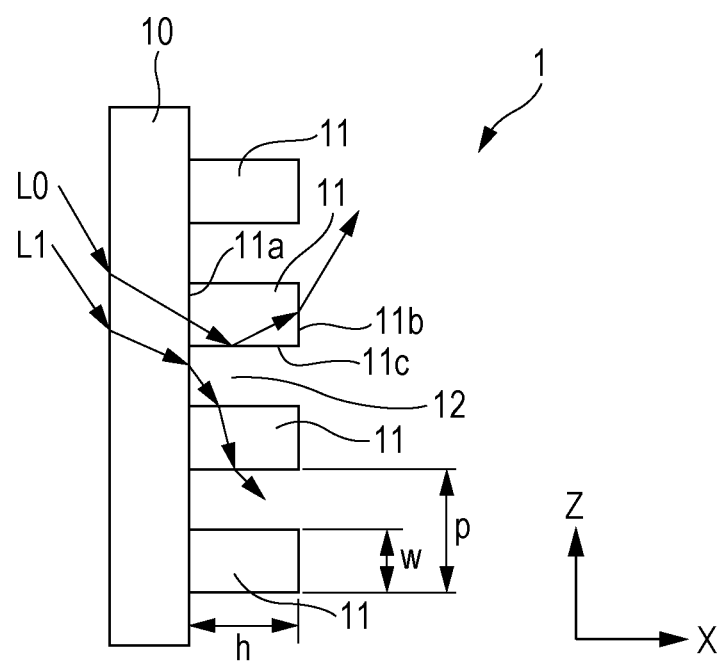
FIG. 1B is a schematic cross-sectional view of the lighting film according to the first embodiment.

FIG. 1A is a partial perspective view of a lighting film 1 according to a first embodiment. FIG. 1B is a partial cross-sectional view of the lighting film 1 according to the first embodiment.

The lighting film 1 includes a base member 10 having light-transmitting properties, a plurality of protrusion portions 11 which have light-transmitting properties and are formed on one surface of the base member 10 so as to be adjacent to each other, and a gap portion 12 formed between the protrusion portions 11.

Generally, resins such as a thermoplastic polymer, thermosetting resin, and photopolymerizable resin are used as the base member 10. A base member which is formed of an acrylic polymer, an olefinic polymer, a vinyl polymer, a cellulosic polymer, an amide-based polymer, a fluorine-based polymer, a urethane-based polymer, a silicone-based polymer, an imide-based polymer, and the like and has light-transmitting properties may be used. For example, a base member having light-transmitting properties such as a triacetylcellulose (TAC) film, a polyethylene terephthalate (PET) film, a cycloolefin polymer (COP) film, a polycarbonate (PC) film, a polyethylene naphthalate (PEN) film, a polyether sulphone (PES) film, and a polyimide (PI) film is preferably used. In this embodiment, a PET film having a thickness of 100 μm is used as an example. Total light transmittance of the base member 10 is equal to or more than 90% in accordance with the standard of JIS K7361-1, preferably.

With this, it is possible to obtain sufficient transparency.

The protrusion portion 11 is formed of an organic material having light-transmitting properties and photosensitivity, for example, such as acrylic resin, epoxy resin, and silicone resin. Mixture of a transparent resin obtained by mixing a polymerization initiator, a coupling agent, monomers, an organic solvent, and the like to the resin may be used. The polymerization initiator may contain various additional components such as a stabilizer, an inhibitor, a plasticizer, a fluorescence brightening agent, a releasing agent, a chain-transfer agent, and other photopolymerizable monomers. In addition, a material disclosed in Japanese Patent No. 4129991 may be used. Preferably, total light transmittance of the protrusion portion 11 is equal to or more than 90% in accordance with the standard of JIS K7361-1. With this, it is possible to obtain sufficient transparency.

Each of the protrusion portions 11 has substantially one direction (Y direction) as a longitudinal direction. The one direction is disposed in a direction parallel with one side of the base member 10 which has a rectangular shape. In a case of this embodiment, each of the plurality of protrusion portions 11 is configured as a strip protrusion portion which is extended in the Y direction and has a constant width. The longitudinal direction of each of the plurality of protrusion portion 11 is disposed in a direction parallel with one side of the base member 10 which has a rectangular shape. A cross-section (XZ cross-section) of each of the plurality of protrusion portions 11, which is parallel with a width direction of the protrusion portion 11 is rectangular. When the width of the protrusion portion 11 in a transverse direction is set as w, the height of the protrusion portion 11 in a normal direction (X direction) of the base member 10 is set as h, and a pitch between the protrusion portions 11 in an arrangement direction (Z direction) of the protrusion portions 11 is set as p, all of the widths w, all of the heights h of the plurality of protrusion portions 11, and all of the pitches p between the plurality of protrusion portions 11 are equal to each other. For example, the width w of the protrusion portions 11 is 10 μm to 50 μm, for example, the height h of the protrusion portions 11 is 50 μm to 100 μm, for example.

A gas such as the air is full of the gap portion 12 and a refractive index of the gap portion 12 is about 1. The refractive index of the gap portion 12 being 1 causes the gap portion 12 to be configured such that a critical angle in an interface 11c between the gap portion 12 and the protrusion portion 11 becomes the minimum. In the case of this embodiment, the gap portion 12 refers to an air layer which is formed from the air, but the gap portion 12 may refer to an inert gas layer which is formed from an inert gas such as nitrogen or may refer to a decompressive layer which is in a decompressive state.

The lighting film 1 adheres to a glass substrate of a window pane such that an arrangement direction of the protrusion portions 11 becomes a vertical direction. A light beam L0 which is incident into the protrusion portion 11 from one end of the protrusion portion 11 among light beams which coming from an upper part of the lighting film 1 is totally reflected by the side surface 11c of the protrusion portion 11 (interface between the protrusion portion 11 and the gap portion 12) and is emitted toward the upper part of the lighting film 1 again. The light beam which is reflected by the protrusion portion 11 is introduced to the ceiling or the innermost part of a house and illuminates the inside of the house brightly.

In the case of this embodiment, a first end surface 11a on the base member 10 side of the protrusion portion 11 is configured as a light incidence end surface, but a second end surface 11b on an opposite side to the base member 10 may be configured as the light incidence end surface. That is, in the protrusion portion 11, the first end surface 11a on the base member 10 side or the second end surface 11b on the opposite side to the base member 10 is configured as the light incidence end surface, and the side surface 11c coming into contact with the gap portion 12 is configured as a reflective surface of totally reflecting light which is incident from the light incidence end surface.

Figure 2A:
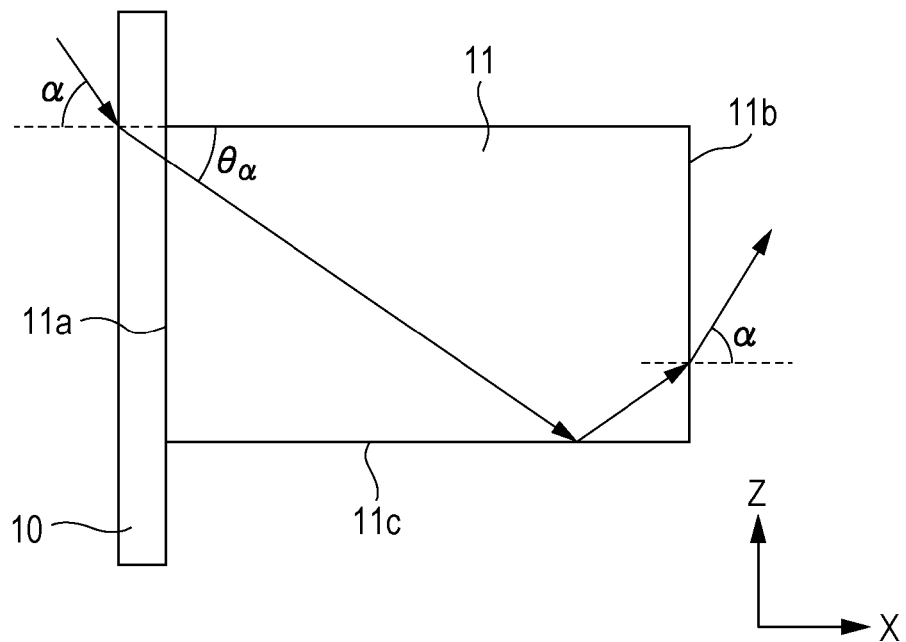
FIG. 2A is a diagram illustrating an action of a protrusion portion of the lighting film.
Figure 2B:
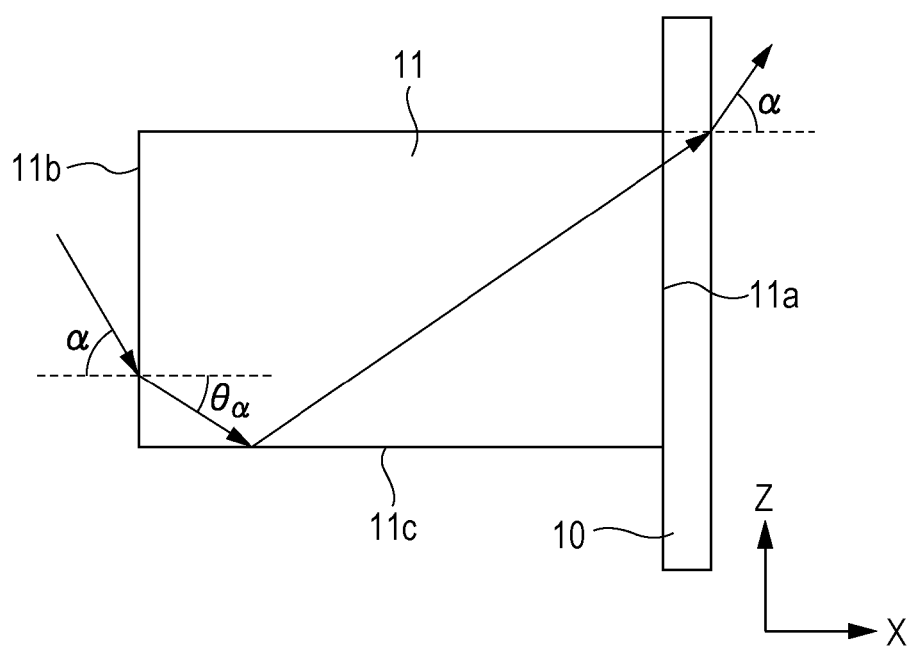
FIG. 2B is a diagram illustrating an action of the protrusion portion of the lighting film.

For example, as illustrated in FIG. 2A, when light is incident from the base member 10 side at an incident angle of a, light which is emitted from the second end surface 11b of the protrusion portion 11 has an emission angle of α. As illustrated in FIG. 2B, when light is incident from the second end surface 11b of the protrusion portion 11 with an incident angle of a, light which is emitted from the base member 10 also has an emission angle of a. In such a case where light is incident from the base member 10 side and a case where light is incident from the protrusion portion 11 side, only a light path is reverse to each other and a point that light is reflected by the side surface 11c of the protrusion portion 11 and thus a traveling path is changed is the same. Accordingly, even if any of the base member 10 side of the lighting film 1 and the protrusion portion 11 side is disposed so as to be directed toward the outside of the house, light outside the house may be reflected to be directed toward the ceiling side in the same manner.

Returning to FIGS. 1A and 1B, the base member 10 is exposed in an area (non-formation area of the protrusion portion 11) other than a formation area of the protrusion portion 11 on the one surface of the base member 10. A light beam L1 which is incident to the non-formation area of the protrusion portion 11 among light beams coming from the upper part of the lighting film 1 transmits through the base member 10 and then is incident to the side surface 11c of the protrusion portion 11. The light which is incident to the side surface 11c of the protrusion portion 11 is not reflected by the side surface 11c, but transmits through the protrusion portion 11, and then is emitted to a lower part of the lighting film 1. The light which transmits through the protrusion portion 11 illuminates the vicinity of a window on which the lighting film 1 is installed.

According to the lighting film 1 of such the embodiment, light which is incident from the upper part of the lighting film 1 is divided into two light beams. One light beam may illuminate the ceiling or the innermost part of a house and another light beam may illuminate a position in the vicinity of a window in a house. Thus, it is possible to illuminate the entirety of the inside of a house brightly by dispersing light which is incident to the lighting film 1.

In this embodiment, the base member 10 is exposed in the non-formation area of the protrusion portion 11. However, a member having light-transmitting properties may be formed in this area so as to be overlapped with one surface of the base member 10. That is, the member which has the light-transmitting properties and is formed on the one surface of the base member 10 may be exposed in the area other than the formation area of the protrusion portion 11 in the one surface of the base member 10. An example of such a member includes a member and the like for blocking ultraviolet light or infrared light and causing visible light to transmit through the member. Even in this case, visible light which is incident to the non-formation area of the protrusion portion 11 may be directed toward the lower part of the lighting film 1 and be emitted.

In this embodiment, a colorless and transparent member is used as the base member 10 and the protrusion portion 11. However, the color of the base member 10 or the protrusion portion 11 is not limited thereto. For example, the base member 10 or the protrusion portion 11 may be colored with a light yellow color, an orange color, a blue color, and the like in order to adjust the color temperature of light which is taken into a house. Considering designability and the like, a portion or the entirety of the base member 10 and the protrusion portion 11 may be colored with red or blue. Accordingly, application as stained glass may be made. In this case, since the lighting film 1 is to perform a function as a window, it is necessary that visible light transmittance has an extent of causing a side to which the base member 10 or the protrusion portion 11 is directed to be transparent and be seen. The base member 10 and the protrusion portion 11 are configured as members having light-transmitting properties, but "having the light-transmitting properties" in this specification means that the base member 10 and the protrusion portion 11 have visible light transmittance of the extent of causing a side to which the base member 10 or the protrusion portion 11 is directed to be transparent and be seen.

In this embodiment, the protrusion portion 11 is configured as a strip protrusion portion having a constant width, but the shape of the protrusion portion 11 is not limited thereto. If each of the plurality of protrusion portions 11 has substantially one direction as a longitudinal direction and the one direction is disposed in a direction parallel with one side of the base member 10 which has a rectangular shape, an effect similar to that in this embodiment is obtained. Here, "each of the plurality of protrusion portions having substantially one direction as a longitudinal direction" refers as follows. That is, light which is isotropically diffused, such as fluorescence is incident into the base member 10 from an opposite side to a side on which the protrusion portions 11 of the base member 10 are formed, and pole corner luminance distribution of light which is emitted outwardly in the plurality of the protrusion portions 11 is measured. At this time, a case where there are a direction in which luminance of light which is emitted from the plurality of protrusion portions 11 is relatively high and a direction in which the luminance of light is relatively low is referred to as "the protrusion portion having substantially one direction as a longitudinal direction". A direction orthogonal to the direction in which the luminance is relatively high is defined as the "one direction".

In this embodiment, an interval between the protrusion portions 11 is constant, but the interval between the protrusion portions 11 is not necessarily required to be constant. The plurality of protrusion portions 11 may be disposed so as to be adjacent to each other with irregular intervals therebetween. Accordingly, it is possible to suppress an interference fringe occurring when the protrusion portions 11 are regularly formed.

Figure 3:
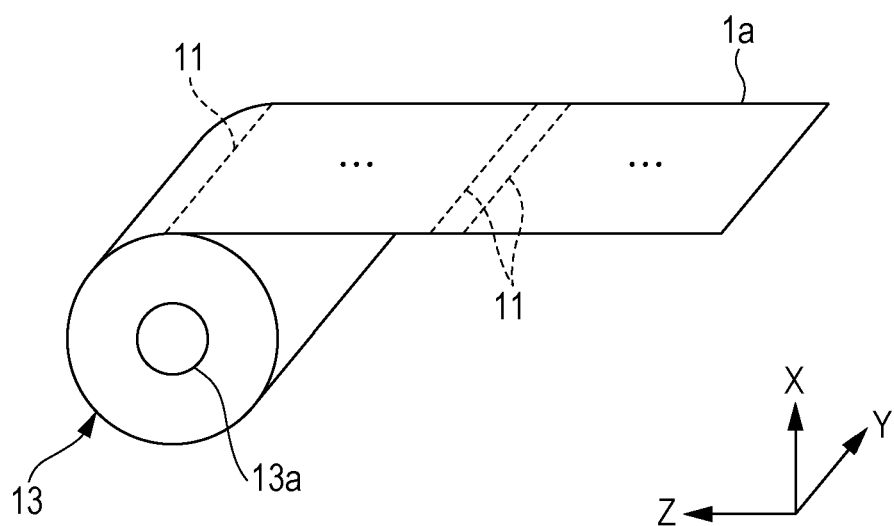
FIG. 3 is a perspective view of a web roll for the lighting film.

FIG. 3 is a perspective view of a web roll 13 of a lighting film.

The web roll 13 is obtained by winding a long lighting film 1a around a shaft center 13a. The lighting film 1 illustrated in FIGS. 1A and 1B is manufactured by cutting the long lighting film 1a to be a predetermined shape. In order to protect the protrusion portion 11, the lighting film 1a is wound such that a surface side on which the protrusion portions 11 are formed is set to be the inner side.

The longitudinal direction of the protrusion portion 11 may be set to have any angle to the longitudinal direction of the lighting film 1a. In view from using the lighting film 1a without waste, the longitudinal direction of the protrusion portion 11 is preferably set to be a direction parallel with or orthogonal to the longitudinal direction of the lighting film 1a.

That is, since a window pane generally is formed to be rectangular, the lighting film 1 is also formed to be rectangular. The lighting film 1 is installed on the window pane such that one side of a rectangle becomes a horizontal direction, and thus each of the plurality of protrusion portions 11 is disposed so as to have the longitudinal direction which is parallel with the one side of the rectangular lighting film 1. When a rectangular lighting film 1 is cut off from the lighting film 1a, if the lighting film 1a is fed from the web roll 13 by a predetermined length, and then the lighting film 1a is cut over the full width in a width direction which is orthogonal to the longitudinal direction of the lighting film 1a, it is possible to use the lighting film 1a without waste. If each of the plurality of protrusion portions 11 has the longitudinal direction which is set to be parallel with or orthogonal to the longitudinal direction of the lighting film 1a, the lighting film 1 may be cut off from the lighting film 1a by using such a manner.

In FIG. 3, each of the plurality of protrusion portions 11 has the longitudinal direction which is set to be orthogonal to the longitudinal direction of the lighting film 1a. However, each of the plurality of protrusion portions 11 may have the longitudinal direction which is set to be parallel with the longitudinal direction of the lighting film 1a. With this configuration, the lighting film 1 may also be cut off from the lighting film 1a without waste. However, when the lighting film 1a is wound around the shaft center 13a, the lighting film 1a is bent with a large curvature particularly in the vicinity of the shaft center 13a. Thus, in order to suppress deformation of the protrusion portion 11, the longitudinal direction of the protrusion portion 11 is preferably set to be orthogonal to the longitudinal direction of the lighting film 1a.

Figure 4A:
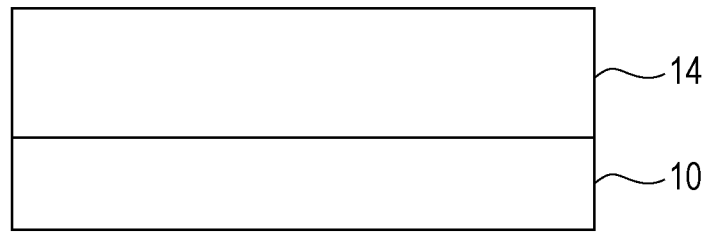
FIG. 4A is a diagram illustrating an example of a manufacturing method of the lighting film.
Figure 4B:
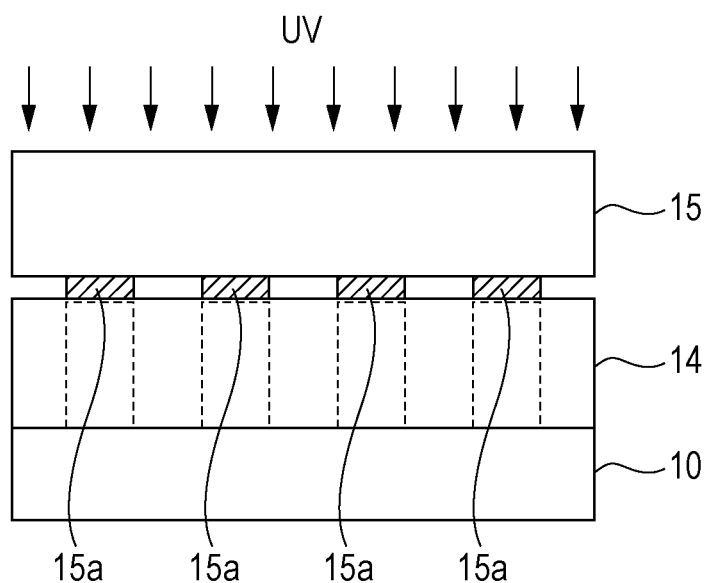
FIG. 4B is a diagram illustrating the example of a manufacturing method of the lighting film.
Figure 4C:
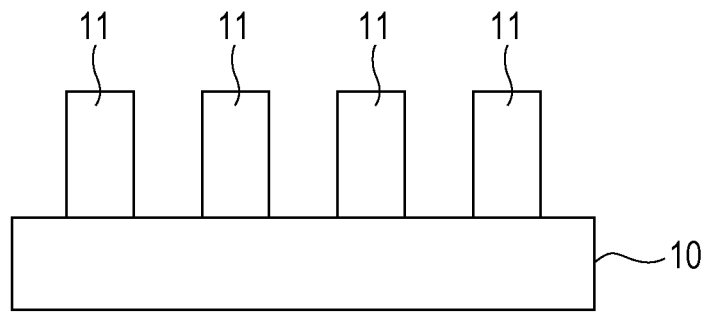
FIG. 4C is a diagram illustrating the example of a manufacturing method of the lighting film.

FIGS. 4A to 4C are diagrams illustrating an example of a manufacturing method of the lighting film 1 (lighting film 1a).

First, as illustrated in FIG. 4A, a resist layer 14 which is made of a transparent negative photoresist is formed on the entire surface of the base member 10.

Then, as illustrated in FIG. 4B, exposure processing is performed by irradiating the resist layer 14 with ultraviolet light UV through an exposure mask 15. In the exposure mask 15, a light blocking layer 15a is formed at positions which face positions at which the protrusion portions 11 are formed. As the ultraviolet light UV, light (non-diffusion light) which is parallel with the normal direction of the base member 10 is used.

Then, as illustrated in FIG. 4C, the resist layer 14 is developed by using developer and the developed resist layer 14 is cured through heating processing. In this manner, the protrusion portions 11 which are made of the transparent negative photoresist are formed.

The above description is for an example of the manufacturing method of the lighting film 1, but the manufacturing method of the lighting film 1 is not necessarily limited thereto. For example, the lighting film 1 may be manufactured by using a method such as a melt extrusion method and a molding extrusion method in addition to a method of using such a photo process.

In these method, the base member 10 and the protrusion portion 11 are integrally formed with the same resin.

Figure 5:
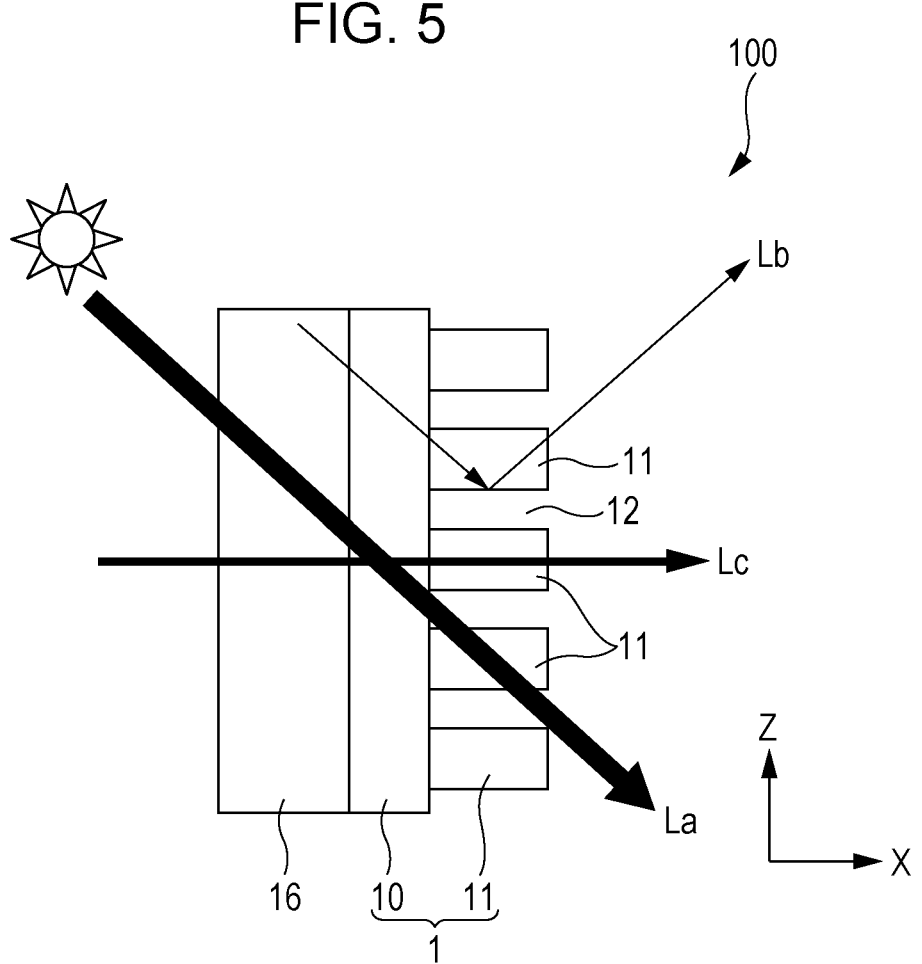
FIG. 5 is a partial cross-sectional view of a window pane to which the lighting film is applied.

FIG. 5 is a partial cross-sectional view of a window pane 100 including the lighting film 1.

The window pane 100 includes a glass substrate 16 and the lighting film 1 which adheres to one surface of the glass substrate 16. In the case of this embodiment, the lighting film 1 adheres to the one surface (for example, a surface on the inside of a house) of the glass substrate 16 such that a side of the base member 10 on which the plurality of protrusion portions 11 are formed is directed outwardly. The glass substrate 16 has a rectangular shape and the protrusion portions 11 are disposed so as to have the longitudinal direction which is parallel with one side of the glass substrate 16.

In FIG. 5, light in the outside of a house is incident from the glass substrate 16 side of the window pane 100. A light beam Lb which is a portion of light beams coming from an upper part of the window pane and is incident to one end side of the protrusion portion 11 is reflected by the side surface of the protrusion portion 11 and is emitted toward the ceiling side in the house. A light beam La which is a portion of the beams coming from the upper part of the window pane and is incident to the non-formation area of the protrusion portion 11 is not reflected by the side surface of the protrusion portion 11 and is emitted toward a floor surface in the house. Accordingly, the lighting film 1 causes the light in the outside of the house to be dispersed with high efficiency and the whole inside of the house is illuminated brightly. A light beam Lc traveling in a normal direction of the glass substrate 16 is not refracted and reflected by the side surface of the protrusion portion 11, and thus it is possible to observe a scene of the outside of the window pane 100 in the house.

In FIG. 5, the lighting film 1 adheres to a surface of the glass substrate 16 on an inward side, but the lighting film 1 may adhere to a surface of the glass substrate 16 on an outward side. In FIG. 5, the lighting film 1 adheres to the one surface of the glass substrate 16 such that a side of the base member 10 on which the plurality of protrusion portions 11 are formed is directed outwardly. However, the lighting film 1 may adhere to the one surface of the glass substrate 16 such that the side of the base member 10 on which the plurality of protrusion portions 11 are formed is directed inwardly. In this case, a bonding layer for causing the lighting film 1 and the glass substrate 16 to be bonded to each other is formed to have a thickness smaller than the height of the protrusion portion 11, and this is for causing the gap portion 12 not to disappear.

Figure 6A:
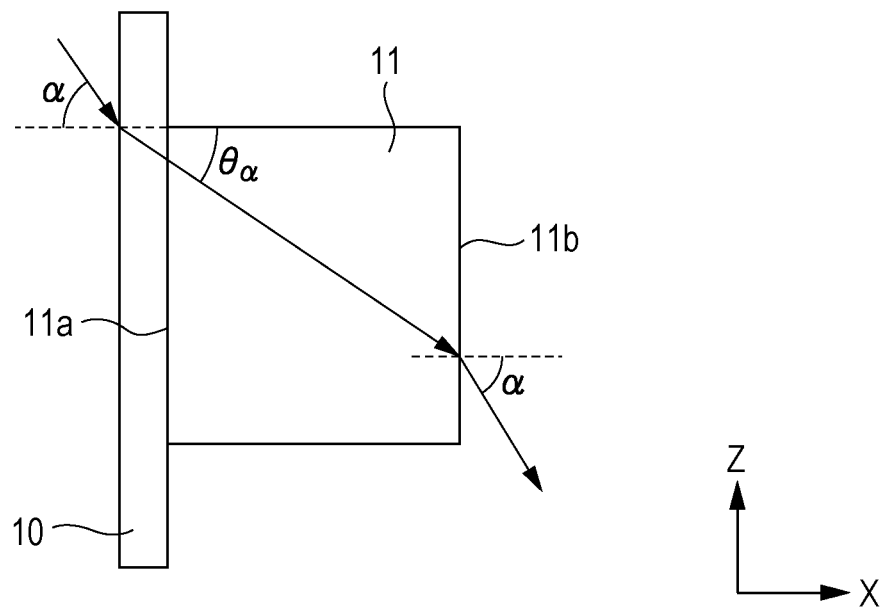
FIG. 6A is a diagram illustrating an action of the protrusion portion of the lighting film.
Figure 6B:
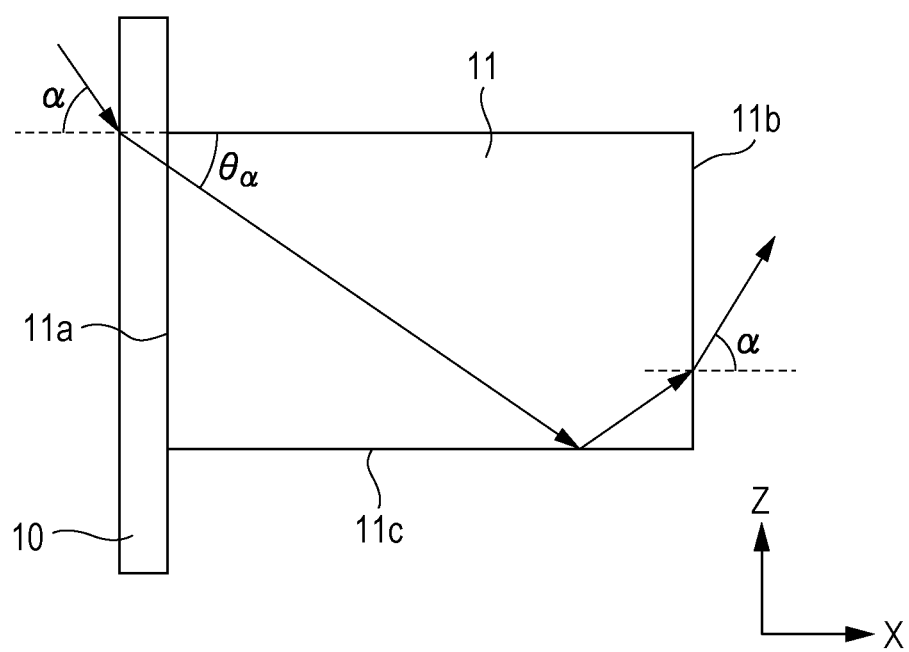
FIG. 6B is a diagram illustrating an action of the protrusion portion of the lighting film.

An aspect ratio (height h/width w) of the protrusion portion 11 is designed such that sunlight during a daytime (9 o'clock to 15 o'clock) when the altitude is the highest is taken into a house with high efficiency. For example, as illustrated in FIG. 6A, when the aspect ratio of the protrusion portion 11 is small, light which is incident to one end side of the protrusion portion 11 is not reflected by the side surface of the protrusion portion 11. In this case, light in the outside of a house is emitted to a floor side as it is, and thus only the vicinity of a window becomes bright and the ceiling or the innermost part of a house does not become bright. As illustrated in FIG. 6B, when the aspect ratio of the protrusion portion 11 is large, the light which is incident to the one end side of the protrusion portion 11 is certainly reflected by the side surface of the protrusion portion 11. For this reason, it is possible to disperse light which is incident from the outside of the house to the floor side and the ceiling side and it is possible to cause the whole inside of the house to become bright.

Figure 7A:
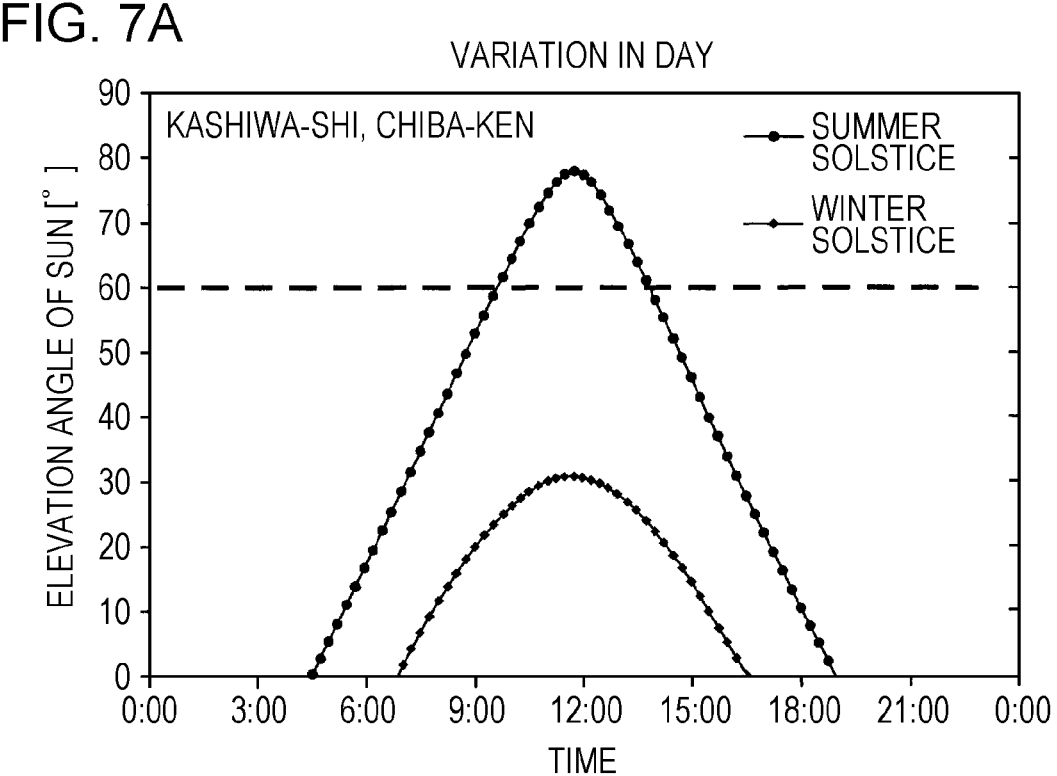
FIG. 7A is a diagram illustrating a change of an elevation angle of the sun.
Figure 7B:
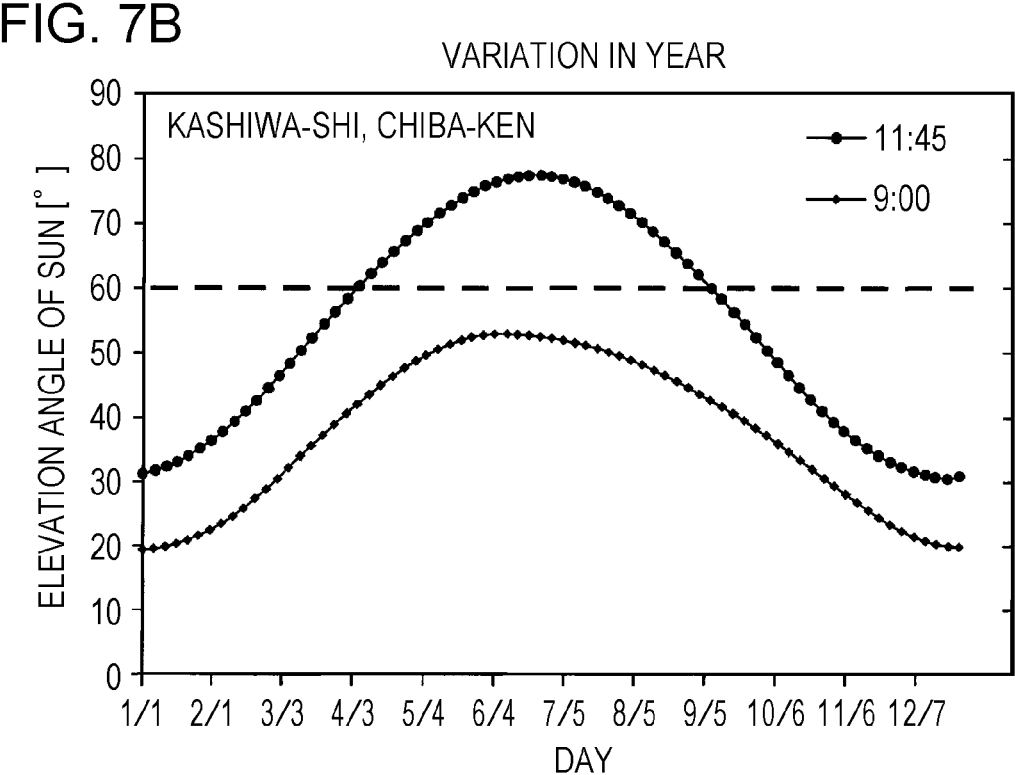
FIG. 7B is a diagram illustrating a change of an elevation angle of the sun.

Considering the aspect ratio of the protrusion portion 11, data in FIGS. 7A and 7B is referred. FIG. 7A is a diagram illustrating a change of an elevation angle of the sun in a day on the summer solstice and the winter solstice. FIG. 7B is a diagram illustrating a change of an elevation angle of the sun in a year at a predetermined time point. FIG. 7B illustrates an elevation angle of the sun at 9 o'clock which is a time when people start activity, and an elevation angle of the sun (meridian altitude) at a time point of 11:45 (meridian time) when the elevation angle of the sun is the highest in a daytime. FIGS. 7A and 7B illustrate the elevation angle of the sun in Kashiwa-shi as an example.

As illustrated in FIG. 7A, elevation angles of the sun during a daytime (9 o'clock to 15 o'clock) on the summer solstice are equal to or more than 60 degrees, and elevation angles of the sun during a daytime on the winter solstice are equal to or less than 30 degrees. Since the elevation angle of the sun is low on the winter solstice, light reaches the innermost part of a house even though the light is caused not to be reflected to the ceiling side by the lighting film. However, since the elevation angle of the sun is high on the summer solstice, if light is caused not to be reflected to the ceiling by the lighting film, the light does not reach the innermost part of a house. As illustrated in FIG. 7B, in a mild season from April to September, an elevation angle of the sun at 9 o'clock which is an activity starting time is relatively low, but an elevation angle of the sun at noon (time point of 11:45) which is the hottest time is equal to or more than 60 degrees. If light at noon is not reflected by the lighting film, a floor surface in the vicinity of a window is heated and only the vicinity of the window becomes significantly hot.

In view from an efficient use of light during a daytime, it is preferable based on the above-described knowledge that light at a time when the elevation angle of the sun is equal to or more than 60 degrees is allowed to be reflected by the side surface of the protrusion portion 11. The data in FIGS. 7A and 7B is data of the elevation angle of the sun at a specific district. If latitude is different, data of the elevation angle of the sun is also different. However, it is considered that, as guidance for designing the aspect ratio of the protrusion portion 11, a case where the elevation angle of the sun is 60 degrees being used as a reference has validity. For example, an elevation angle of the sun at a location where the latitude is low is higher than that in FIGS. 7A and 7B. However, regardless of this case, if light when the elevation angle of the sun is equal to or more than 60 degrees can be reflected, it is possible to illuminate the inside of a house sufficiently brightly. A time zone or a season when an elevation angle of the sun at a location where the latitude is high is equal to or more than 60 degrees is short. However, since the elevation angle of the sun at the location where the latitude is high is low, light reaches the innermost part of a house even though the light is not reflected to the ceiling by the lighting film. Thus, even though a strict control is not performed on the aspect ratio of the protrusion portion, it is possible to illuminate the inside of a house to some extent.

Based on such a background, in this embodiment, an aspect ratio (minimum aspect ratio) of the protrusion portion which is the minimum and allows light when the elevation angle of the sun is 60 degrees to be reflected by the side surface of the protrusion portion 11 is obtained, and each of the protrusion portions 11 is formed to have an aspect ratio which is equal to or more than such the aspect ratio. That is, when light (wavelength 560 nm) which travels in the direction parallel with the arrangement direction of the plurality of protrusion portions 11 is incident to an opposite surface to the side of the base member 10 on which the plurality of protrusion portions 11, at an incident angle of 60 degrees, if the minimum of aspect ratios of the protrusion portion 11, which allows the light to be reflected by the side surface of the protrusion portion 11 once is set as the minimum aspect ratio, an aspect ratio of each of the plurality of protrusion portions 11 is equal to or more than the minimum aspect ratio.

For example, in FIG. 6B, if an incident angle of light to the base member 10 is set as α, a refraction angle of the light on a surface of the base member 10 is set as θα, an average refractive index of the base member 10 and the protrusion portion 11 is set as n, the height of the protrusion portion 11 is set as h, and the width of the protrusion portion 11 is set as w, an aspect ratio h/w calculated from a relational expression of h/w=tan(90°−θα) (where, θα=a sin(√3/2n)) becomes an aspect ratio which is the minimum of the aspect ratios which allow light when the elevation angle of the sun is 60 degrees to be reflected once by the side surface of the protrusion portion 11. Thus, the aspect ratio h/w of the protrusion portion 11 preferably satisfies the relational expression of h/w≥tan(90°−θα) (where, θα=a sin(√3/2n)).

A refractive index of resin which is allowed to be used for the base member 10 and the protrusion portion 11 depends on a wavelength of light, but generally the refractive index of the resin is equal to or more than 1.45. For this reason, if n≥1.45 is substituted for the above expression, h/w≥1.34. As illustrated in FIG. 5, since the lighting film 1 adheres to the glass substrate 16 in practice, the incident angle α is slightly changed due to refraction of light at an interface between the glass substrate 16 and the lighting film 1. However, the refractive index of the glass substrate is about 1.5, and thus refraction of light at the interface between the glass substrate 16 and the lighting film 1 does not have a large difference from the above calculation result. Thus, the aspect ratio of the protrusion portion 11 may be designed to be h/w≥1.34. That is, the aspect ratio h/w of each of the plurality of protrusion portions 11 is 1.34, preferably.

Similar light which travels through the protrusion portion 11 at an incident angle of 60 degrees travels toward the same lower part as that at an incident time if the light is reflected twice by the side surface. For this reason, the aspect ratio is preferably restricted to an extent that light which is incident to the protrusion portion 11 when the elevation angle of the sun is 60 degrees is not reflected twice by the side surface of the protrusion portion 11. Accordingly, if the maximum of aspect ratios of the protrusion portion which do not allow the entirety of light which is incident to the protrusion portion 11 to be reflected twice (a case where reflection is performed once is allowed) is set as the maximum aspect ratio, the aspect ratio of each of the plurality of protrusion portions 11 is preferably set to be less than the maximum aspect ratio.

Since the maximum aspect ratio is represented by 2×tan (90−θα), the aspect ratio of the protrusion portion 11 preferably satisfies a relational expression of 2×tan(90−θα)>h/w. If the expression of the maximum aspect ratio is combined with the expression of the minimum aspect ratio, it is preferable that 2×tan(90−θα)>h/w≥tan(90−θα) is satisfied. If n≥1.45 is substituted for the combination result, 2.68>h/w is established, and thus the aspect ratio h/w of the protrusion portion 11 may be designed to be less than 2.68. That is, the aspect ratio of each of the plurality of protrusion portions is preferably less than 2.68.

In the case of this embodiment, the refractive indices n of the base member 10 and the protrusion portion 11 is 1.53, the height h of the protrusion portion 11 is 40 μm, and the width w of the protrusion portion 11 is 20 μm. Thus, relational expressions of tan(90°−θα)=1.46, h/w=2.0, and 2×tan(90−θα)>h/w≥tan(90°−θα) are satisfied.

As described above, according to the lighting film 1 and the window pane 100 of this embodiment, the side surface 11c of the protrusion portion 11 reflects a portion of light which is incident to the lighting film 1, and thus it is possible to guide the portion of the light to the ceiling or the innermost part of a house with high efficiency. For this reason, it is possible to illuminate the whole inside of the house brightly in addition to the vicinity of a window.

Second Embodiment

FIG. 8 is a partial cross-sectional view of a lighting film 2 according to a second embodiment.

In this embodiment, the same components as those in the first embodiment are denoted by the same reference signs and detailed descriptions thereof will be omitted.

This embodiment is different from the first embodiment in that when the width of the protrusion portion 11 in the transverse direction is set as w, and the height of the protrusion portion 11 in the normal direction of the base member 10 is set as h, the plurality of protrusion portions 11 have a plurality of protrusion portions 11 which have different aspect ratios from each other, the aspect ratio being a ratio of h and w.

In this embodiment, the widths w1, w2, w3, and w4 of the protrusion portions 11 are randomly set, but it is not necessary that the width of each of the protrusion portions 11 is randomly set. Two types or three types or more of protrusion portions 11 may be formed on the one surface of the base member 10 to be mixed with each other and the width in each type is different from each other. A plurality of types of protrusion portions 11 may be disposed regularly in an arrangement order having a predetermined rule or may be irregularly disposed.

The lighting film 2 is used as a portion of a window pane adhering to one surface of a glass substrate, similarly to the first embodiment.

An action and effect of this embodiment will be described using FIGS. 9A to 9D.

Figure 9A:
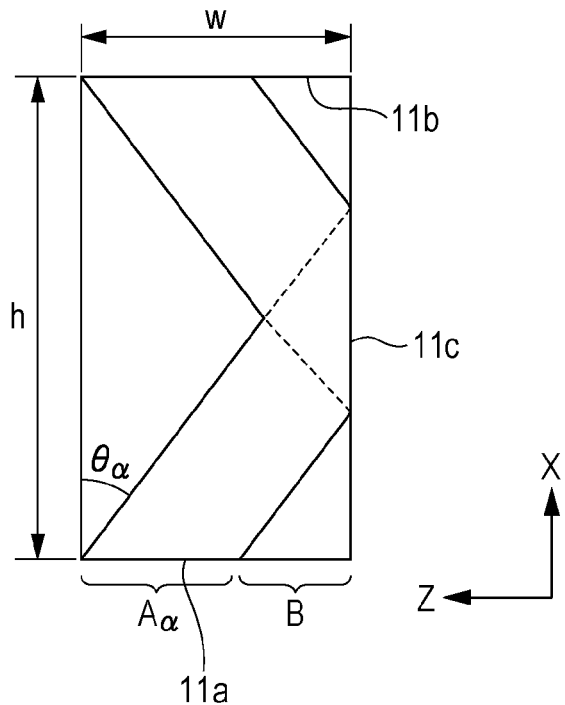
FIG. 9A is a diagram illustrating an action of the protrusion portion of the lighting film.
Figure 9B:
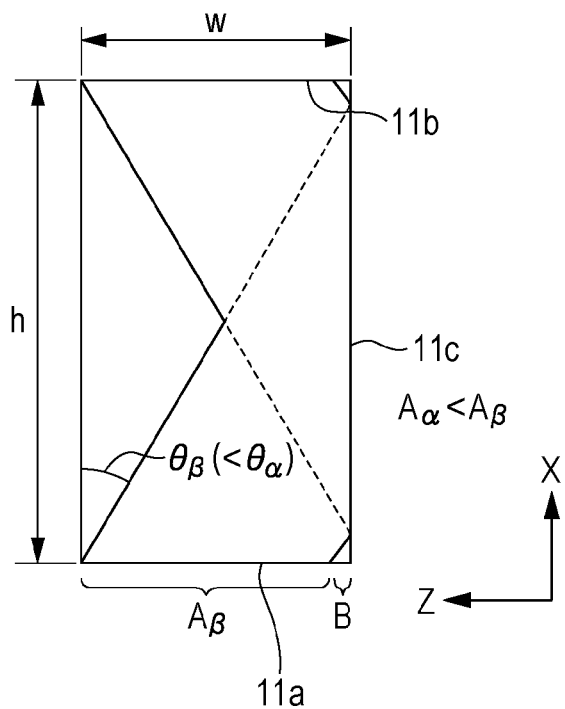
FIG. 9B is a diagram illustrating an action of the protrusion portion of the lighting film.
Figure 9C:
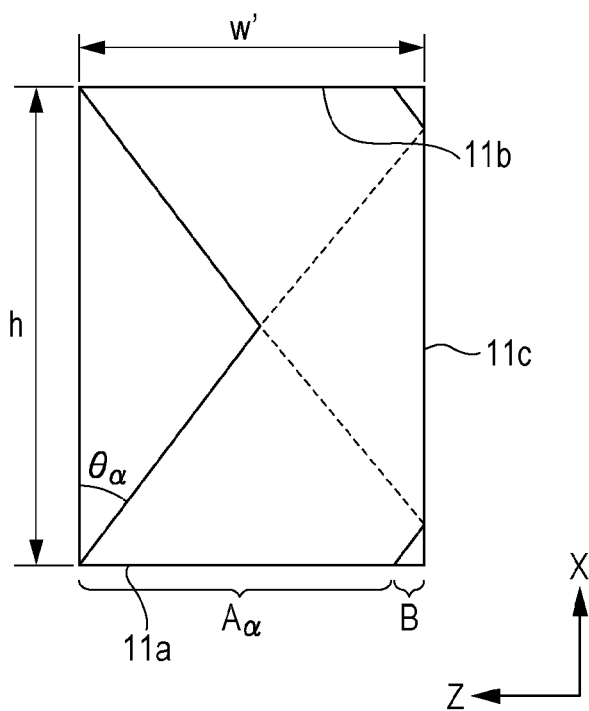
FIG. 9C is a diagram illustrating an action of the protrusion portion of the lighting film.

FIG. 9A is a diagram illustrating a propagation pattern of light when the light is incident at an angle of θα from the first end surface 11a of the protrusion portion having a height h. FIG. 9B is a diagram illustrating a propagation pattern of light when the light is incident at an angle of θβ (<θα) from the first end surface 11a of the protrusion portion having a width w and a height h. FIG. 9C is a diagram illustrating a propagation pattern of light when the light is incident at an angle of θα from the first end surface 11a of the protrusion portion having a width w' (>w) and a height h. Here, for a convenient description, a +X direction is referred to as an upper direction and a +Z direction is referred to as a left direction. An upper right direction corresponds to a direction where external light is incident to the protrusion portion, and an upper left direction corresponds to a direction from the protrusion portion to the ceiling in a house.

As illustrated in FIG. 9A, a portion of light which is incident from the first end surface 11a of the protrusion portion in the upper right direction is reflected by the side surface 11c of the protrusion portion such that a path of the light have a V shape, and the light is emitted from the second end surface 11b of the protrusion portion in the upper left direction. The light which is emitted from the second end surface 11b in the upper left direction corresponds to light which is incident to an area Aα of the first end surface 11a, and light which is incident to an area B is emitted from the second end surface 11b in the upper right direction. The light which is emitted from the second end surface 11b in the upper left direction corresponds to light directed to the ceiling or the innermost part of the house.

As illustrated in FIG. 9B, if an incident angle to the first end surface 11a is changed from θα to θβ (<θα), a proportion of light which is emitted from the second end surface 11b in the upper left direction is changed. The light which is emitted from the second end surface 11b in the upper left direction corresponds to light which is incident to an area Aβ of the first end surface 11a.

Figure 9D:
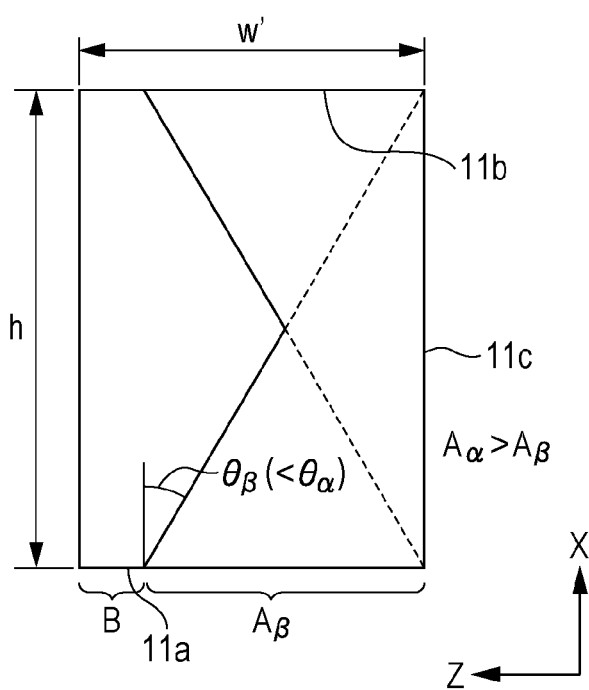
FIG. 9D is a diagram illustrating an action of the protrusion portion of the lighting film.

In FIG. 9B, the proportion of the light becomes large. However, the proportion of the light becomes larger or smaller than that in FIG. 9A, depending on the incident angle. Similarly, as illustrated in FIG. 9C, even though the aspect ratio of the protrusion portion is changed from h/w to h/w' (w'>w), a proportion of the light which is emitted from the second end surface 11b in the upper left direction is changed. As illustrated in FIG. 9D, if an incident angle to the first end surface 11a is changed from θα to θβ (<θα) in the configuration of FIG. 9C, the proportion of the light which is emitted from the second end surface 11b in the upper left direction is changed.

If light intensity of light which is emitted from the second end surface 11b in the upper left direction is set as an illumination capacity of each of the protrusion portions, and light intensity obtained by integrating the light which is emitted from the second end surface 11b in the upper left direction with the entirety of the lighting film is set as an illumination capacity of the lighting film, the illumination capacity of each of the protrusion portions and the illumination capacity of the lighting film is changed depending on an incident angle (elevation angle of the sun) of light to the lighting film or the aspect ratio of each of the protrusion portions. Since the elevation angle of the sun varies in time, if aspect ratios of all of the protrusion portions are set to be equal as in the first embodiment, the illumination capacity of each of the protrusion portions varies in time. Thus, the illumination capacity of the lighting film also varies in time. If the plurality types of protrusion portions which have different aspect ratios from each other are mixed with each other in the lighting film, the illumination capacity of each of the protrusion portions varies in time, but the plurality of protrusion portions includes protrusion portions which causes the illumination capacity to be increased or decreased. Thus, if the illumination capacity of these protrusion portions is averaged, the illumination capacity of the lighting film does not vary largely in time.

That is, if an incident angle is changed from θα to θβ, the width of an area in which light beams are emitted in the upper left direction becomes larger (Aα<Aβ), and an amount of the light beams which are emitted in the upper left direction also becomes larger in the protrusion portion having a width w and a height h. Meanwhile, the width of the area in which light beams are emitted in the upper left direction becomes smaller (Aα>Aβ), and the amount of the light beams which are emitted in the upper left direction also becomes smaller in the protrusion portion having a width w' and a height h. When the aspect ratio is fixed, the illumination capacity of the protrusion portion is equally increased or decreased depending on an incident angle (elevation angle of the sun) to the lighting film, that is, time and direction. However, illumination capacity is averaged by mixing the plurality types of protrusion portions which have different aspect ratios from each other and thus it is possible to provide a lighting film in which the illumination capacity does not vary largely in time.

As described above, according to the lighting film 2 of this embodiment and a window pane using the lighting film 2, even though the elevation angle of the sun fluctuates, the illumination capacity of the lighting film 2 does not vary largely as much as in the first embodiment.

For this reason, there is provided a lighting film and a window pane in which illumination capacity are unlikely to fluctuate largely in a time zone or a season.

Third Embodiment

Figure 10:
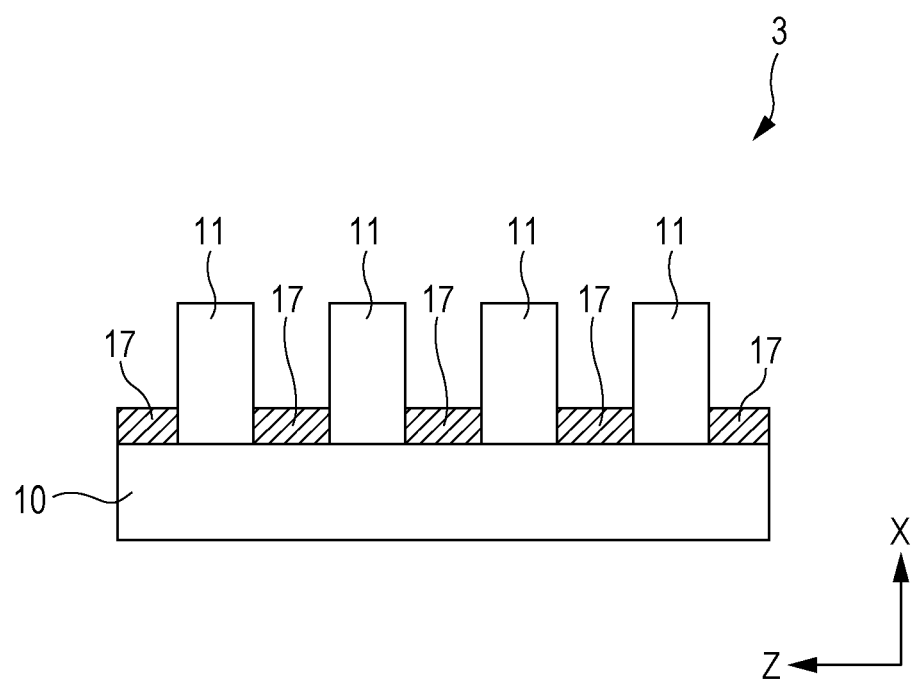
FIG. 10 is a partial cross-sectional view of a lighting film according to a third embodiment.

FIG. 10 is a partial cross-sectional view of a lighting film 3 according to a third embodiment.

In this embodiment, the same components as those in the first embodiment are denoted by the same reference signs and detailed descriptions thereof will be omitted.

This embodiment is different from the first embodiment in that an ultraviolet light blocking layer 17 is formed in an area other than the formation area of the protrusion portions 11 on one surface of the base member 10. The ultraviolet light blocking layer 17 causes visible light to transmit through the ultraviolet light blocking layer 17 and causes ultraviolet light to be blocked. The ultraviolet light blocking layer 17 corresponds to a member that is formed on the one surface of the base member 10 and has light-transmitting properties, and the ultraviolet light blocking layer 17 is exposed in the area other than the formation area of the protrusion portions 11 on the one surface of the base member 10.

As the ultraviolet light blocking layer 17, any of an organic film and an inorganic film may be used. The ultraviolet light blocking layer 17 blocks the ultraviolet light which is used in a formation process (exposure processing) of the protrusion portion 11 and causes the visible light to transmit therethrough. Visible light transmittance (total light transmittance of light beams with wavelengths 380 nm to 750 nm) of the ultraviolet light blocking layer 17 is preferably equal to or more than 90% in accordance with the standard of JIS K7361-1. With this, it is possible to obtain sufficient transparency.

A layer thickness of the ultraviolet light blocking layer 17 is set to be smaller than the height (height from the first end surface to the second end surface) of the protrusion portion 11. In a case of this embodiment, the layer thickness of the ultraviolet light blocking layer 17 is about 150 nm as an example, and the height of the protrusion portion 11 is about 75 μm as an example. Accordingly, in a gap between the plurality of protrusion portions 11, the ultraviolet light blocking layer 17 is at a part coming into contact with the one surface of the base member 10 and the air is at other parts.

The lighting film 3 is used as a portion of a window pane adhering to one surface of a glass substrate, similarly to the first embodiment.

FIGS. 11A to 11D are diagrams illustrating an example of a manufacturing method of the lighting film 3.

Figure 11A:
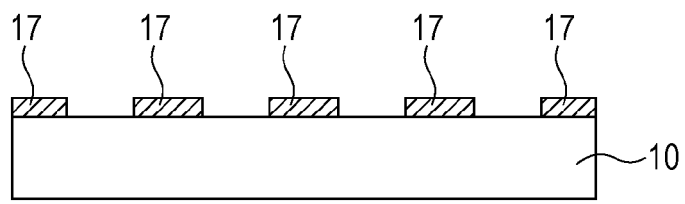
FIG. 11A is a diagram illustrating an example of a manufacturing method of the lighting film.

First, as illustrated in FIG. 11A, the ultraviolet light blocking layer 17 is formed on the one surface of the base member 10.

Figure 11B:
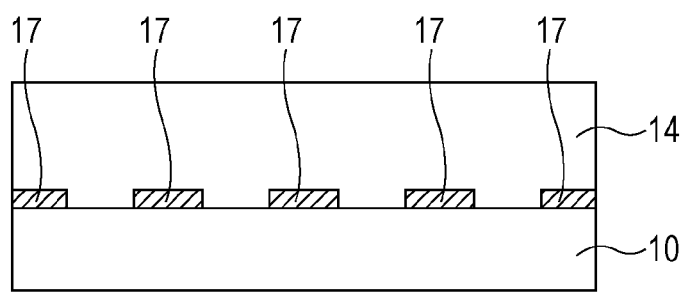
FIG. 11B is a diagram illustrating the example of a manufacturing method of the lighting film.

Next, as illustrated in FIG. 11B, the resist layer 14 which is for cover the base member 10 and the ultraviolet light blocking layer 17 and is made of a transparent negative photoresist is formed.

Figure 11C:
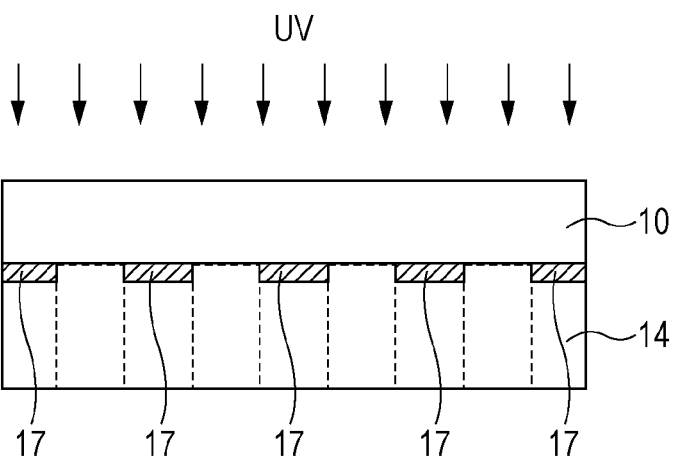
FIG. 11C is a diagram illustrating the example of a manufacturing method of the lighting film.

Next, as illustrated in FIG. 11C, exposure processing is performed by applying ultraviolet light UV from an opposite side to a side of the base member 10 on which the resist layer 14 is formed, using the ultraviolet light blocking layer 17 as a mask.

As the ultraviolet light UV, light (non-diffusion light) which is parallel with the normal direction of the base member 10 is used.

Figure 11D:
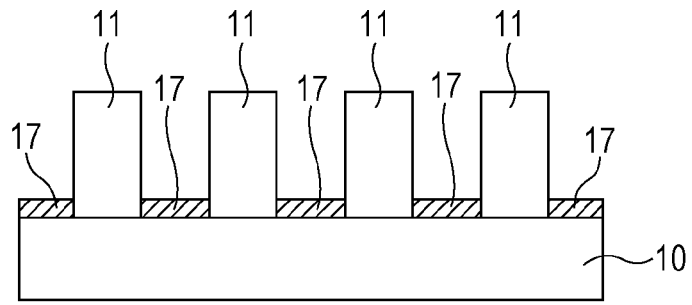
FIG. 11D is a diagram illustrating the example of a manufacturing method of the lighting film.

Next, as illustrated in FIG. 11D, the resist layer 14 is developed by using developer and the developed resist layer 14 is cured through heating processing. In this manner, the protrusion portions 11 which are made of the transparent negative photoresist are formed.

As described above, according to the lighting film 3 of this embodiment and a window pane using the lighting film 3, since the ultraviolet light blocking layer 17 is formed on the base member 10, it is possible to block a portion of the ultraviolet light including in external light by using the ultraviolet light blocking layer 17. Since the protrusion portion 11 is formed in a self-alignment manner, using the ultraviolet light blocking layer 17 as a mask, manufacturing is easy.

Fourth Embodiment

Figure 12A:
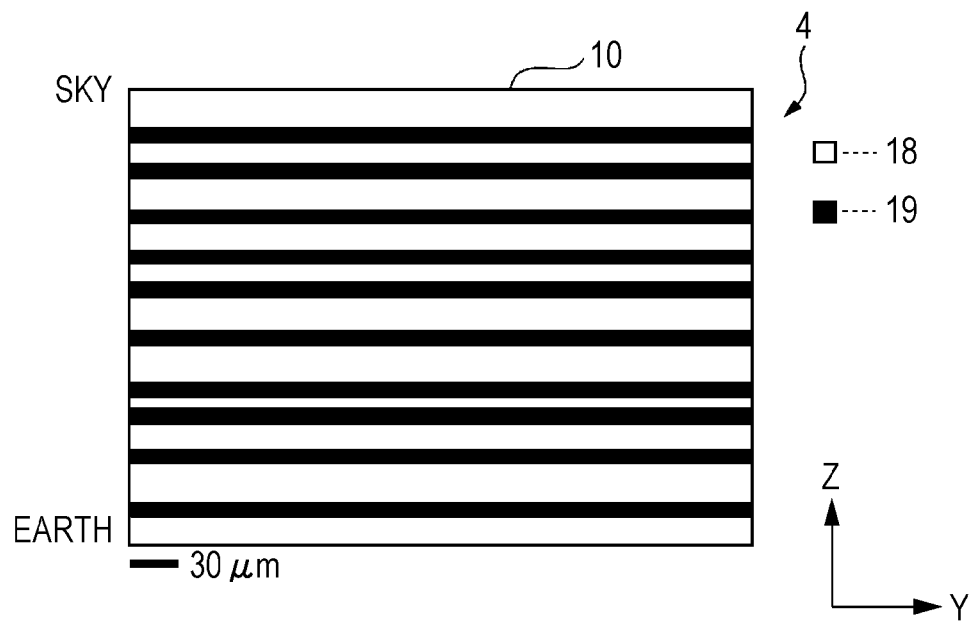
FIG. 12A is a plan view illustrating a planar shape of a protrusion portion and a spaced portion.
Figure 12B:
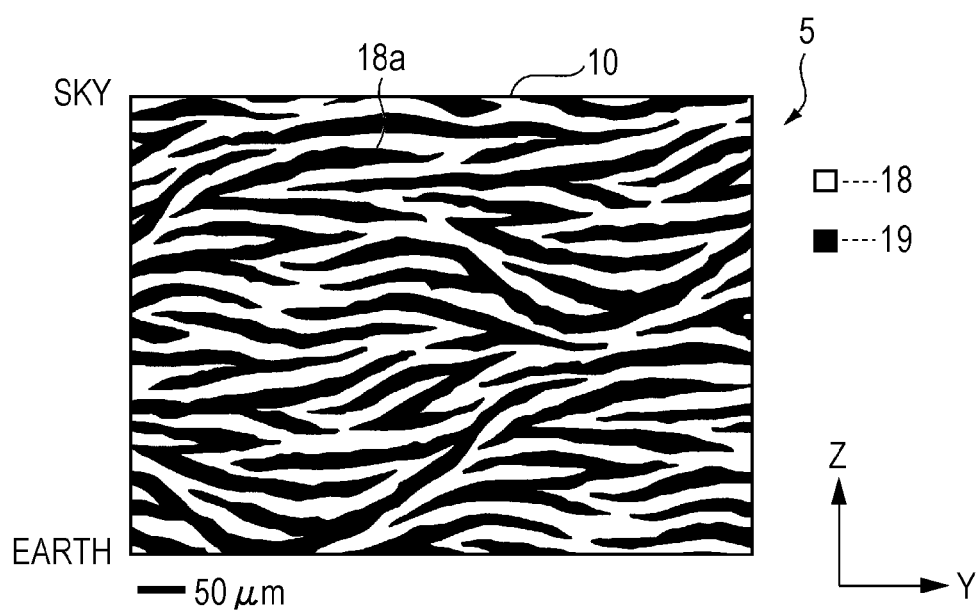
FIG. 12B is a plan view illustrating a planar shape of a protrusion portion and a spaced portion.
Figure 12C:
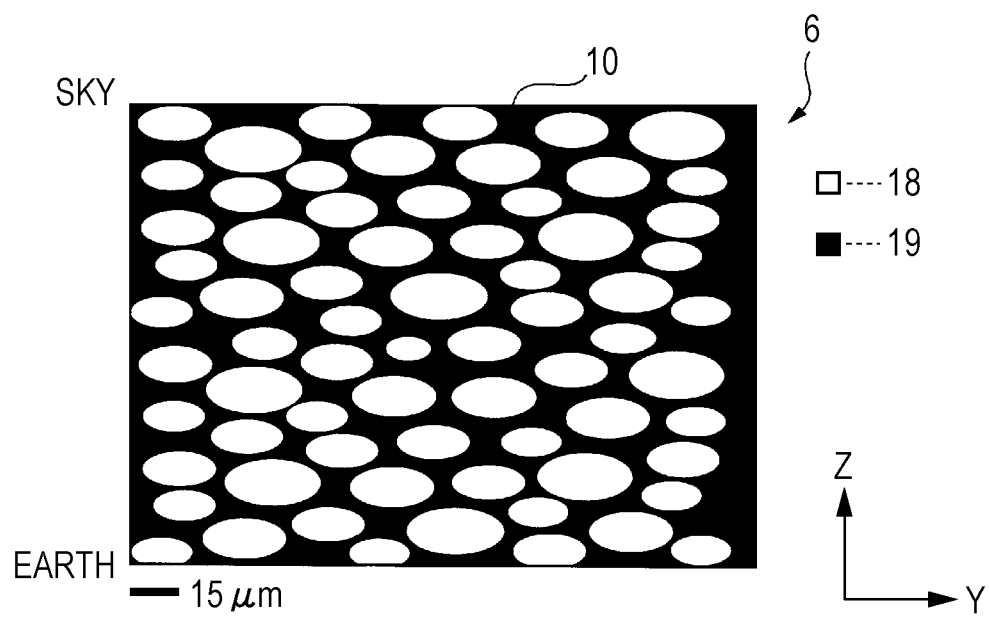
FIG. 12C is a plan view illustrating a planar shape of a protrusion portion and a spaced portion.

FIGS. 12A to 12C are plan views illustrating variations of a planar shape of the protrusion portion and a spaced portion.

These variations may be applied to the configuration of the lighting films, the web rolls of the lighting film, and the window panes according to the first to third embodiments.

In FIGS. 12A to 12C, the reference sign of 18 represents the protrusion portion and the reference sign of 19 represents the spaced portion. However, the reference sign of 18 may represent the spaced portion, and the reference sign of 19 may represent the protrusion portion.

In this embodiment, the same components as those in the first embodiment are denoted by the same reference signs and detailed descriptions thereof will be omitted.

FIG. 12A illustrates an example in which the protrusion portion 18 and the spaced portion 19 are formed to have a strip shape which has the Y direction as a longitudinal direction. In FIG. 12A, the width of the gap portion 19 between the protrusion portions 18 is constant, but the width of the protrusion portion 18 is random. In this lighting film 4, the same effect as described in the second embodiment is obtained.

FIG. 12B illustrates an example in which a plurality of spaced portions 19 are formed to be in a state of being irregularly bent or being ramified such as branches of a tree. In this example, for example, a transparent resist layer which is a material of the protrusion portion 18 is formed on the entire surface of the base member 10. A plurality of opening portions are formed on this resist layer and the opening portion is full with a gas such as the air. Thus, the protrusion portion 18 and the gap portion 19 are formed.

A lighting film 5 in FIG. 12B includes a base member 10 which has light-transmitting properties, a protrusion portion 18 which has light-transmitting properties is formed on one surface of the base member 10, a plurality of opening portions 18a which are formed on the protrusion portion 18 to be adjacent to each other, and the gap portion 19 which is formed on the opening portion 18a. In the protrusion portion 18, a first end surface on the base member 10 side or a second end surface on an opposite side to the base member 10 is configured as a light incidence end surface, and a side surface of the opening portion 18a which comes into contact with the gap portion 19 is configured as a reflective surface for totally reflecting light which is incident from the light incidence end surface. The base member 10 or a member (for example, the ultraviolet light blocking layer 17 illustrated in FIG. 10, and the like) which is formed on one surface of the base member 10 and has light-transmitting properties is exposed in the opening portion 18a.

Each of the plurality of opening portions 18a (gap portion 19) substantially has one direction as a longitudinal direction and the one direction is disposed in a direction parallel with one side of the base member 10 which has a rectangular shape. The lighting film 5 adheres to the one surface of the glass substrate such that a direction orthogonal to the one direction is a vertical direction. Thus, the glass substrate and the lighting film 5 adhering to the one surface of the glass substrate constitute a window pane. The one direction is disposed in a direction parallel with one side of the glass substrate having a rectangular shape. In this example, light which is incident from the upper part of the lighting film 5 may also be divided into two beams, and one light beam may illuminate the ceiling or the innermost part of a house and another beam may illuminate a position in the vicinity of a window in the house. Accordingly, it is possible to illuminate the entirety of the inside of a house brightly by dispersing light which is incident to the lighting film 5.

Here, "each of the plurality of opening portions substantially having one direction as the longitudinal direction" means the followings, for example. That is, light which is isotropically diffused, such as fluorescence is incident into the base member 10 from an opposite side to a side on which the protrusion portions 18 of the base member 10 are formed, and pole corner luminance distribution of light which is emitted outwardly in the plurality of the protrusion portions 18 is measured. At this time, a case where there are a direction in which luminance of light which is emitted from the plurality of protrusion portions 18 is relatively high and a direction in which the luminance of light is relatively low is referred to as "the opening portion having substantially one direction as a longitudinal direction". A direction orthogonal to the direction in which the luminance is relatively high is defined as the "one direction".

The lighting film 5 in FIG. 12B is manufactured by using a web roll for a lighting film obtained by winding a long lighting film. The lighting film 5 is manufactured by cutting the long wound lighting film from the web roll to be a predetermined shape. In this case, the one direction (longitudinal direction of the opening portion 18a) is preferably disposed in a direction which is parallel with or orthogonal to the longitudinal direction of the long lighting film. According to this configuration, the lighting film is cut over the full width in a width direction which is orthogonal to the longitudinal direction of the lighting film, and thus the rectangular lighting film 5 may be cut off. Since the long lighting film may not be required to be cut off aslant, it is possible to use the long lighting film without waste.

FIG. 12C illustrates an example in which the shape of the protrusion portion 18 has one direction as a major axis. In FIG. 12C, the shape of the protrusion portion 18 is ellipse, but the shape of the protrusion portion 18 is not limited thereto.

The shape of the protrusion portion 18 may be others such as a rectangle and a lozenge. The lighting film 6 adheres to the glass substrate of the window pane such that a direction orthogonal to a major axis direction of the protrusion portion 18 is the vertical direction. In this example, light which is incident from an upper part of the lighting film 6 may also be divided into two beams, and one light beam may illuminate the ceiling or the innermost part of a house and another beam may illuminate a position in the vicinity of a window in the house. Accordingly, it is possible to illuminate the entirety of the inside of a house brightly by dispersing light which is incident to the lighting film 6.

Fifth Embodiment

FIGS. 13A to 13G are cross-sectional view illustrating variations of a cross-sectional shape of the protrusion portion 11.

These variations may be applied to the configuration of the lighting films, the web rolls of the lighting film, and the window panes according to the first to fourth embodiments.

In FIGS. 13A to 13G, an upper side on a surface of a paper is set to be a vertically upward, and a lower side on the surface of a paper is set to be a vertically downward. The protrusion portion 11 is formed to have a strip shape which has a constant width in a depth direction of the paper which is a horizontal direction.

In this embodiment, the same components as those in the first embodiment are denoted by the same reference signs and detailed descriptions thereof will be omitted.

Figure 13A:
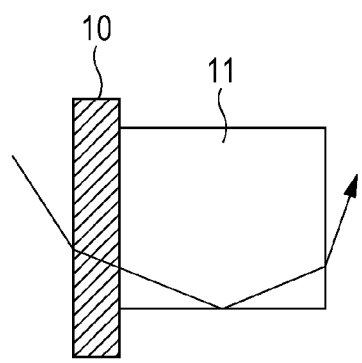
FIG. 13A is a cross-sectional view illustrating a cross-sectional shape of a protrusion portion.

FIG. 13A illustrates an example in which a cross-sectional shape of the protrusion portion 11 is rectangular. In this example, since the side surface of the protrusion portion 11 is parallel with the normal direction of the base member 10, transmittance of light which travels in the normal direction of the base member 10 becomes the highest. Thus, when a scene in the outside is observed through the lighting film, transparency becomes the highest.

Figure 13B:
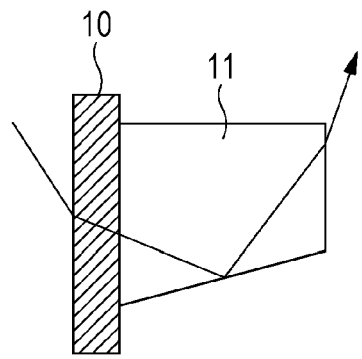
FIG. 13B is a cross-sectional view illustrating a cross-sectional shape of a protrusion portion.

FIG. 13B illustrates an example in which the cross-sectional shape of the protrusion portion 11 is trapezoid. The side surface of the protrusion portion 11 on the upper side of the surface of the paper is a horizontal surface which is parallel with the normal direction of the base member 10. However, the side surface of the protrusion portion 11 on the lower side of the surface of the paper is an inclined surface to the normal direction of the base member 10. Light which is incident to an end surface of the protrusion portion 11 on the base member 10 side is reflected to the inclined surface and is guided to the ceiling or the innermost part of a house.

The inclined surface which reflects external light is inclined to the ceiling side, and thus an emission angle of light which is emitted from the protrusion portion may be larger than that in the example of FIG. 13A.

Figure 13C:
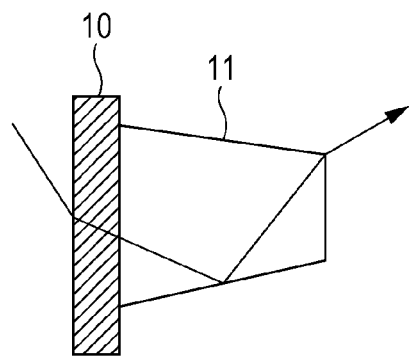
FIG. 13C is a cross-sectional view illustrating a cross-sectional shape of a protrusion portion.

FIG. 13C illustrates an example in which the cross-sectional shape of the protrusion portion 11 is trapezoid, but the example of FIG. 13C is different from the example of FIG. 13B in that the side surface of the protrusion portion 11 on the upper side of the surface of the paper is inclined to an opposite side to the ceiling side. If the side surface of the protrusion portion 11 on the lower side of the surface of the paper is inclined, light which has been reflected by the side surface of the protrusion portion 11 on the lower side of the surface of the paper is not reflected by the side surface of the protrusion portion 11 on the upper side of the surface of the paper and is emitted outwardly from the side surface on upper side of the surface of the paper as it is in some cases. In this case, since the side surface of the protrusion portion 11 on the upper side of the surface of the paper is inclined to the opposite side to the ceiling side, a traveling direction of the light becomes closely horizontal. Thus, a proportion of light which illuminates the ceiling becomes smaller, and a proportion of light which is directed toward the innermost part of a house becomes larger.

Figure 13D:
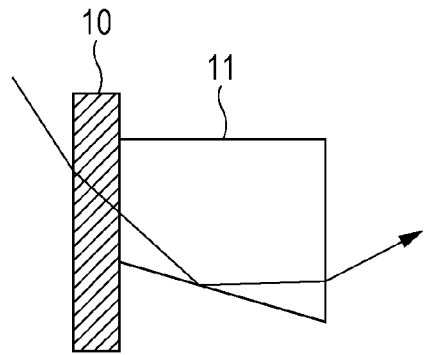
FIG. 13D is a cross-sectional view illustrating a cross-sectional shape of a protrusion portion.

FIG. 13D illustrates an example in which the cross-sectional shape of the protrusion portion 11 is trapezoid, but the example of FIG. 13D is different from the example of FIG. 13B in that the side surface of the protrusion portion 11 on the lower side of the surface of the paper is inclined to the lower side of the surface of the paper (opposite side to the ceiling side). In this example, since the inclined surface (reflective surface) is inclined to the opposite side to the ceiling side, a proportion of light which is directed toward the ceiling side is smaller than that in the example of FIG. 13A, and a proportion of the light which is directed toward the innermost part of a house is larger than that in the example of FIG. 13A.

Figure 13E:
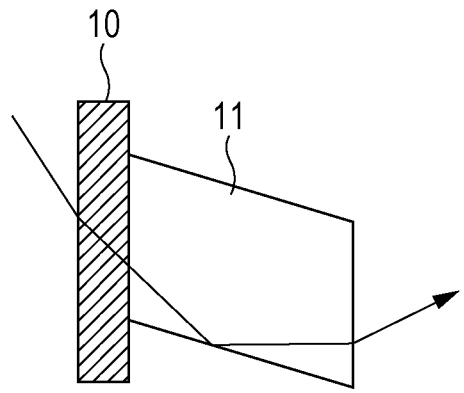
FIG. 13E is a cross-sectional view illustrating a cross-sectional shape of a protrusion portion.

FIG. 13E illustrates an example in which the cross-sectional shape of the protrusion portion 11 is a parallelogram. Two side surfaces of the protrusion portion 11 are inclined surfaces to the normal direction of the base member 10. The inclined surface (reflective surface) is inclined toward the opposite side to the ceiling. For this reason, similarly to the example in FIG. 13D, a proportion of light which is directed toward the ceiling side becomes smaller, and a proportion of the light which is directed toward the innermost part of a house becomes larger.

Figure 13F:
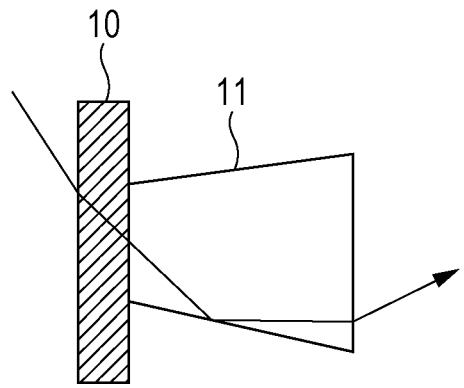
FIG. 13F is a cross-sectional view illustrating a cross-sectional shape of a protrusion portion.

FIG. 13F illustrates an example in which the shape of the protrusion portion is trapezoid. Any of the two side surfaces of the protrusion portion 11 is an inclined surface, but an inclination direction of the inclined surface is opposite to that in the example of FIG. 13C. In this example, similarly to the example of FIG. 13D, a proportion of light which is directed toward the ceiling side becomes smaller, and a proportion of the light which is directed toward the innermost part of a house becomes larger.

Figure 13G:
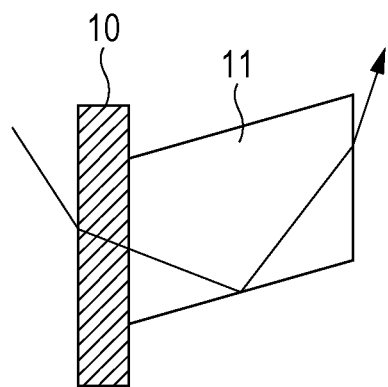
FIG. 13G is a cross-sectional view illustrating a cross-sectional shape of a protrusion portion.

FIG. 13G illustrates an example in which the cross-sectional shape of the protrusion portion 11 is a parallelogram, but an inclination direction of the two side surfaces of the protrusion portion is opposite to that in the example of FIG. 13E. In this example, since the side surface of the protrusion portion 11 on the lower side of the surface of the paper is inclined to the ceiling side, similarly to the example of FIG. 13B, an emission angle of light which is emitted from the protrusion portion may be increased.

Sixth Embodiment

FIGS. 14A to 14D are cross-sectional views illustrating variations of a using pattern of the lighting film.

These variations may be applied to the configuration of the lighting films, the web rolls of the lighting film, and the window panes according to the first to fifth embodiments.

In this embodiment, a surface on the protrusion portion side based on the interposed base member among front and back surfaces of the lighting film is set to be a first surface, and a surface on an opposite side to the protrusion portion is set to be a second surface.

In this embodiment, the same components as those in the first embodiment are denoted by the same reference signs and detailed descriptions thereof will be omitted.

Figure 14A:
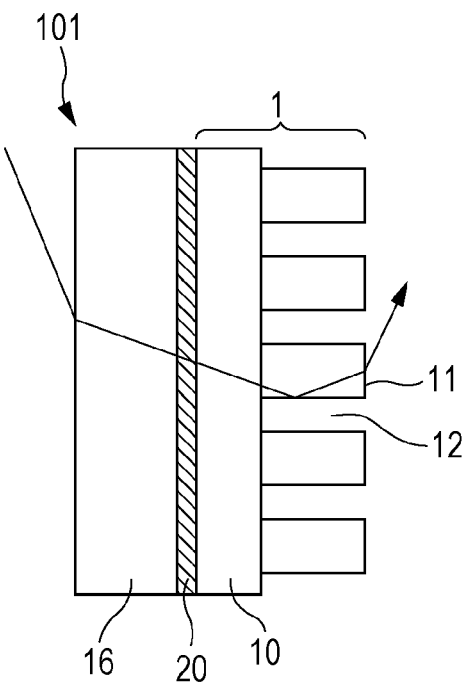
FIG. 14A is a cross-sectional view illustrating a using pattern of the lighting film.

FIG. 14A illustrates an example in which the second surface of the lighting film 1 is bonded to a surface of the glass substrate 16 on the inward side through a bonding layer 20. The lighting film 1 adheres to the one surface of the glass substrate 16 so as to be directed toward the outside as which a side of the base member 10 on which the protrusion portions 11 are formed is set. A window pane 101 is formed by the lighting film 1 and the glass substrate 16.

Figure 14B:
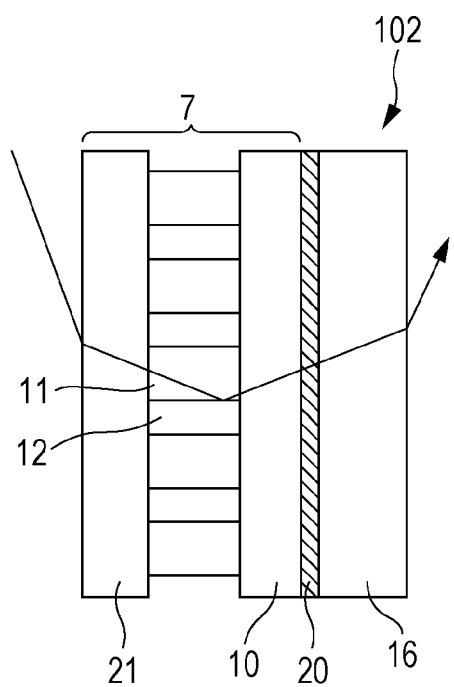
FIG. 14B is a cross-sectional view illustrating a using pattern of the lighting film.

FIG. 14B illustrates an example in which the second surface of a lighting film 7 is bonded to a surface of the glass substrate 16 on the outward side through the bonding layer 20. In the lighting film 7, a protective film 21 having light-transmitting properties is provided on an opposite side to the base member 10 with the protrusion portion 11 interposed between the protective film 21 and the base member 10. The lighting film 7 adheres to the one surface of the glass substrate 16 so as to be directed toward the outside as which a side of the base member 10 on which the protrusion portions 11 are formed is set. A window pane 102 is formed by the lighting film 7 and the glass substrate 16. In this configuration, the protective film 21 covers an upper part of the protrusion portion 11. For this reason, attaching contaminants to the gap portion 12 and deteriorating performance of the lighting film 7 are suppressed.

Figure 14C:
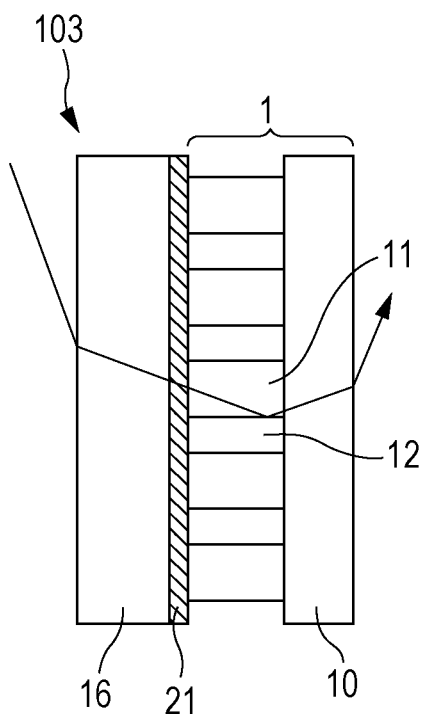
FIG. 14C is a cross-sectional view illustrating a using pattern of the lighting film.

FIG. 14C illustrates an example in which the first surface of the lighting film 1 is bonded to a surface of the glass substrate 16 on the inward side through the bonding layer 20. A window pane 103 is formed by the lighting film 1 and the glass substrate 16. In this configuration, the protrusion portion 11 is interposed between the glass substrate 16 and the base member 10. For this reason, attaching contaminants to the gap portion 12 and deteriorating performance of the lighting film 1 are suppressed.

Figure 14D:
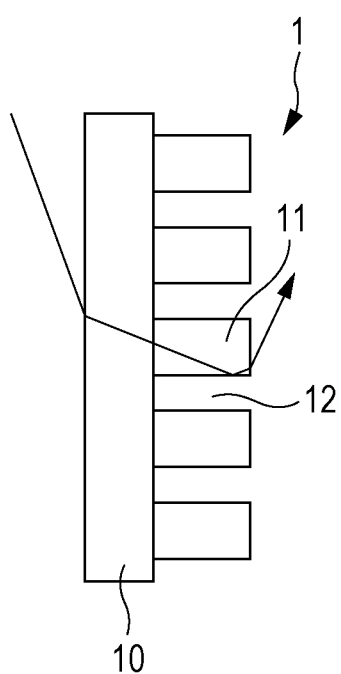
FIG. 14D is a cross-sectional view illustrating a using pattern of the lighting film.

FIG. 14D illustrates an example in which the lighting film 1 does not adhere to the glass substrate and is used as a lighting film singleton. The lighting film 1 is used by being hung on a window like a blind curtain only when it is necessary. When it is not necessary, the lighting film 1 is wounded to have a roll shape and is disposed on an upper part of the window, in order to get out of the light.

Seventh Embodiment

Figure 15:
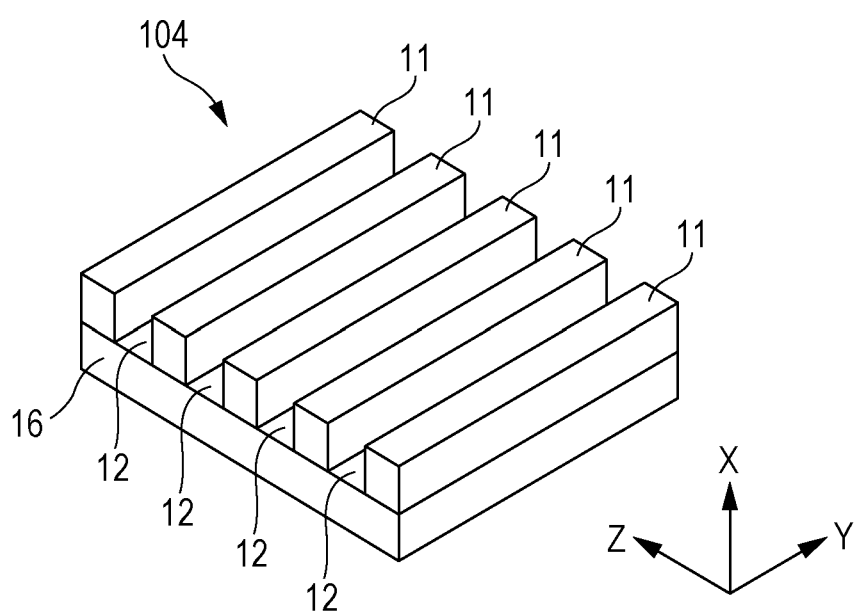
FIG. 15 is a partial perspective view of a window pane according to a seventh embodiment.

FIG. 15 is a partial perspective view of a window pane 104 according to a seventh embodiment.

In this embodiment, the same components as those in the first embodiment are denoted by the same reference signs and detailed descriptions thereof will be omitted.

In the window pane 104 according to this embodiment, a lighting film including protrusion portions does not adhere to the glass substrate 16, but the protrusion portions 11 are directly formed on the glass substrate 16.

That is, the window pane 104 according to this embodiment includes the glass substrate 16, the plurality of protrusion portions 11 which have light-transmitting properties and are formed on the one surface of the glass substrate 16 to be adjacent to each other, and a gap portion 12 which is formed between the protrusion portions 11.

In the protrusion portion 11, the first end surface on the glass substrate 16 side or a second end surface on an opposite side to the glass substrate 16 is configured as a light incidence end surface, and a side surface which comes into contact with the gap portion 12 is configured as a reflective surface for totally reflecting light which is incident from the light incidence end surface. The glass substrate 16 or a member (for example, the ultraviolet light blocking layer 17 illustrated in FIG. 10, and the like) which is formed on one surface of the glass substrate 16 and has light-transmitting properties is exposed in the gap portion 12.

Each of the plurality of protrusion portions 11 substantially has one direction as a longitudinal direction. The one direction is disposed in a direction parallel with one side of the glass substrate 16 which has a rectangular shape. In a case of this embodiment, each of the plurality of protrusion portions 11 is configured as a strip protrusion portion which is extended in the Y direction and has a constant width, but the structure of the protrusion portion 11 is not limited thereto.

For example, in this embodiment, the plurality of protrusion portions 11 which are separated from each other are formed on the glass substrate 16. However, as illustrated in FIG. 12B, the protrusion portions 11 may be formed on the entire surface of the glass substrate 16 to be continuous. For example, a transparent resist layer which is a material of the protrusion portion 11 is formed on the entire surface of the glass substrate 16. A plurality of opening portions are formed on this resist layer and the opening portion is full with a gas such as the air. Thus, the protrusion portion 11 and the gap portion 12 may be formed.

Such a window pane includes the glass substrate 16, the protrusion portion 11 which has light-transmitting properties and is formed on the one surface of the glass substrate 16, a plurality of opening portions which are formed on the protrusion portion 11 to be adjacent to each other, and the gap portion 12 which is formed on the opening portion.

In this case, in the protrusion portion 11, a first end surface on the glass substrate 16 side or a second end surface on an opposite side to the glass substrate 16 is configured as a light incidence end surface, and a side surface of the opening portion which comes into contact with the gap portion 12 is configured as a reflective surface for totally reflecting light which is incident from the light incidence end surface. The glass substrate 16 or a member (for example, the ultraviolet light blocking layer 17 illustrated in FIG. 10, and the like) which is formed on one surface of the glass substrate 16 and has light-transmitting properties is exposed in the gap portion 12. In this case, in order to reflect external light with high efficiency by directing external light to the ceiling in a house, each of the plurality of opening portions substantially has one direction as a longitudinal direction and the one direction is desired to be disposed in a direction parallel with one side of the glass substrate 16 which has a rectangular shape.

In addition to this, structures described in the above-described first to fifth embodiments may be applied to the structure of the protrusion portion 11.

Since the window pane 104 according to this embodiment does not have a base member which corresponds to a base of the protrusion portion 11, transparency is higher than that of the window pane 100 according to the first embodiment. Since the protrusion portions 11 are directly formed on the glass substrate 16, a process of causing the lighting film to adhere to the glass substrate 16 is not required and thus reduction in the number of members or simplification of manufacturing processes is obtained.

Eighth Embodiment

Figure 16A:
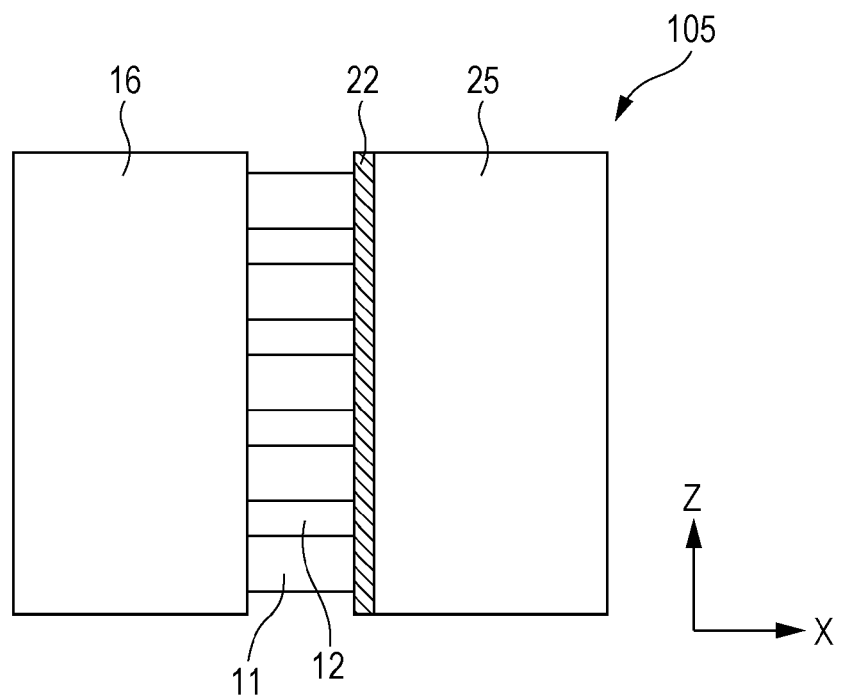
FIG. 16A is a cross-sectional view illustrating a configuration of the window pane.
Figure 16B:
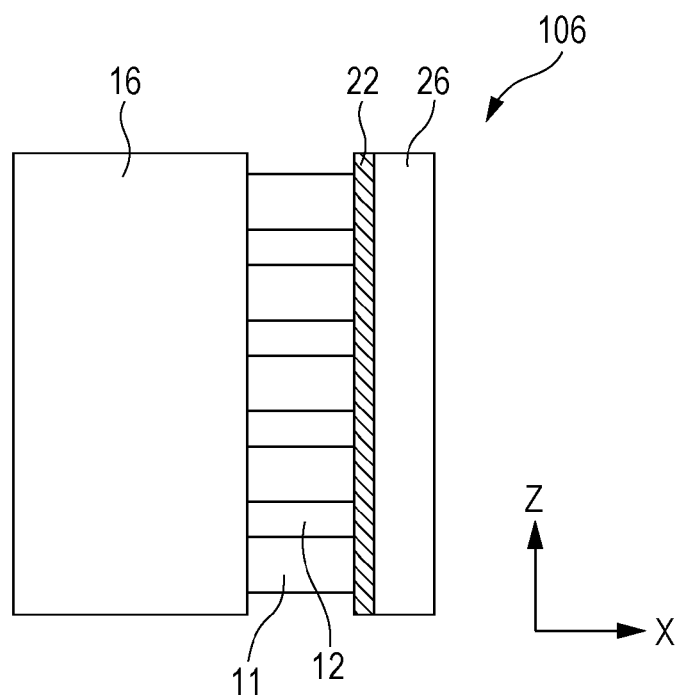
FIG. 16B is a cross-sectional view illustrating a configuration of the window pane.

FIGS. 16A and 16B are cross-sectional views illustrating variations of a configuration of a window pane.

These variations may be applied to the configuration of the window pane according to the above-described seventh embodiment.

In this embodiment, the same components as those in the seventh embodiment are denoted by the same reference signs and detailed descriptions thereof will be omitted.

FIG. 16A illustrates an example in which a nonflexible protective substrate 25 is provided on an opposite side to the glass substrate 16 with the protrusion portion 11 interposed between the protective substrate 25 and the glass substrate 16 through the bonding layer 22. As the protective substrate 25, a resin substrate, a glass substrate, or the like which has light-transmitting properties is used. A window pane 105 is configured by the glass substrate 16, the protrusion portion 11, and the protective substrate 25.

FIG. 16B illustrates an example in which a flexible protective film 26 is provided on the opposite side to the glass substrate 16 with the protrusion portion 11 interposed between the protective substrate 25 and the glass substrate 16 through the bonding layer 22. As the protective film 26, a resin film having light-transmitting properties is used. A window pane 106 is configured by the glass substrate 16, the protrusion portion 11, and the protective film 26.

In examples of FIGS. 16A and 16B, the protective substrate 25 or the protective film 26 which corresponds to a protective member covers an upper part of the protrusion portions 11. For this reason, attaching contaminants to the gap portion 12 and deteriorating lighting performance of the window pane are suppressed.

Ninth Embodiment

Figure 17A:
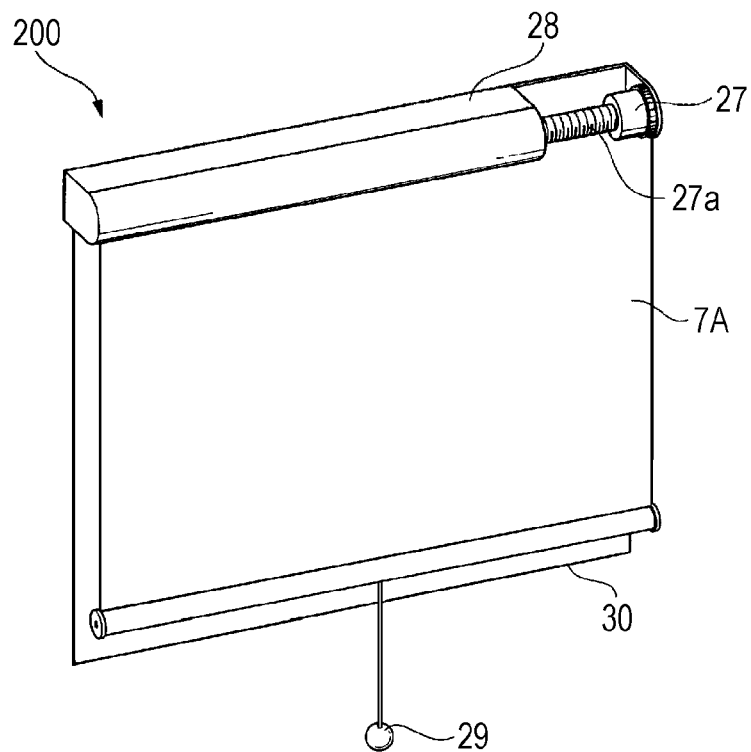
FIG. 17A is a schematic configuration diagram of a roll screen 200 according to a ninth embodiment.
Figure 17B:
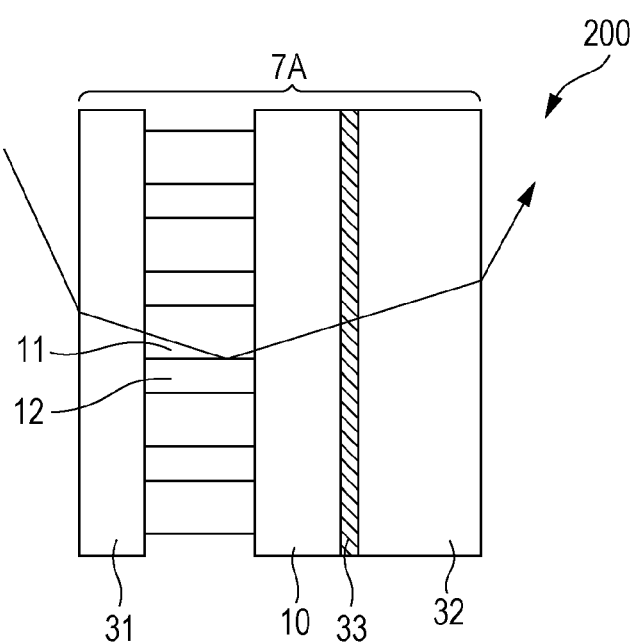
FIG. 17B is a schematic cross-sectional view of the roll screen 200 according to the ninth embodiment.

FIG. 17A is a perspective view of a roll screen 200 according to a ninth embodiment. FIG. 17B is a partial cross-sectional view of a lighting film 7A which is used in the roll screen 200.

In this embodiment, the same components as those in the first embodiment are denoted by the same reference signs and detailed descriptions thereof will be omitted.

As illustrated in FIG. 17A, the roll screen 200 includes the lighting film 7A, a winding mechanism 27 which winds the lighting film 7A around a shaft center 27a, and an accommodation portion 28 which accommodates the shaft center 27a and the winding mechanism 27.

The accommodation portion 28 is installed on an upper part of a window 30. The wound lighting film 7A in the accommodation portion 28 is pulled out by drawing a cord 29 which is attached to a lower end portion of the lighting film 7A, downwardly. In this embodiment, the winding mechanism 27 is a pulling cord type winding mechanism, but may be a chain type winding mechanism.

As illustrated in FIG. 17B, the lighting film 7A includes the base member 10 which has light-transmitting properties, the plurality of protrusion portions 11 which have light-transmitting properties and are formed on one surface of the base member 10 to be adjacent to each other, the gap portion 12 which is formed between the protrusion portions 11, a protective film 31 which has light-transmitting properties and is provided on the opposite side to the base member 10 with the plurality of protrusion portions 12 therebetween, and an interior film 32 which has light-transmitting properties and is provided on an opposite side to a side on which the plurality of protrusion portions 11 are formed with the base member 10 interposed therebetween.

The interior film 32 is a film having a pattern or an ornament. It is possible to provide a lighting film having excellent designability by stacking the base member 10 on which the protrusion portions 11 are formed, on such an interior film 32. The interior film 32 is bonded to the base member 33 by the bonding layer 33, but may be bonded to the protective film 31.

Tenth Embodiment

Figure 18A:
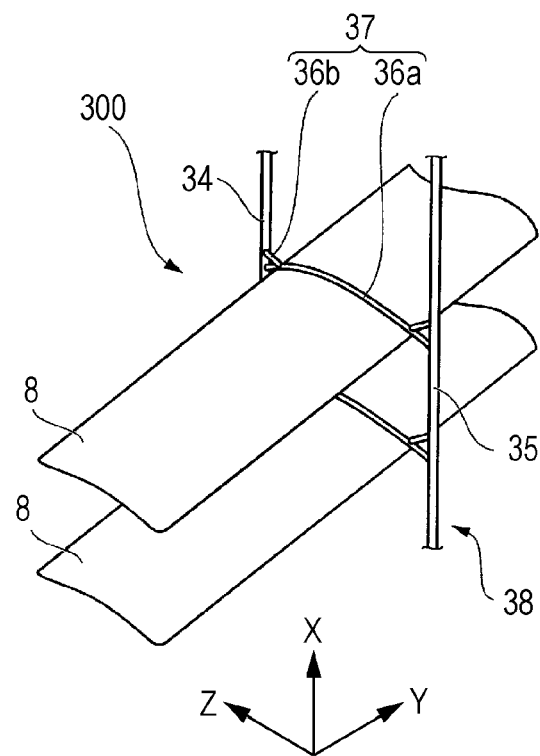
FIG. 18A is a partial perspective view of a lighting louver according to a tenth embodiment.
Figure 18B:
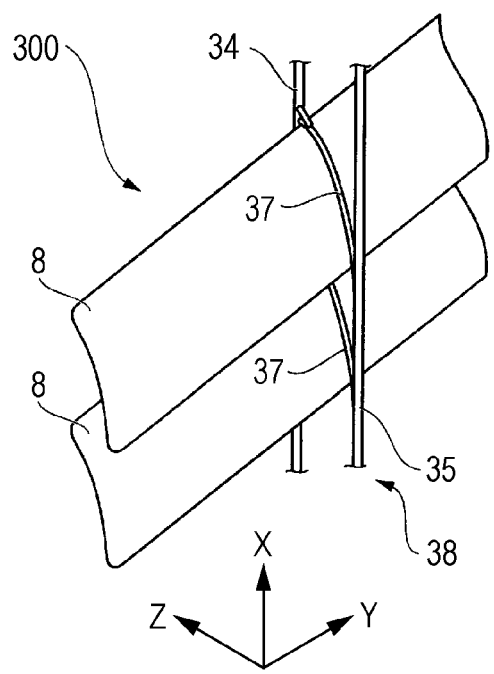
FIG. 18B is a partial perspective view of the lighting louver according to the tenth embodiment.

FIGS. 18A and 18B are partial perspective view of a lighting louver 300 according to a tenth embodiment.

FIG. 18A illustrates a state where the lighting film 8 is installed in a horizontal direction, and FIG. 18B illustrates a state where the lighting film 8 is tilted.

In this embodiment, the same components as those in the first embodiment are denoted by the same reference signs and detailed descriptions thereof will be omitted.

As illustrated in FIG. 18A, the lighting louver 300 includes a ladder cord 38 which is formed to be ladder-like, a plurality of lighting films 8 which have a band shape and are supported on the ladder cord 38 in an aligned state.

The ladder cord 38 includes two vertical cords 34 and 35 which hang both sides of the lighting film 8 in the width direction down, and a plurality of horizontal cords 37 which are horizontally stretched over the two vertical cords 34 and 35 at positions spaced with a predetermined interval therebetween in the vertical direction. A horizontal cord 37 is configured from a pair of cords 36a and 36b in which upper and lower surfaces of the lighting film 8 are put.

As illustrated in FIG. 18B, the horizontal cord 37 is tilted by pulling one of the two vertical cords 34 and 35 up and pulling another down. The lighting film 8 is supported on each of the plurality of horizontal cords 37 and thus the plurality of lighting films 8 are tiltably supported at a predetermined interval in the vertical direction.

Figure 19:
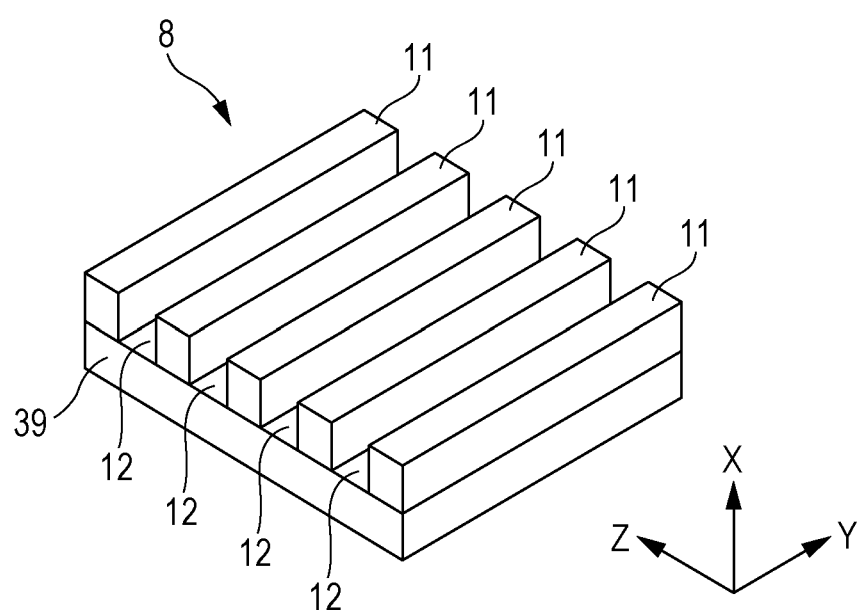
FIG. 19 is a partial perspective view of the lighting film used in the lighting louver.

FIG. 19 is a partial perspective view of the lighting film 8 which is used in the lighting louver 300.

The lighting film 8 includes a base member 39 which has light-transmitting properties, the plurality of protrusion portions 11 which have light-transmitting properties and are formed on the one surface of the base member 10 to be adjacent to each other, and the gap portion 12 which is formed between the protrusion portions 11.

As the base member 39, a member similar to the base member 10 in the first embodiment may be used. However, in order not to break a shape thereof when the ladder cord 38 causes lighting film 8 to be tilted, a film which has light-transmitting properties and rigidity to an extent of enabling a shape to be maintained is used as the base member 39. The base member 39 is elongatedly formed with a constant width in the Y direction.

Each of the plurality of protrusion portions 11 substantially has one direction as a longitudinal direction. The one direction may be disposed in a direction parallel with one side (long side) of the base member 39. In a case of this embodiment, each of the plurality of protrusion portions 11 is configured as a strip protrusion portion which is extended in the Y direction and has a constant width. However, the structure of the protrusion portion 11 is not limited thereto.

For example, in this embodiment, the plurality of protrusion portions 11 which are separated from each other are formed on the base member 39. However, as illustrated in FIG. 12B, the protrusion portions 11 may be formed on the entire surface of the base member 39 to be continuous. For example, a transparent resist layer which is a material of the protrusion portion 11 is formed on the entire surface of the base member 39. A plurality of opening portions are formed on this resist layer and the opening portion is full with a gas such as the air. Thus, the protrusion portion 11 and the gap portion 12 may be formed.

Such a lighting film 8 includes the base member 39, the protrusion portion 11 which has light-transmitting properties and is formed on the one surface of the base member 39, a plurality of opening portions which are formed on the protrusion portion 11 to be adjacent to each other, and the gap portion 12 which is formed on the opening portion.

In this case, in the protrusion portion 11, a first end surface on the base member 39 side or a second end surface on an opposite side to the base member 39 is configured as a light incidence end surface, and a side surface of the opening portion which comes into contact with the gap portion 12 is configured as a reflective surface for totally reflecting light which is incident from the light incidence end surface. The base member 39 or a member (for example, the ultraviolet light blocking layer 17 illustrated in FIG. 10, and the like) which is formed on one surface of the base member 39 and has light-transmitting properties is exposed in the gap portion 12. In this case, in order to reflect external light with high efficiency by directing external light to the ceiling in a house, each of the plurality of opening portions substantially has one direction as a longitudinal direction and the one direction is desired to be disposed in a direction parallel with one side (long side) of the base member 39 which has a rectangular shape.

In addition to this, structures described in the above-described first to fifth embodiments may be applied to the structure of the protrusion portion 11.

Figure 20A:
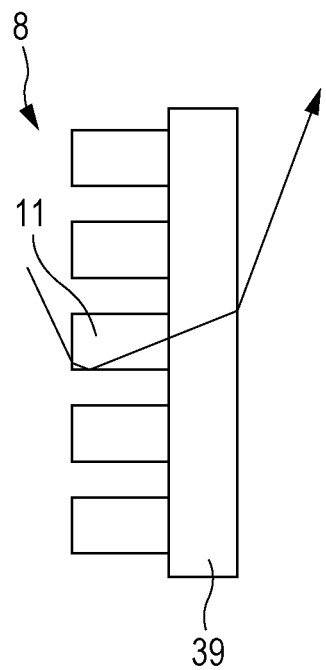
FIG. 20A is a diagram illustrating an action of the lighting louver.
Figure 20B:
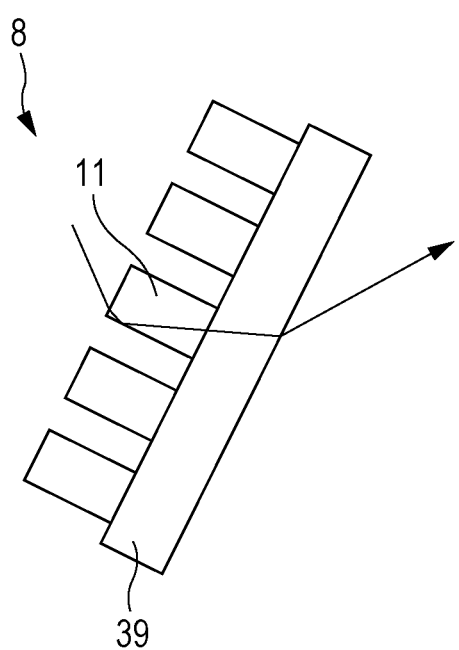
FIG. 20B is a diagram illustrating an action of the lighting louver.

FIGS. 20A and 20B are diagram illustrating an action of the lighting louver.

In FIGS. 20A and 20B, an upper side on a surface of a paper is set to be a vertically upward, and a lower side on the surface of a paper is set to be a vertically downward. The protrusion portion 11 is formed to have a strip shape which has a constant width in a depth direction of the paper which is a horizontal direction.

As illustrated in FIG. 20A, the side surface of the protrusion portion 11 on the lower side of the surface of the paper is disposed in the horizontal direction in a state where the lighting film 8 stands vertically. Thus, light which is incident to the lighting film 8 is reflected substantially in a direction of regular reflection and is emitted from the lighting film 8. Accordingly, the ceiling side is illuminated brightly.

As illustrated in FIG. 20B, the side surface of the protrusion portion 11 on the lower side of the surface of the paper is inclined to the lower side of the surface of the paper (opposite side to the ceiling side) in a state where the lighting film 8 is inclined diagonally. Thus, a proportion of light which is directed toward the ceiling side is smaller than that in the example of FIG. 20A, and a proportion of the light which is directed toward the innermost part of a house is larger than that in the example of FIG. 20A.

In this manner, it is possible to control a direction of light which is emitted from the lighting film 8 by controlling a slope of the lighting film 8. Accordingly, an occupant controls the direction of light appropriately in accordance with the size of a room, the size of a window, a time, the season, and the like, and thus it is possible to hold an illumination state in a house to be a good state constantly.

11th Embodiment

Figure 21A:
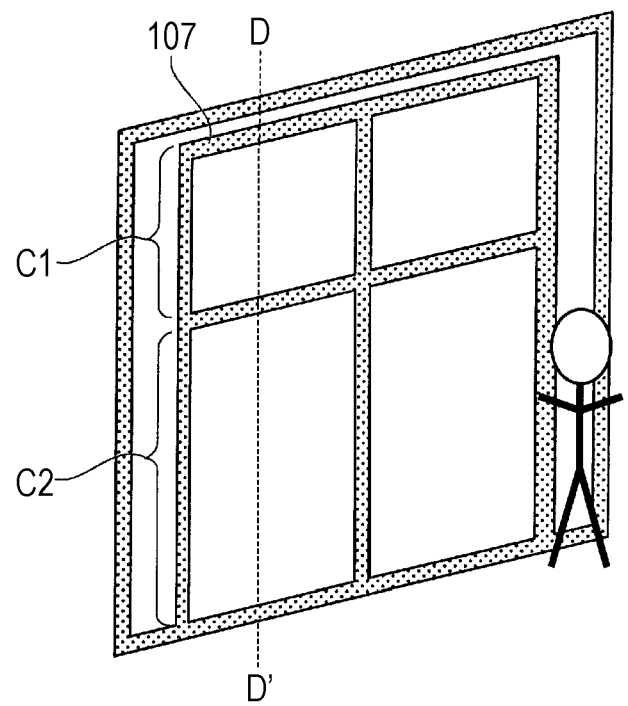
FIG. 21A is a schematic configuration diagram of a window pane according to an 11th embodiment.
Figure 21B:
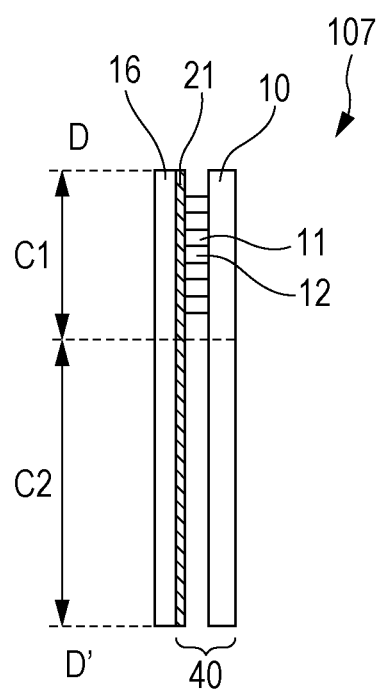
FIG. 21B is a schematic cross-sectional view of the window pane according to the 11th embodiment.

FIG. 21A is a perspective view of a window pane 107 according to an 11th embodiment. FIG. 21B is a cross-sectional view of the window pane 107 taken along line D-D' in FIG. 21A.

In this embodiment, the same components as those in the first embodiment are denoted by the same reference signs and detailed descriptions thereof will be omitted.

As illustrated in FIG. 21A, the window pane 107 is a large window pane which is higher than the height of a person. An area used generally when a person looks out a window is set to be C2 and an area C1 higher than the area C2 is mainly used as a lighting area. For this reason, in this embodiment, the protrusion portion of the lighting film is installed only on the area C1 in which a field of view of a person is not blocked.

As illustrated in FIG. 21B, a basic configuration of a lighting film 40 is the same as that of the lighting film 1 according to the first embodiment. A base member 10 of the lighting film 40 adheres to the entire surface of a glass substrate 16. However, protrusion portions 11 are disposed only in the area C1 and are not disposed in the area C2. Accordingly, a window pane which has transparency when a scene in the outside is observed through the lighting film becomes higher and excellent lighting properties, is made.

12th Embodiment

Figure 22:
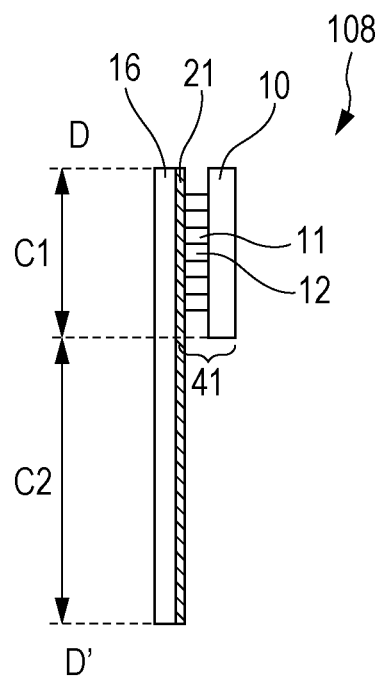
FIG. 22 is a cross-sectional view of a window pane according to a 12th embodiment.

FIG. 22 is a cross-sectional view of a window pane 108 according to a 12th embodiment.

In this embodiment, the same components as those in the 11th embodiment are denoted by the same reference signs and detailed descriptions thereof will be omitted.

This embodiment is different from the 11th embodiment in that the base member 10 is installed on the both of the area C1 and the area C2 and the protrusion portions 11 are installed only on the area C1 in the 11th embodiment, but in this embodiment, both of the base member 10 and the protrusion portion 11 are installed only on the area C1. That is, the lighting film 41 is installed only on the area C1.

In this embodiment, since the base member 10 is installed only on the area C1, cost of members is reduced compared to the 11th embodiment. Further, since the base member 10 is not installed on the area C2, transparency when a scene in the outside is observed through the lighting film becomes much higher.

13th Embodiment

Figure 23:
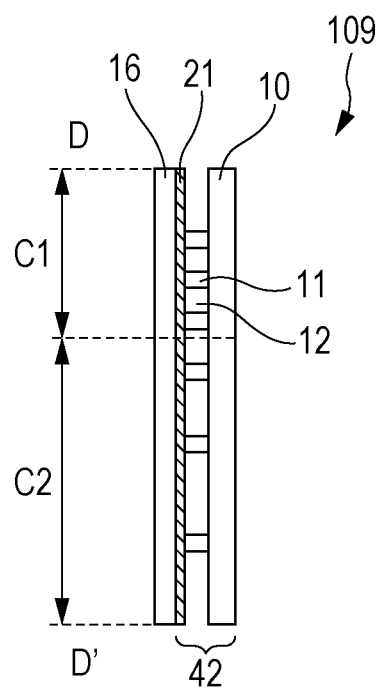
FIG. 23 is a cross-sectional view of a window pane according to a 13th embodiment.

FIG. 23 is a cross-sectional view of a window pane 109 according to a 13th embodiment.

In this embodiment, the same components as those in the 11th embodiment are denoted by the same reference signs and detailed descriptions thereof will be omitted.

This embodiment is different from the 11th embodiment in that the protrusion portion 11 is installed only on the area C1 in the 11th embodiment, but, in this embodiment, the protrusion portion 11 is formed on both of the area C1 and the area C2 and density of the protrusion portions 11 in the area C2 is smaller than density of the protrusion portions 11 in the area C1.

The density of the protrusion portions 11 is calculated by summing areas of the protrusion portions 11 on the reflective surface, which are installed per unit area of the base member 10. The density of the protrusion portions 11 may be controlled by using the width of the protrusion portion 11 or a pitch between the protrusion portions 11, for example, when the protrusion portions 11 are formed as a strip protrusion portion.

In a case of this embodiment, the density of the protrusion portions 11 in the area C2 becomes larger as the height in the area C2 becomes higher, but density distribution of the protrusion portions 11 is not limited thereto. The density of the protrusion portions 11 may become large at a position which is lower than a line of sight of a person and a position which is higher than the line of sight of a person, and the density of the protrusion portions 11 may become small at a position which is near to the line of sight of a person. Since window may scatter light at a height at which a field of view of a person is not blocked, the protrusion portions 11 may be densely at this height. Since high transparency is needed at a height at which a line of sight is blocked, the protrusion portions 11 may become small at this height.

In a lighting film 42 according to this embodiment, since the protrusion portion 11 is installed on the area C2, transparency in the area C2 is lower than that in the 11th embodiment. However, since the protrusion portions 11 are sparsely formed, a field of view is not greatly blocked.

14th Embodiment

Figure 24:
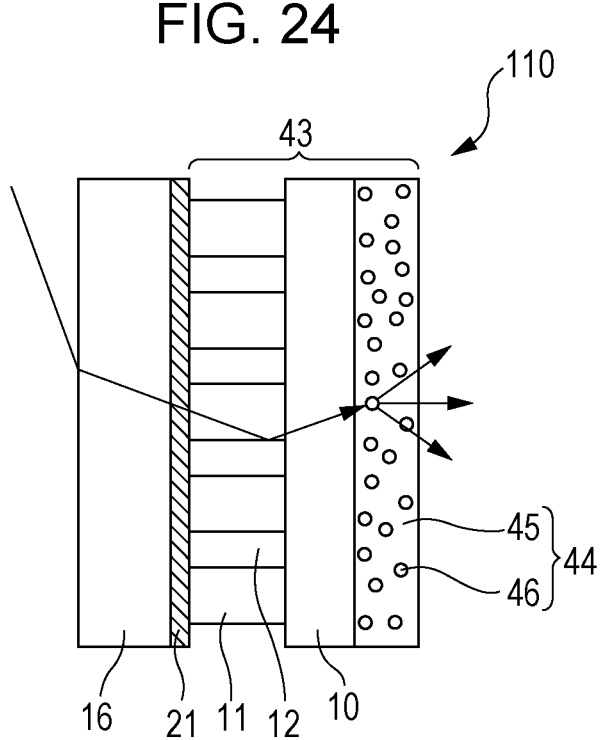
FIG. 24 is a partial cross-sectional view of a window pane according to a 14th embodiment.

FIG. 24 is a partial cross-sectional view of a window pane 110 according to a 14th embodiment.

In this embodiment, the same components as those in the first embodiment are denoted by the same reference signs and detailed descriptions thereof will be omitted.

The window pane 110 includes the glass substrate 16 and a lighting film 43 which adheres to the one surface of the glass substrate 16. A basic configuration of the lighting film 43 is the same as that in the first embodiment. This embodiment is different from the first embodiment in that a light scattering film 44 is provided on the opposite side to the side of the base member 10 on which the protrusion portions 11 are formed. In a case of this embodiment, the light scattering film 44 is obtained by dispersing scattering particles 46 in a transparent film 45. The lighting film 43 adheres to one surface of the glass substrate 16 on the inward side so as to cause the opposite side to the side on which the protrusion portions 11 of the base member 10 are formed, to be directed outwardly.

Light which is reflected by the side surface of the protrusion portion 11 is scattered by the scattering particles 46 in the light scattering film 44 and thus illuminates a wide range in a house brightly. It is possible to variously change a position or a bearing to be bright by changing diffusivity or strong diffusion direction of the light scattering film 44. In this case, transparency when a scene in the outside is observed is degraded, but lighting properties equivalent to those of frosted glass are obtained.

15th Embodiment

Figure 25:
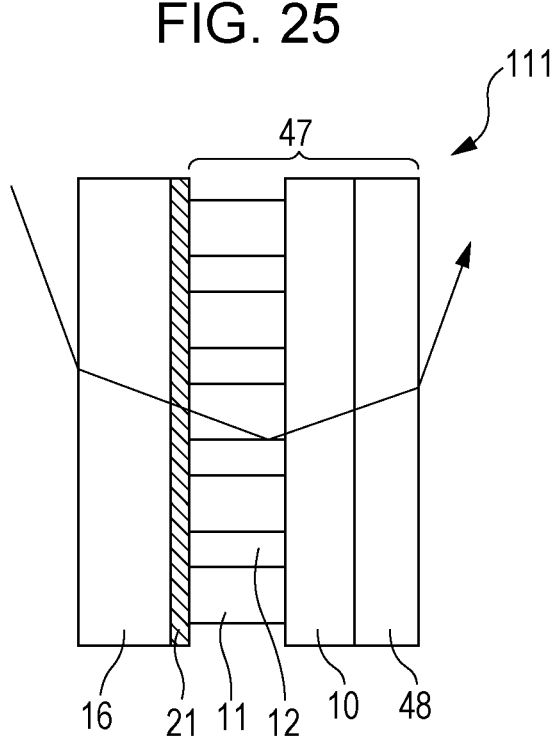
FIG. 25 is a cross-sectional view of a window pane according to a 15th embodiment.

FIG. 25 is a cross-sectional view of a window pane 111 according to a 15th embodiment.

In this embodiment, the same components as those in the first embodiment are denoted by the same reference signs and detailed descriptions thereof will be omitted.

The window pane 111 includes the glass substrate 16 and a lighting film 47 which adheres to one surface of the glass substrate 16. A basic configuration of the lighting film 47 is the same as that in the first embodiment. This embodiment is different from the first embodiment in that a heat-insulating film 48 having light-transmitting properties is provided on an opposite side to the side of the base member 10 on which the protrusion portions 11 are formed. A known heat-insulating film which has come into the market as a heat-insulating film for a window pane may be used as the heat-insulating film 48. The lighting film 47 adheres to the one surface of the glass substrate 16 on the inside of a house so as to cause an opposite side to a side of the base member 10 on which the plurality of protrusion portions 11 are formed, to be directed outwardly.

In a case of this embodiment, since a surface of the lighting film 47 on the protrusion portions 11 side is bonded to the glass substrate 16, the air in the gap portion 12 is inserted between the glass substrate 16 and the base member 10. An air layer has properties which cause heat in the outside of a house to be unlikely to be transferred to the inside of the house, and thus the lighting film itself has heat-insulating properties.

Thus, the window pane 111 in which the heat-insulating film 48 is bonded to one surface of the base member 10 has heat-insulating properties which are higher than heat-insulating properties of the heat-insulating film 48.

As described above, according to the window pane 111 of this embodiment, a window pane having both of the lighting properties and heat-insulating properties is made.

16th Embodiment

Figure 26:
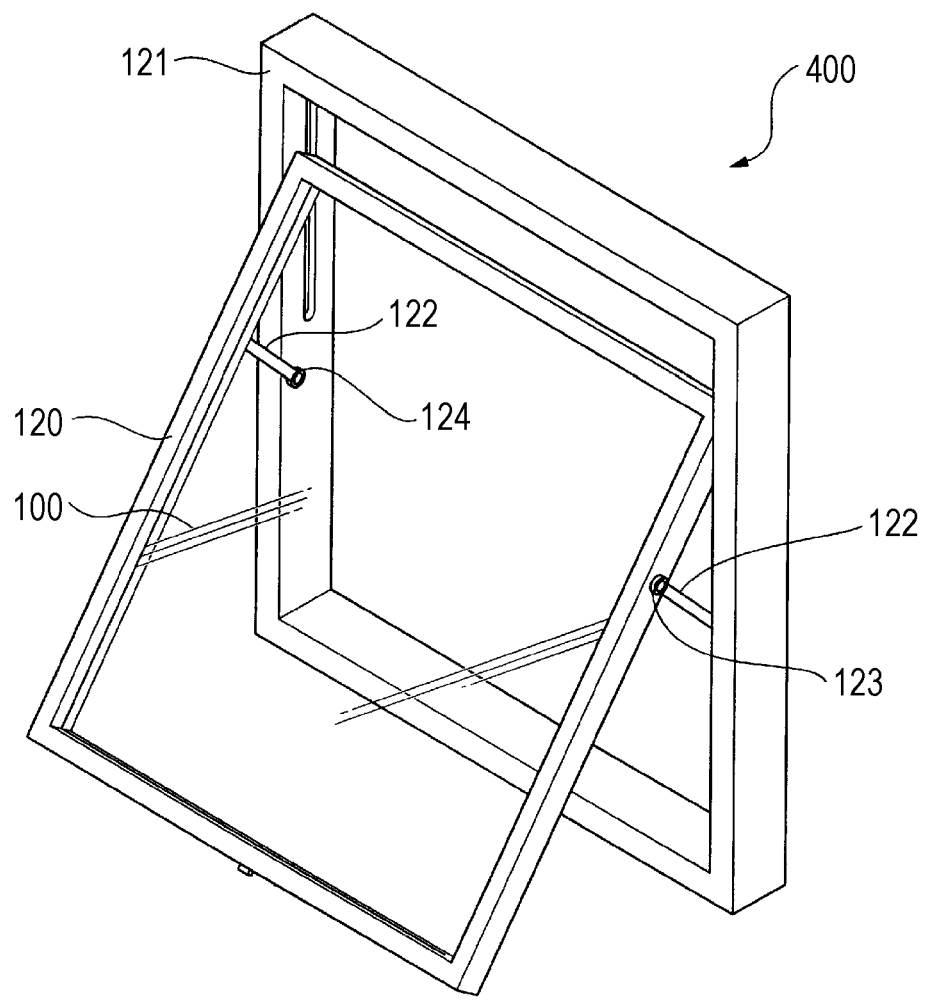
FIG. 26 is a cross-sectional view of a window according to a 16th embodiment.

FIG. 26 is a perspective view of a protruding window 400 according to a 16th embodiment.

In this embodiment, the same components as those in the first embodiment are denoted by the same reference signs and detailed descriptions thereof will be omitted.

The protruding window 400 includes a window pane 100 and a rod-like support fitting 122 which connects the window pane 100 to the window frame 121. The window pane 100 corresponds to the window pane 100 in the first embodiment illustrated in FIG. 5. One end portion 123 of the support fitting 122 is rotatably connected to an architrave 120 of the window pane 100, and another end portion 124 of the support fitting 122 is rotatably connected to the window frame 121.

The window pane 100 is inclined by using the one end portion 123 of the support fitting 122 as a supporting point, and thus it is possible to control a slope (direction of light emitted from a lighting film) of the lighting film which is installed on the window pane 100. Accordingly, an occupant controls the direction of light appropriately in accordance with the size of a room, the size of a window, a time, a season, and the like, and thus it is possible to hold an illumination state in a house to be a good state constantly.

17th Embodiment

Figure 27:
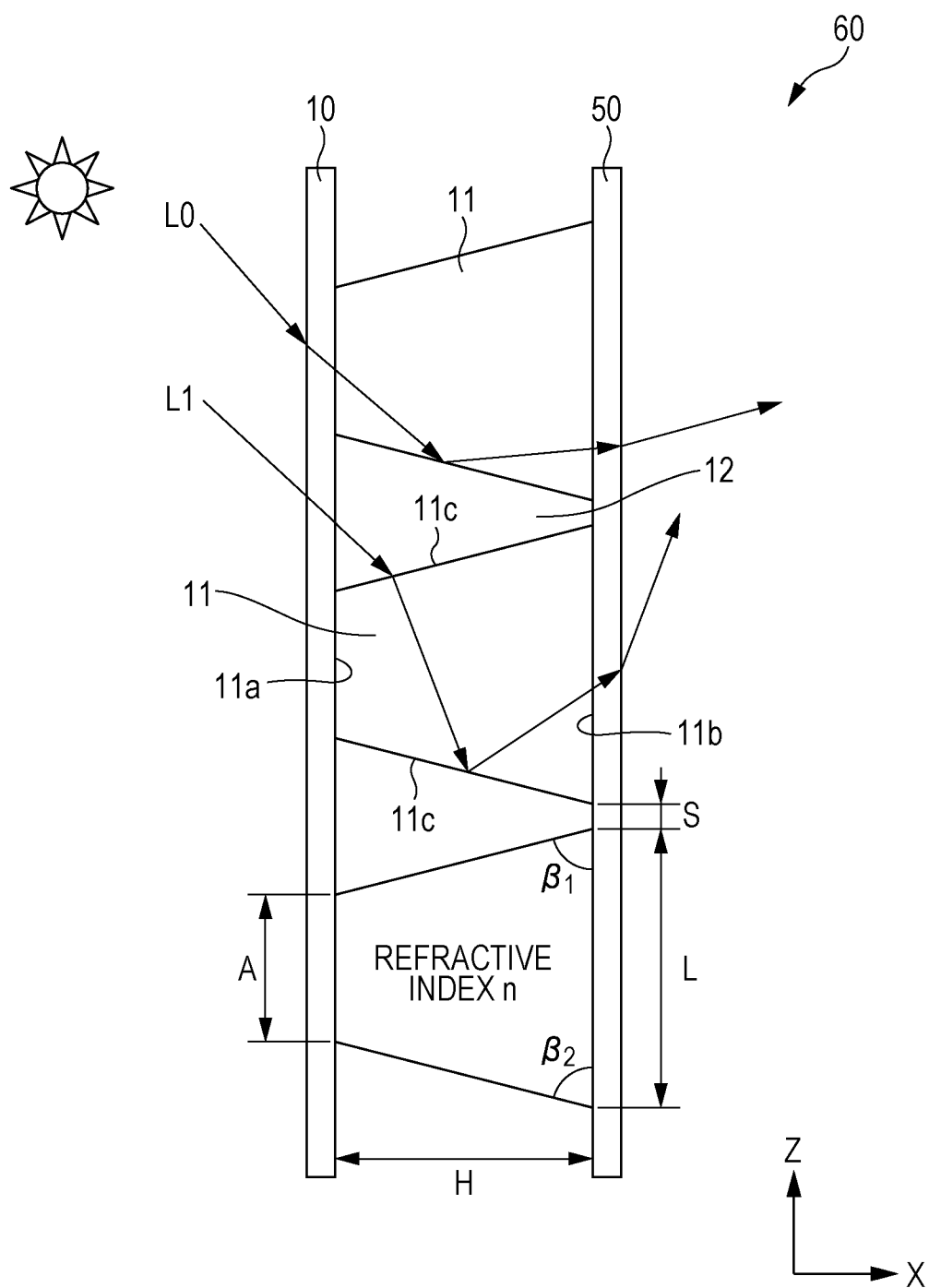
FIG. 27 is a partial cross-sectional view of a lighting film according to a 17th embodiment.
Figure 28A:
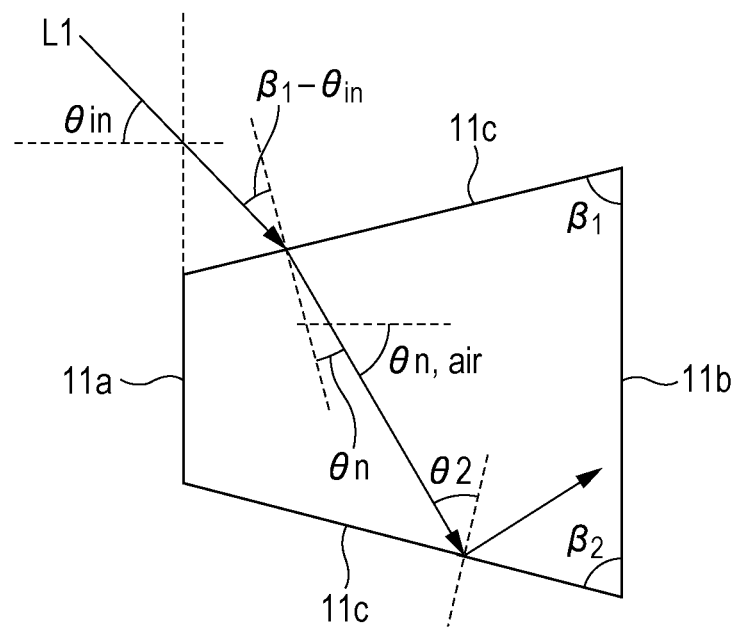
FIG. 28A is a diagram illustrating a condition for causing light which is incident from one side surface of the protrusion portion to be totally reflected by another side surface of the protrusion portion.
Figure 28B:
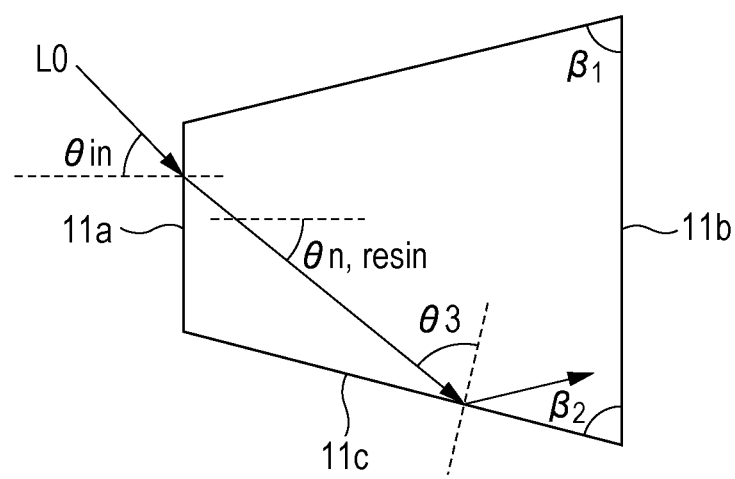
FIG. 28B is a diagram illustrating a condition for causing light which is incident from one side surface of the protrusion portion to be totally reflected by another side surface of the protrusion portion.
Figure 29:
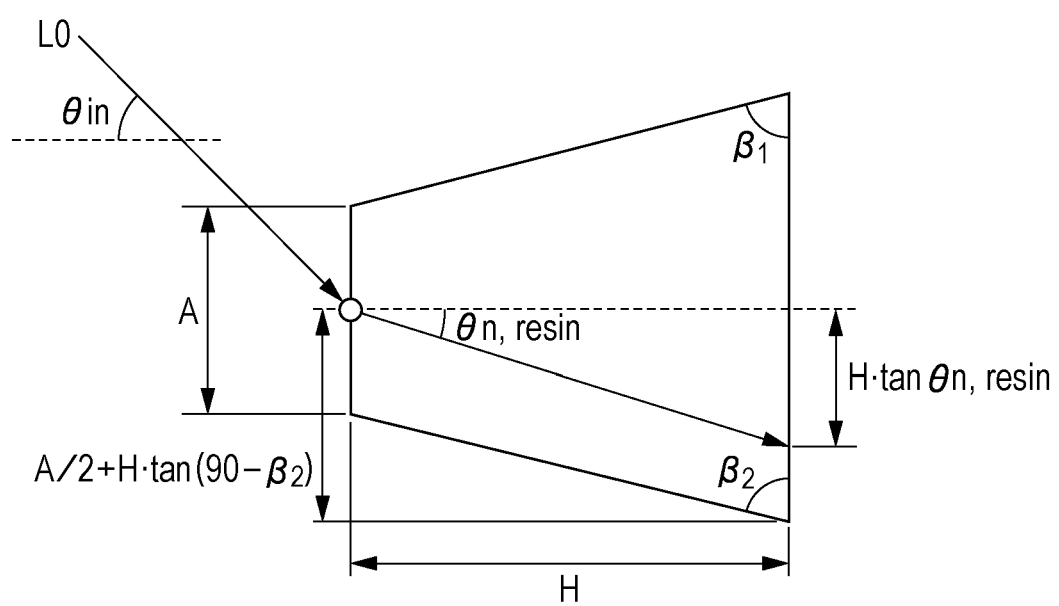
FIG. 29 is a diagram illustrating a condition for causing light which is incident from a light incidence end surface of the protrusion portion to be totally reflected by the side surface of the protrusion portion.

FIG. 27 is a partial cross-sectional view of a lighting film 60 according to a 17th embodiment. FIGS. 28A, 28B, and 29 are diagrams illustrating a configuration and an action of the protrusion portion 11 of the lighting film 60.

The lighting film 60 may be applied to the window panes, the roll screens, the lighting louvers, and the like according to the seventh to 16th embodiments. The lighting film 60 may be provided as the web roll as illustrated in FIG. 3.

In this embodiment, the same components as those in the first embodiment are denoted by the same reference signs and detailed descriptions thereof will be omitted.

As illustrated in FIG. 27, the lighting film 60 includes the base member 10 which has light-transmitting properties, the plurality of protrusion portion 11 which have light-transmitting properties and are formed on the one surface of the base member 10 to be adjacent to each other, and the gap portion 12 which is formed between the protrusion portions 11.

In each of the protrusion portions 11, an area of a light emitting end surface is larger than an area of a light incidence end surface. In a case of this embodiment, the first end surface 11a of the protrusion portions 11 on the base member 10 side is configured as the light incidence end surface, and the second end surface 11b of the protrusion portions 11 on an opposite side to the base member 11 is configured as the light emitting end surface.

A protective member 50 having light-transmitting properties is provided on an opposite side to the base member 10 with the protrusion portion 11 interposed therebetween. The protective member 50 is, for example, a flexible film such as a PET (Polyethylene terephthalate) film. The protective member 50 is bonded to the second end surface 11b of the protrusion portions 11.

Each of the plurality of protrusion portions 11 substantially has one direction as a longitudinal direction. The longitudinal direction of the protrusion portion is disposed in a direction parallel with one side of the base member 10 which has a rectangular shape. In the case of this embodiment, each of the plurality of protrusion portions 11 is configured as a strip protrusion portion which is extended in the Y direction and has a constant width. A shape of a cross-section (cross-section obtained by performing cutting with a surface orthogonal to the longitudinal direction: XZ cross-section) parallel with a width direction of the protrusion portion 11 in each of the plurality of protrusion portions 11 is trapezoid in which an upper base is shorter than a lower base, if a bottom side on the first end surface 11a side is set to be the upper base and a bottom side on the second end surface 11b side is set to be the lower base.

In the case of this embodiment, if the length of the upper base of the protrusion portion 11 is set as A, the length of the lower base of the protrusion portion 11 is set as L, the height of the protrusion portion 11 in the normal direction (X direction) of the base member 10 is set as H, an interval between the lower bases of the protrusion portions 11 in the arrangement direction (Z direction) of the protrusion portions 11 is set as S, two base angles (angle of the second end surface 11b and the side surface 11c) in both ends of the lower base are set as $\beta 1$ and $\beta 2$, the size of A, the size of L, the size of H, the size of S, the size of $\beta 1$, and the size of $\beta 2$ is equal to each other in all of the protrusion portions 11.

The lighting film 60 adheres to a glass substrate of a window pane such that the arrangement direction (Z direction) of the protrusion portions 11 becomes the vertical direction. A light beam L0 which is incident into the protrusion portion 11 from one end (first end surface 11a) of the protrusion portion 11 among light beams which coming from an upper part of the lighting film 60 is totally reflected by the side surface 11c of the protrusion portion 11 (interface between the protrusion portion 11 and the gap portion 12) and is emitted toward the upper part of the lighting film 60 again. The light beam L0 which is reflected by the protrusion portion 11 is introduced to the ceiling or the innermost part of a house and illuminates the inside of the house brightly.

A light beam L1 which has been incident between the protrusion portions 11 (non-formation area of the protrusion portion 11) among light beams coming from the upper part of the lighting film 60 is incident to the inside of the protrusion portion 11 through the gap portion 12, is reflected by the side surface 11c of the protrusion portion 11, and is emitted toward the upper part of the lighting film 60 again. The light beam L1 which is reflected by the protrusion portion 11 is introduced to the ceiling or the innermost part of a house and illuminates the inside of the house brightly.

The light beam L1 which is incident between the protrusion portions 11 is also introduced to the ceiling or the innermost part of a house, in addition to the light beam L0 which is incident to the light incidence end surface of the protrusion portion 11 among light beams which are incident to the lighting film 60. For this reason, it is possible to illuminate the inside of a house much brightly. Since the light beams L0 and L1 have different traveling directions, it is possible to illuminate a wide range in a house.

Conditions for totally reflecting the light beams L0 and L1 on the side surface 11c of the protrusion portion 11 will be described using FIGS. 27, 28A, 28B, and 29. FIG. 28A is a diagram illustrating a condition for causing the light beam L1 which is incident from one side surface 11c of the protrusion portion 11 to be totally reflected by another side surface 11c of the protrusion portion 11. FIGS. 28B and 29 are diagram illustrating conditions for causing the light beam L0 which is incident from the first end surface 11a (light incidence end surface) of the protrusion portion 11 to be totally reflected by the side surface 11c of the protrusion portion 11.

In FIGS. 28A, 28B, and 29, $\theta$in represents an incident angle of the light beams L0 and L1 to the lighting film 60. $\theta$n represents a refractive angle when the light beam L1 which is incident between the protrusion portion 11 at the incident angle $\theta$in is refracted by the side surface 11c of the protrusion portion 11. $\theta$n, air represents an angle of the traveling direction of the light beam L1 which is refracted by the side surface 11c of the protrusion portion 11, and the normal direction (X direction) of the base member 10. $\theta 2$ represents an incident angle when the light beam L1 which has been incident from the one side surface 11c of the protrusion portion 11 is incident to another side surface 11c of the protrusion portion 11. $\theta$n, resin represents a refractive angle when the light beam L0 which has been incident to the first end surface 11a of the protrusion portion 11 at the incident angle of θin is refracted by the first end surface 11a of the protrusion portion 11. θ3 represents an incident angle when the light beam L0 which has been incident from the first end surface 11a of the protrusion portion 11 is incident to the side surface 11c of the protrusion portion 11. A refractive index of the protrusion portion 11 is set as n.

In FIG. 28A, $\sin(\beta_1-\theta in)=n\cdot\sin\theta n$ is obtained in accordance with Snell's law. Since $\theta n=\beta_1-\theta n$, air, if this is substituted for the above expression, an angle $\theta n$, air of the light beam L1 which is incident into the protrusion portion 11 from the side surface 11c, traveling in a medium having a refractive index of n is $\theta n$, air=$\beta_1$-A sin $\{(1/n)\cdot\sin(\beta_1-\theta in)\}$.

A condition for causing the light beam L1 to totally reflected by the side surface 11c is $n\cdot\sin\theta 2>\sin 90°$ (=1). Since $\theta 2=180-\beta_2-\theta n$, air, a total reflection condition in the reflective surface is $n\cdot\sin(180-\beta_2-\theta n$, air)>$\sin 90°$ (=1). Here, $\theta n$, air is $\theta n$, air=$\beta_1$-A sin $\{(1/n)\cdot\sin(\beta_1-\theta in)\}$. When the above conditions are satisfied, the light beam L1 is totally reflected by the side surface 11c. A configuration of satisfying these conditions is referred below to as Configuration A.

Configuration A is a configuration in which at least a portion of the light beam L1 which has been incident between the protrusion portions 11 is incident to the side surface 11c of the protrusion portion 11. However, if the aspect ratio and the like of the protrusion portion 11 are appropriately designed, all of light beams L1 which have been incident between the protrusion portions 11 may be incident to the side surface 11c of the protrusion portion 11. A configuration of satisfying this condition is referred below to as Configuration B.

In FIG. 28B, $\sin\theta in=n\cdot\sin\theta n$, resin is obtained in accordance with Snell's law. If deformation of this is performed, an angle $\theta n$, resin of the light beam L0 which is incident into the protrusion portion 11 from the first end surface 11a, traveling in a medium having a refractive index of n is $\theta n$, resin=A sin $\{(1/n)\cdot\sin\theta in\}$.

A condition for causing the light beam L0 to totally reflected by the side surface 11c is $n\cdot\sin\theta 3>\sin 90°$ (=1). Since $\theta 3=180-\beta_2-\theta n$, resin, the total reflection condition in the side surface 11c is $n\cdot\sin(180-\beta_2-\theta n$, resin)>$\sin 90°$ (=1). Here, $\theta n$, resin is $\theta n$, resin=A sin $\{(1/n)\cdot\sin\theta in\}$. When the above conditions are satisfied, the light beam L0 is totally reflected by the side surface 11c. A configuration of satisfying these conditions is referred below to as Configuration C.

Configuration C is a configuration in which at least a portion of the light beam L0 which has been incident to the first end surface 11a of the protrusion portions 11 is incident to the side surface 11c of the protrusion portion 11. However, if the aspect ratio and the like of the protrusion portion 11 are appropriately designed, the half or more of light beams L1 which have been incident to the first end surface 11a of the protrusion portions 11 may be incident to the side surface 11c of the protrusion portion 11. A configuration of satisfying this condition is referred below to as Configuration D.

Conditions for satisfying Configuration D are as follows. That is, in FIG. 29, if the light beam L0 which is incident from a median point of the first end surface 11a of the protrusion portion 11 is considered, a distance of the light beam L0 traveling in a downward direction on the drawing is $H\cdot\tan\theta n$, resin when the light beam L0 travels to the second end surface 11b of the protrusion portion 11. Here, $\theta n$, resin=A sin $\{(1/n)\cdot\sin\theta in\}$ in accordance with Snell's law. The protrusion portion 11 is formed such that the length is extended under the median point of the first end surface 11a by $A/2+H\cdot\tan(90-\beta_2)$. If these two lengths are compared to each other, and $H\cdot\tan\theta n$, resin$\geq A/2+H\cdot\tan(90-\beta_2)$ is satisfied, the half or more of the light beam L0 which has been incident from the first end surface 11a of the protrusion portion 11 is incident to the side surface 11c of the protrusion portion 11.

In the lighting film 60, an incident angle θin of light which is totally reflected by the side surface 11c of the protrusion portion 11 varies in accordance with the base angles β1, β2 or the aspect ratio H/L of the protrusion portion 11. It is possible to take light in with high efficiency by designing the base angles β1, β2 or the aspect ratio H/L of the protrusion portion 11 to match with the elevation angle of the sun at a time when duration of sunshine is the longest, throughout the year.

Figure 30A:
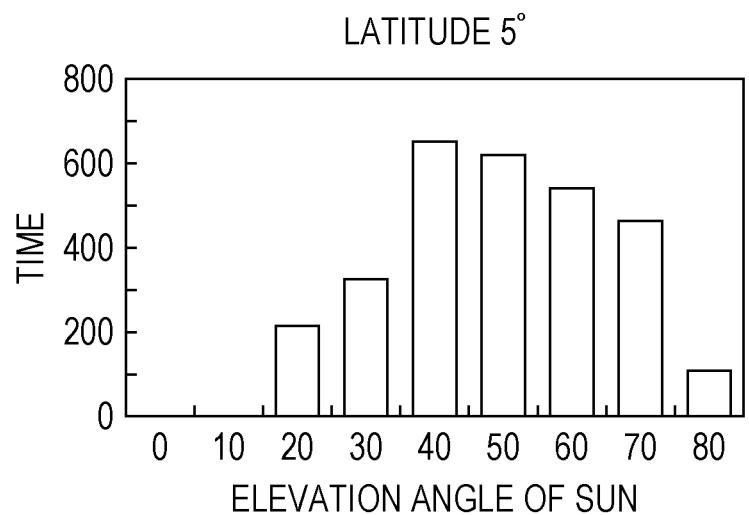
FIG. 30A is a diagram illustrating a relationship of an elevation angle of the sun and duration of sunshine in a year.
Figure 30B:
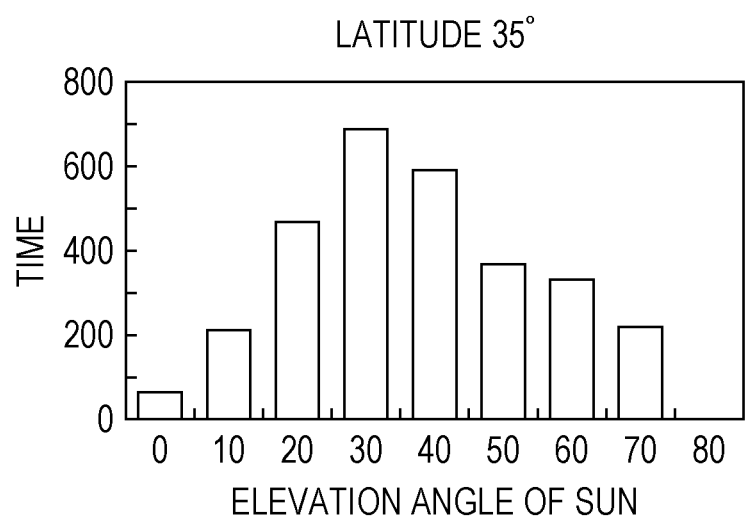
FIG. 30B is a diagram illustrating a relationship of an elevation angle of the sun and duration of sunshine in a year.
Figure 33:
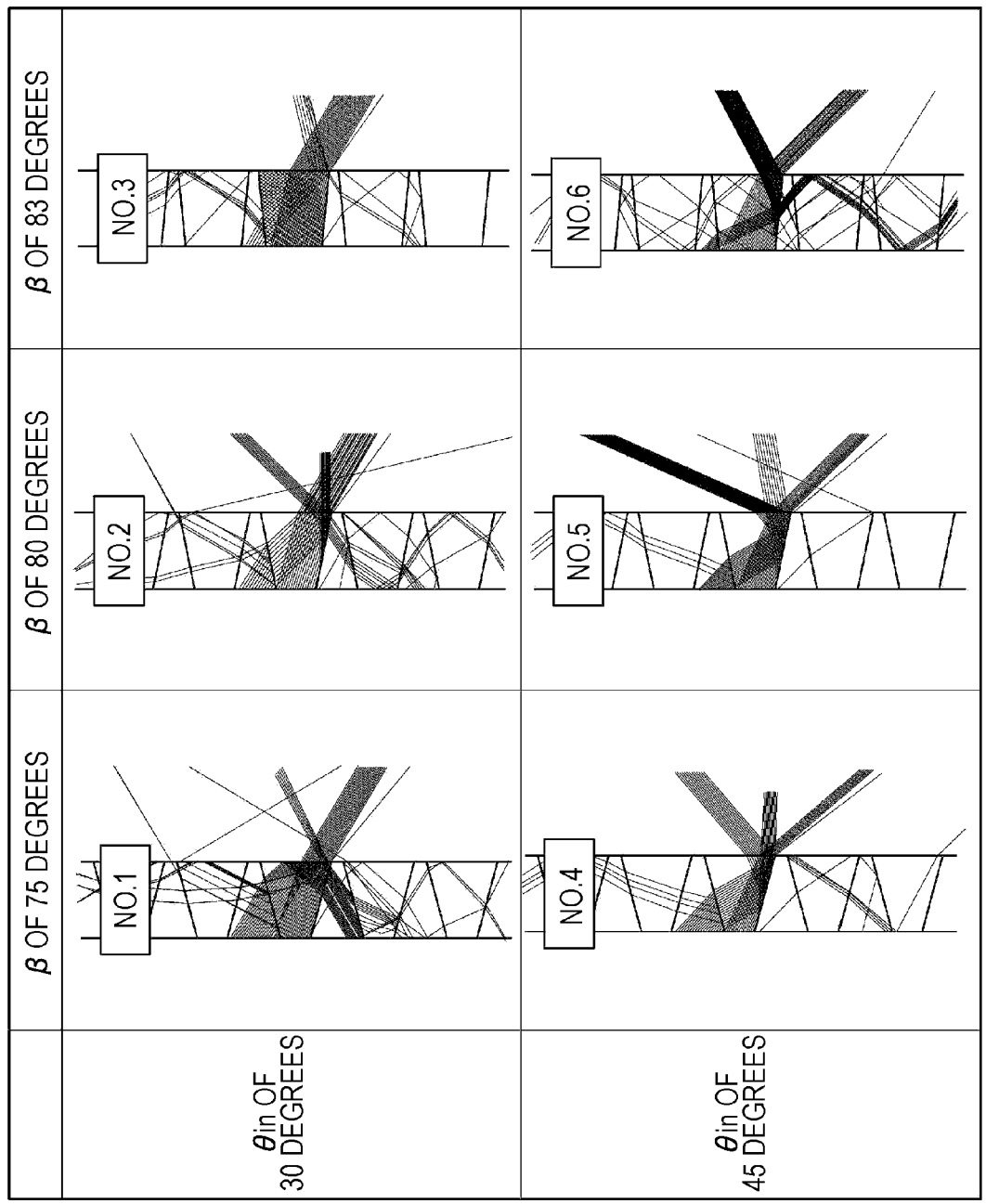
FIG. 33 is a view illustrating a simulation result of transmitting light in each sample.
Figure 34:
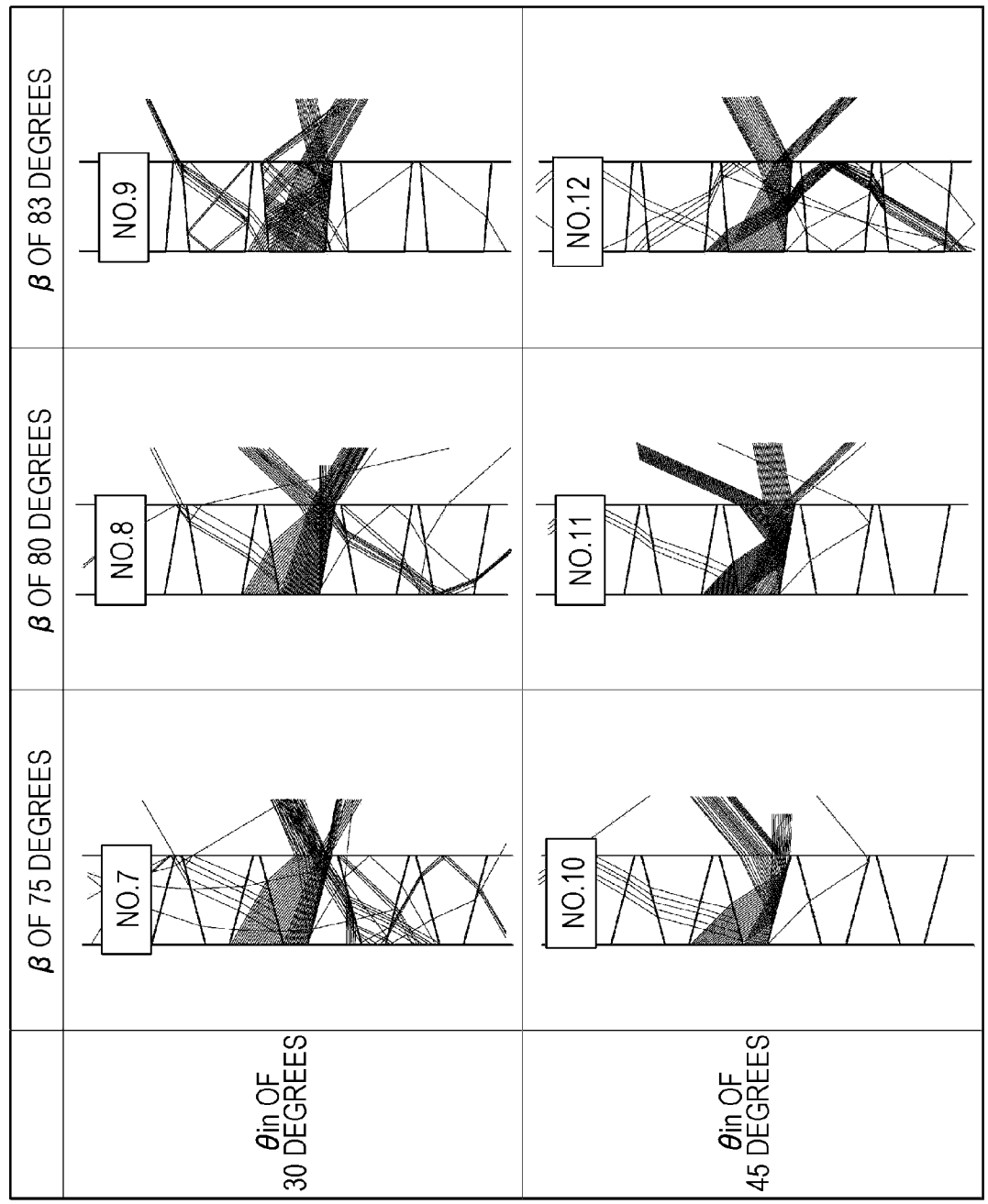
FIG. 34 is a view illustrating a simulation result of transmitting light in each sample.
Figure 35:
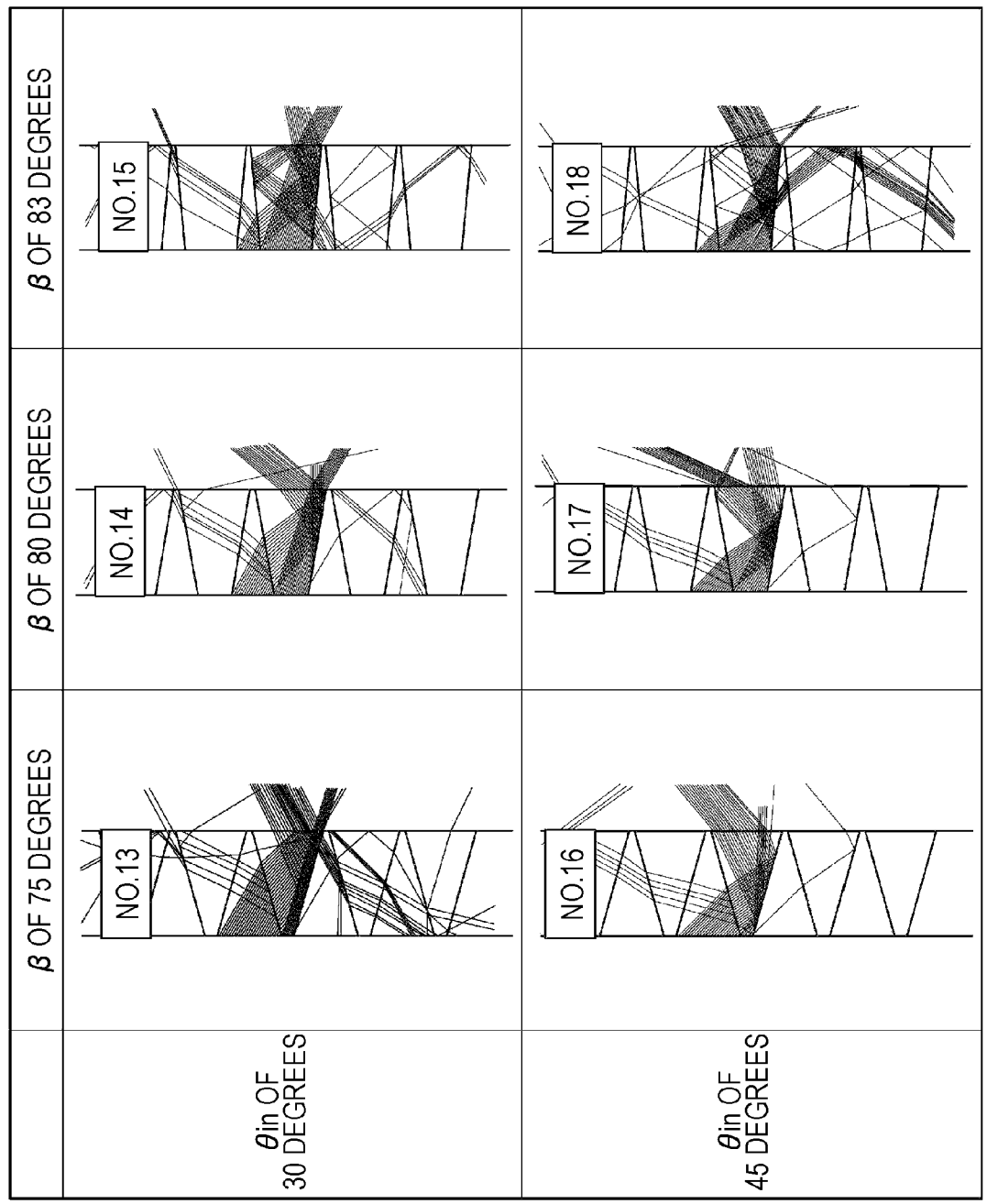
FIG. 35 is a view illustrating a simulation result of transmitting light in each sample.
Figure 36:
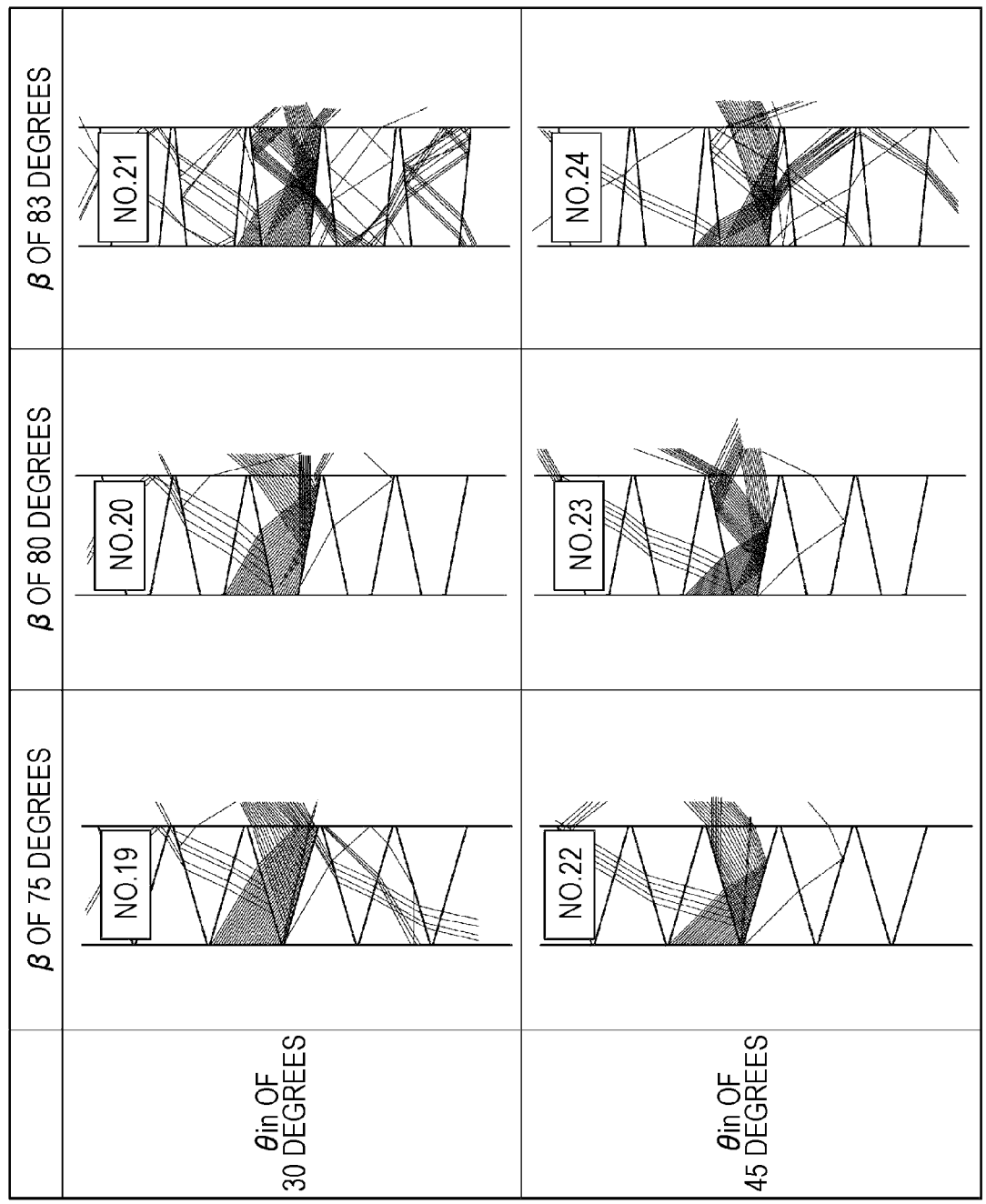
FIG. 36 is a view illustrating a simulation result of transmitting light in each sample.

FIGS. 30A and 30B are diagrams illustrating a relationship of the elevation angle of the sun and the duration of sunshine in a year at a district having latitude of 5° and at a district having latitude of 35°. The district having latitude of 5° is a district to which Jakarta, Kuala Lumpur, and the like belong, and the district having latitude of 35° is a district to which Tokyo, Los Angeles, and the like belong.

The elevation angle of the sun when the duration of sunshine is the longest varies in accordance with the latitude. A time period when the elevation angle of the sun is from 40° to the vicinity of 50° is the longest at the district having latitude of 5°, and a time period when the elevation angle of the sun is in the vicinity of 30° is the longest at the district having latitude of 35°.

Accordingly, if a configuration as follows is employed as the lighting film 60, for example, it is preferable that high lighting properties may be shown at the district such as Jakarta and Kuala Lumpur, at which a time period when the elevation angle of the sun is in the vicinity of 5° is the longest. For example, it is preferable that at least a portion, preferably, the entirety of the light beam L1 which has been incident between the protrusion portions 11 at the incident angle θin of 45° is incident into the plurality of protrusion portions 11 through the gap portion 12, and is totally reflected by the side surfaces 11c of the plurality of protrusion portions 11.

Preferably, a configuration is employed in which the half or more of the light beam L0 which has been incident to the light incidence end surfaces (first end surfaces 11a) of the plurality of protrusion portions 11 at the incident angle θin of 45° is totally reflected by the side surfaces 11c of the plurality of protrusion portions 11.

If a configuration as follows is employed as the lighting film 60, for example, it is preferable that high lighting properties may be shown at the district such as Tokyo and Los Angeles, at which a time period when the elevation angle of the sun is in the vicinity of 30° is the longest. For example, it is preferable that at least a portion, preferably, the entirety of the light beam L1 which has been incident between the protrusion portions 11 at the incident angle θin of 30° is incident into the plurality of protrusion portions 11 through the gap portion 12, and is totally reflected by the side surfaces 11c of the plurality of protrusion portions 11. Preferably, a configuration is employed in which the half or more of the light beam L0 which has been incident to the light incidence end surfaces (first end surfaces 11a) of the plurality of protrusion portions 11 at the incident angle θin of 30° is totally reflected by the side surfaces 11c of the plurality of protrusion portions 11.

FIGS. 31 to 37 are diagrams illustrating lighting characteristics of a lighting film (samples 1 to 26) when various parameters of the protrusion portion 11 is changed. FIG. 31 is a diagram illustrating various structural parameters of the samples 1 to 26. FIG. 32 is a diagram illustrating relationships of the samples 1 to 26 and the Configurations A to D. FIGS. 33 to 37 are diagram illustrating simulation results of transmitting light in the samples.

The samples 1 to 24 are samples having a taper structure in which an area of the light emitting end surface of the protrusion portion is smaller than an area of the light incidence end surface. The samples 25 and 26 are samples having a non-taper structure in which the area of the light emitting end surface of the protrusion portion is equal to the area of the light incidence end surface. In FIGS. 33 to 37, a left side (base member side) of the protrusion portion is set to be the outside of a house, and a right side (protective member side) of the protrusion portion is set to be the inside of the house. In FIGS. 33 to 37, $\beta 1$ ($=\beta 2$) is marked as $\beta$.

In FIG. 32, determination of whether or not each sample includes Configurations A to D is performed as follows. Regarding Configuration A, since if $n \cdot \sin \theta 2 > 1$ is satisfied, light is totally reflected by the side surface of the protrusion portion, it is determined to be O. Regarding Configuration B, if the entirety of light which has been incident between the protrusion portions is incident to the side surface of the protrusion portion, it is determined to be O based on the simulation results in FIGS. 33 to 37. Regarding Configuration C, since if $n \cdot \sin \theta 3 > 1$ is satisfied, light is totally reflected by the side surface of the protrusion portion, it is determined to be O. Regarding Configuration D, if $H \cdot \tan \theta n$, $\text{resin} > A/2 + H \cdot \tan(90 - \beta_2)$ ($=10$) is satisfied, it is determined to be O.

As illustrated in FIGS. 33 to 36, it is possible to change a proportion, an angle, or the like of light which is reflected to the ceiling side, by changing the various parameters of the protrusion portion. The light which is reflected to the ceiling side includes light beams which are incident into the protrusion portion from the light incidence end surface of the protrusion portion, are reflected by the side surface of the protrusion portion, and are directed toward the ceiling side, and light beams which are incident between the protrusion portions, incident into the protrusion portion from the one side surface of the protrusion portion through the gap portion, and then are reflected by another side surface of the protrusion portion and are directed toward the ceiling side. However, proportions of these light beams are changed by changing the various parameters of the protrusion portion. Accordingly, it is possible to uniformly illuminate the inside of a house by appropriately controlling the various parameters of the protrusion portion.

Figure 37:
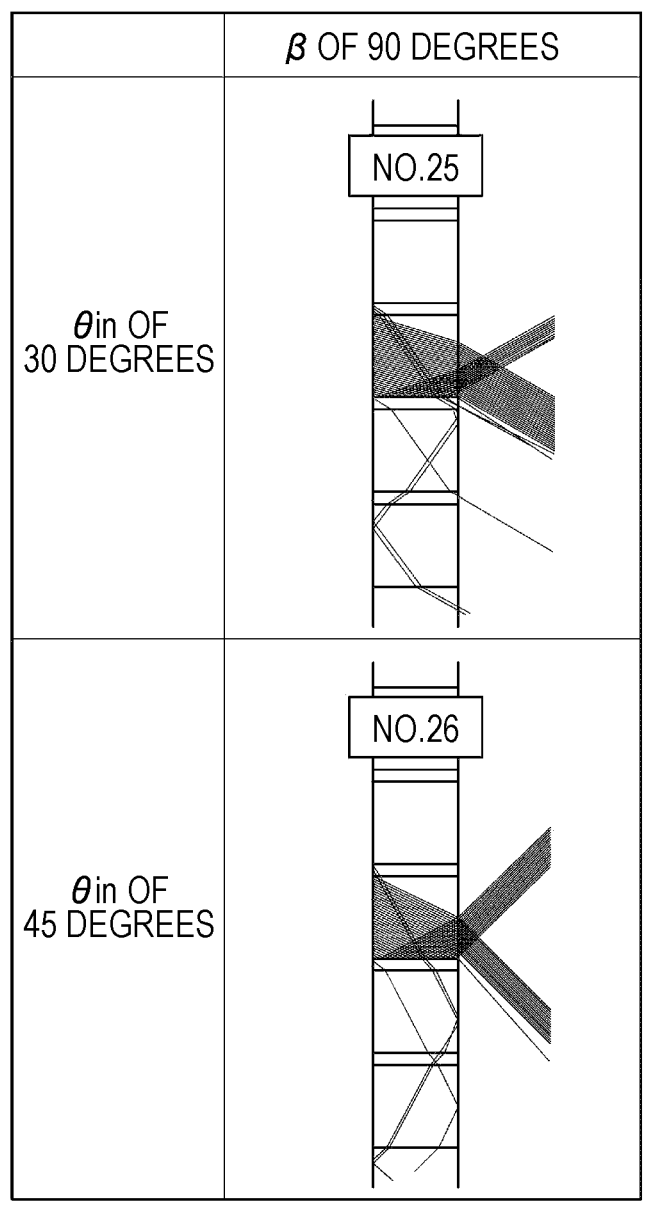
FIG. 37 is a view illustrating a simulation result of transmitting light in each sample.

As illustrated in FIGS. 33 to 36, since the side surface of the protrusion portion is inclined to the base member in the samples 1 to 24 having the taper structure, a portion of light which is incident between the protrusion portions is reflected to the ceiling side by the side surface of the protrusion portion. As illustrated in FIG. 37, since the side surface of the protrusion portion is disposed to be vertical to the base member in the samples 25 and 26 having the non-taper structure, light which is incident between the protrusion portions hardly contributes illumination of the ceiling side. Most of the light which is incident between the protrusion portions is reflected toward the outside of a house by an interface between the protective member and the air, or transmits through the protrusion portion to be emitted to the floor side. Thus, it is possible to illuminate the ceiling side brightly in the samples having the taper structure, compared to the samples having the non-taper structure.

Figure 38A:
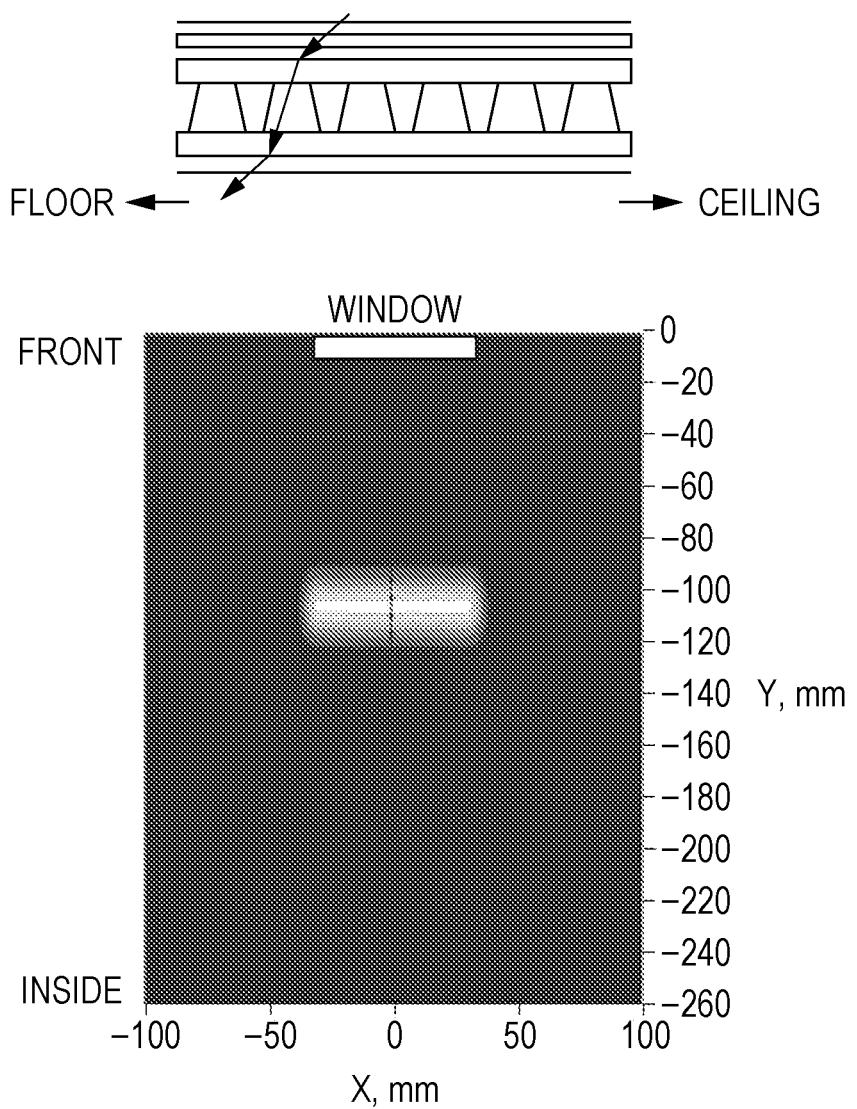
FIG. 38A is a diagram illustrating a relationship of an aspect ratio of the protrusion portion and lighting characteristics.
Figure 38B:
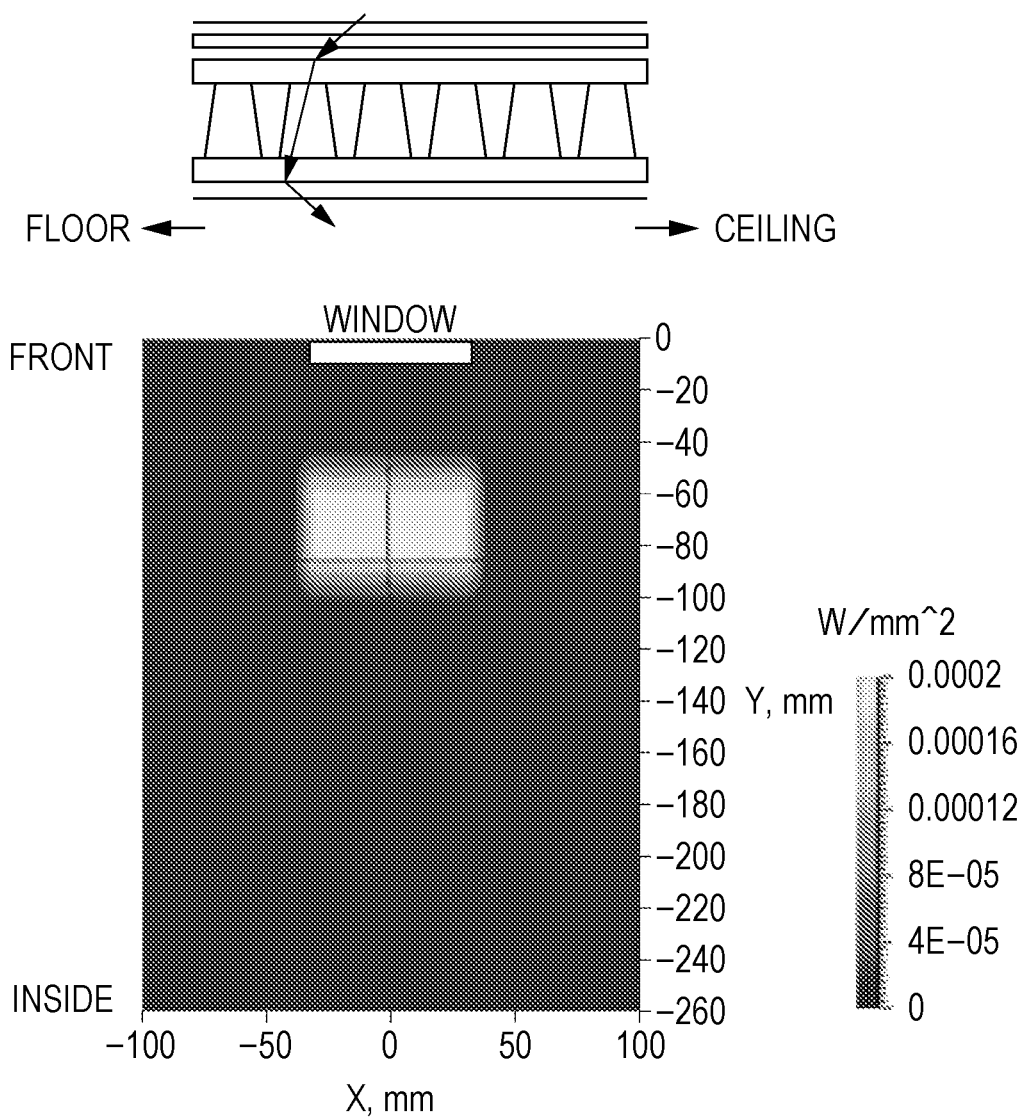
FIG. 38B is a diagram illustrating the relationship of an aspect ratio of the protrusion portion and lighting characteristics.

FIGS. 38A and 38B are diagrams illustrating relationships of the aspect ratio of the protrusion portion and illuminance distribution in the ceiling. FIG. 38A is a diagram illustrating the illuminance distribution in the ceiling when a low aspect sample in which the aspect ratio of the protrusion portion is low is used. FIG. 38B is a diagram illustrating the illuminance distribution in the ceiling when a high aspect sample in which the aspect ratio of the protrusion portion is high is used. Light is incident from a front direction of a window at the incident angle of 50°.

Drawings on an upper side in FIGS. 38A and 38B illustrate the configuration of the lighting film. In the drawings on the upper side in FIGS. 38A and 38B, an upper side of illustration (base member side) corresponds to the outside of a house, and a lower side of the illustration (protective member side) corresponds to the inside of the house. A left side of the illustration corresponds to the floor side, and a right side of the illustration corresponds to the ceiling side. Drawings on a lower side in FIGS. 38A and 38B illustrate the illuminance distribution in the ceiling. In the drawings on the lower side in FIGS. 38A and 38B, an upper side of illustration corresponds to a window side, and a lower side of the illustration corresponds to a depth side in a room. The lighting film is installed on the window in a state where the arrangement direction of the protrusion portion is set to be the vertical direction.

The parameters of the protrusion portion in the low aspect sample and the high aspect sample are as follows.

<Low Aspect Sample>
$\beta 1 = \beta 2 = 78°$
$S/L = 7 \ \mu m / 23 \ \mu m = 0.30$
$H/L = 20 \ \mu m / 23 \ \mu m = 0.87$
$n = 1.56$ <High Aspect Sample>
$\beta 1 = \beta 2 = 75°$
$S/L = 100 \ \mu m / 300 \ \mu m = 0.33$
$H/L = 350 \ \mu m / 300 \ \mu m = 1.17$
$n = 1.49$ As illustrated in FIG. 38A, in the low aspect sample, light is concentrated in a narrow range of the ceiling. As illustrated in FIG. 38B, in the high aspect sample, light is dispersed in a wide range of the ceiling. If a proportion (intensity of light which is incident to the ceiling/intensity of light which is incident to the lighting film) of light beams which is incident to the ceiling among light beams which are incident to the lighting film at the incident angle of 50° is defined as efficiency E, the efficiency E in the low aspect sample is 31.7%, and the efficiency E in the high aspect sample is 58.8%. In the high aspect sample, it is possible to illuminate a wider range of the ceiling brightly than that in the low aspect sample.

Hereinafter, a reasonable taper angle $\beta$ of the protrusion portion will be described using FIGS. 39 to 42.

The taper angle $\beta$ corresponds to the base angles $\beta 1$ and $\beta 2$ of the protrusion portion illustrated in FIG. 27. Here, considering $\beta 1 = \beta 2 = \beta$, description will be made.

Figure 39:
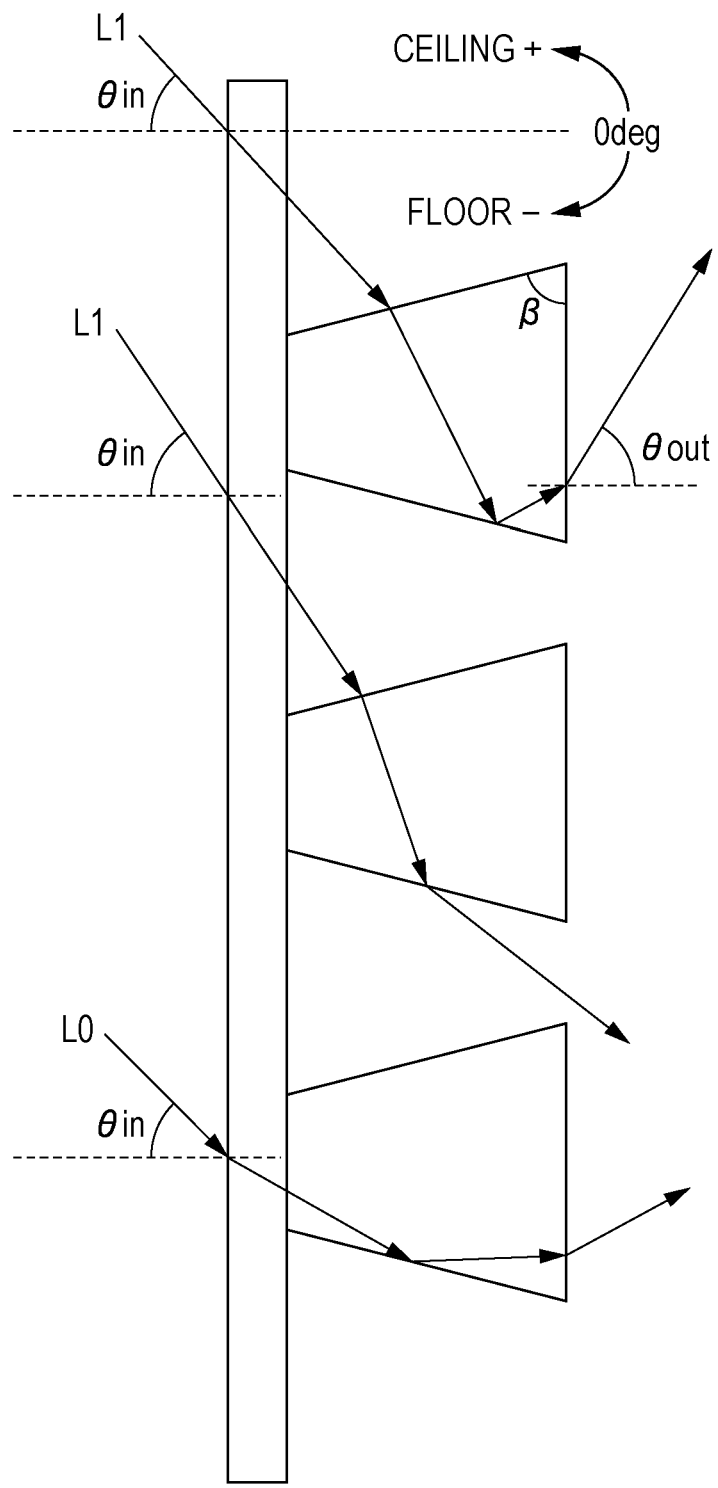
FIG. 39 is a diagram illustrating a light transmitting pattern when light transmits through the lighting film.

FIG. 39 is a diagram illustrating a light transmitting pattern when light transmits through the lighting film. In FIG. 39, $\theta$out represents an illumination angle in the lighting film. An illumination angle $\theta$out is an angle of an emission direction of light which is emitted from the lighting film and the normal direction of the base member in the lighting film.

Light which is incident to the lighting film includes the light beam L0 which is incident toward the light incidence end surface of the protrusion portion, and the light beam L1 which is incident toward the gap portion between the protrusion portions. In the following description, the light beam L0 which is incident toward the light incidence end surface of the protrusion portion is referred to as "resin in", and the light beam L1 which is incident toward the gap portion between the protrusion portions is referred to as "air in".

A portion of the light beam ("air in") L1 which has been incident toward the gap portion between the protrusion portions is incident into the protrusion portion from the one side surface of the protrusion portion, travels in the protrusion portion, and then is incident to another side surface. The light beam L1 which has been incident to another side surface of the protrusion portion is totally reflected by another side surface of the protrusion portion, or transmits through another side surface of the protrusion portion in accordance with the incident angle θin or the taper angle β. For example, when the incident angle θin is small, or when the taper angle β is large, the light beam L1 is totally reflected by another side surface of the protrusion portion, and is emitted toward the ceiling side or the inner part in a room. When the incident angle θin is large, or when the taper angle β is small, the light beam L1 transmits through another side surface of the protrusion portion and is emitted to the floor side.

The light beam ("resin in") L0 which has been incident toward the light incidence end surface of the protrusion portion is incident into the protrusion portion from the light incidence end surface of the protrusion portion, travels in the protrusion portion, and then is incident to the side surface of the protrusion portion. The light beam L0 which has been incident to the side surface of the protrusion portion is totally reflected by the side surface of the protrusion portion, or transmits through the side surface of the protrusion portion in accordance with the incident angle θin or the taper angle β. For example, when the incident angle θin is small, or when the taper angle β is large, the light beam L0 is totally reflected by the side surface of the protrusion portion, and is emitted toward the ceiling side or the inner part in a room. When the incident angle θin is large, or when the taper angle β is small, the light beam L0 transmits through the side surface of the protrusion portion and is emitted to the floor side.

Figure 40:
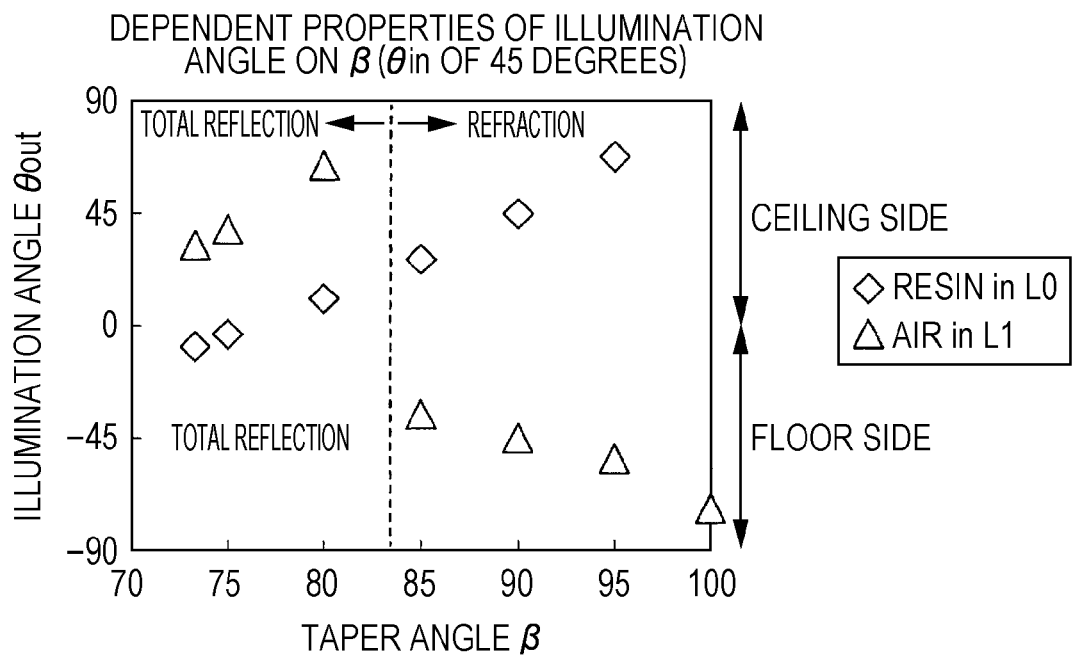
FIG. 40 is a diagram illustrating a relationship of a taper angle of the protrusion portion and an illumination angle of the lighting film.

FIG. 40 is a diagram illustrating a relationship of the taper angle β of the protrusion portion and the illumination angle θout in the lighting film. The illumination angle θout is set to be positive when light is emitted to the ceiling side, and is set to be negative when light is emitted to the floor side. The pitch between the protrusion portions is 30 μm and the height of the protrusion portion is 25 μm. The width (length of the upper base in the protrusion portion) of the light incidence end surface in the protrusion portion is 15 μm and the incident angle θin of light to the lighting film is 45°.

The illumination angle of "air in" is increased with an increase of the taper angle β when the taper angle β is in a range from 72° to 83°. The illumination angle θout is a positive value, and a direction of light which is emitted from the lighting film is directed to the ceiling side. As illustrated in the drawing on an upper side of FIG. 40, when the taper angle β is in the range from 72° to 83°, light which travelled in the protrusion portion and has been incident to the side surface of the protrusion portion is reflected by the side surface of the protrusion portion and is emitted to the ceiling side.

When the taper angle β is in a range from 83° to 100°, the illumination angle of "air in" is reduced with an increase of the taper angle β. The illumination angle θout is a negative value and the direction of light which is emitted from the lighting film is directed to the floor side. Light which has travelled in the protrusion portion and has been incident to the side surface of the protrusion portion transmits through the side surface of the protrusion portion. When the taper angle β is in the range from 83° to 100°, as illustrated in the drawing on the middle of FIG. 40, the light which has travelled in the protrusion portion and has been incident to the side surface of the protrusion portion transmits through the side surface of the protrusion portion, and is emitted to the floor side.

The illumination angle θout of "resin in" is equally increased with an increase of the taper angle β when the taper angle β is in the range from 72° to 100°. When the taper angle β is in the range from 72° to 100°, as illustrated in the drawing on a lower side of FIG. 40, the light which has travelled in the protrusion portion and has been incident to the side surface of the protrusion portion is totally reflected by the side surface of the protrusion portion, and is emitted toward the ceiling side or the inner part in a room.

Accordingly, if the taper angle β of the protrusion portion is 72° to 83°, it is possible to reflect light in the outside of a house to the ceiling side with high efficiency and bright illumination may be performed.

Figure 41:
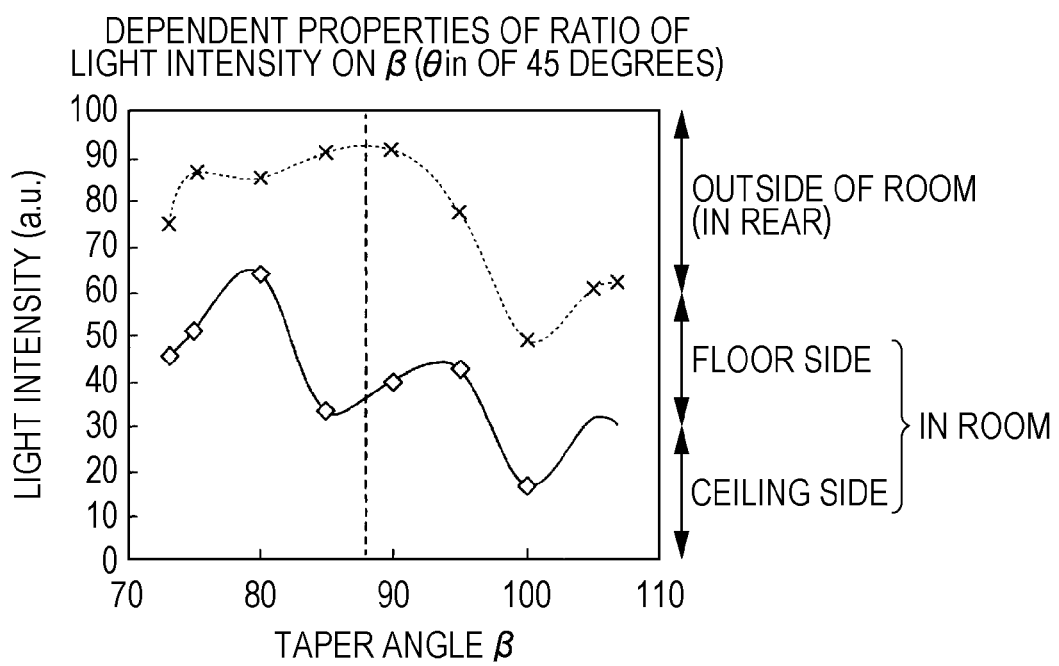
FIG. 41 is a diagram illustrating a relationship of proportions of light which is directed to the ceiling side, the floor side, and the outside of a room, and the taper angle of the protrusion portion.

FIG. 41 is a diagram illustrating a relationship of proportions of light which is directed to the ceiling side, the floor side, and the outside of a room, and the taper angle β of the protrusion portion. Light intensity of light which is directed to the ceiling side, the floor side, and outside of the room is standardized by using light intensity of light which is incident to the lighting film as 100. The pitch between the protrusion portions, the height of the protrusion portion, the width of the light incidence end surface in the protrusion portion, the incident angle θin of light to the lighting film are the same as those used in FIG. 40.

Proportions of light which is directed to the ceiling side and the floor side are substantially constant when the taper angle β is in the range of 75° to 90°, and if the taper angle β exceeds 90°, the proportions are reduced. When the taper angle β is in the range of 75° to 90°, about 90% of light which has been incident to the lighting film is taken in the house, and a proportion of light which is reflected to the outside of the house becomes significantly small. For this reason, it is possible to take light in the outside of a house into the house with high efficiency, bright illumination may be performed. Particularly, when the taper angle β is in the range of 72° to 83°, a proportion of light which is incident to the ceiling is more than a proportion of light which is incident to the floor, and thus much bright illumination may be performed.

FIG. 42 is a diagram illustrating a simulation result of transmitting light in the lighting film when the taper angle β of the protrusion portion is set to be 73° and 80°. The incident angle θin of light to the lighting film is set to be 60°.

When the taper angle β is set to be 80°, the light ("resin in") which has been incident to the light incidence end surface of the protrusion portion is totally reflected by the side surface of the protrusion portion, but the light ("air in") which has been incident between the protrusion portions is not totally reflected by the side surface of the protrusion portion. The light which has been incident between the protrusion portions is propagated in the lighting film by total reflection, and does not contribute illumination in a house. Thus, a proportion of light which is emitted toward the ceiling side or the inner part of a house is about 40%.

When the taper angle β is set to be 73°, both of the light ("resin in") which has been incident to the light incidence end surface of the protrusion portion and the light ("air in") which has been incident between the protrusion portions are totally reflected by the side surface of the protrusion portion. For this reason, it is possible to use the light which has been incident between the protrusion portions for illumination in a house, and bright illumination may be performed. In the example of FIG. 42, the proportion of light which is emitted toward the ceiling side or the inner part of a house is about 70%.

In this manner, if the taper angle β of the protrusion portion is set to be small, it is likely to reflect the light ("air in") which has been incident between the protrusion portions to the ceiling side, and bright illumination may be performed. However, since if the taper angle β is small, a gap (gap between the light emitting end surfaces) between the protrusion portions becomes small, the transparency of the lighting film is degraded. When a scene in the outside of a house is viewed through the lighting film, the gap between the protrusion portions is large, but refraction by the protrusion portion occurs small. Thus, distortion of the scene is reduced. Accordingly, it is preferable that the size of the taper angle β is appropriately designed in accordance with capacity (illumination capacity, transparency, or the like) required to the lighting film.

Lighting characteristics of the lighting film when the taper angle β of the protrusion portion is set to be 76° will be described below using FIGS. 43 to 45.

Figure 43:
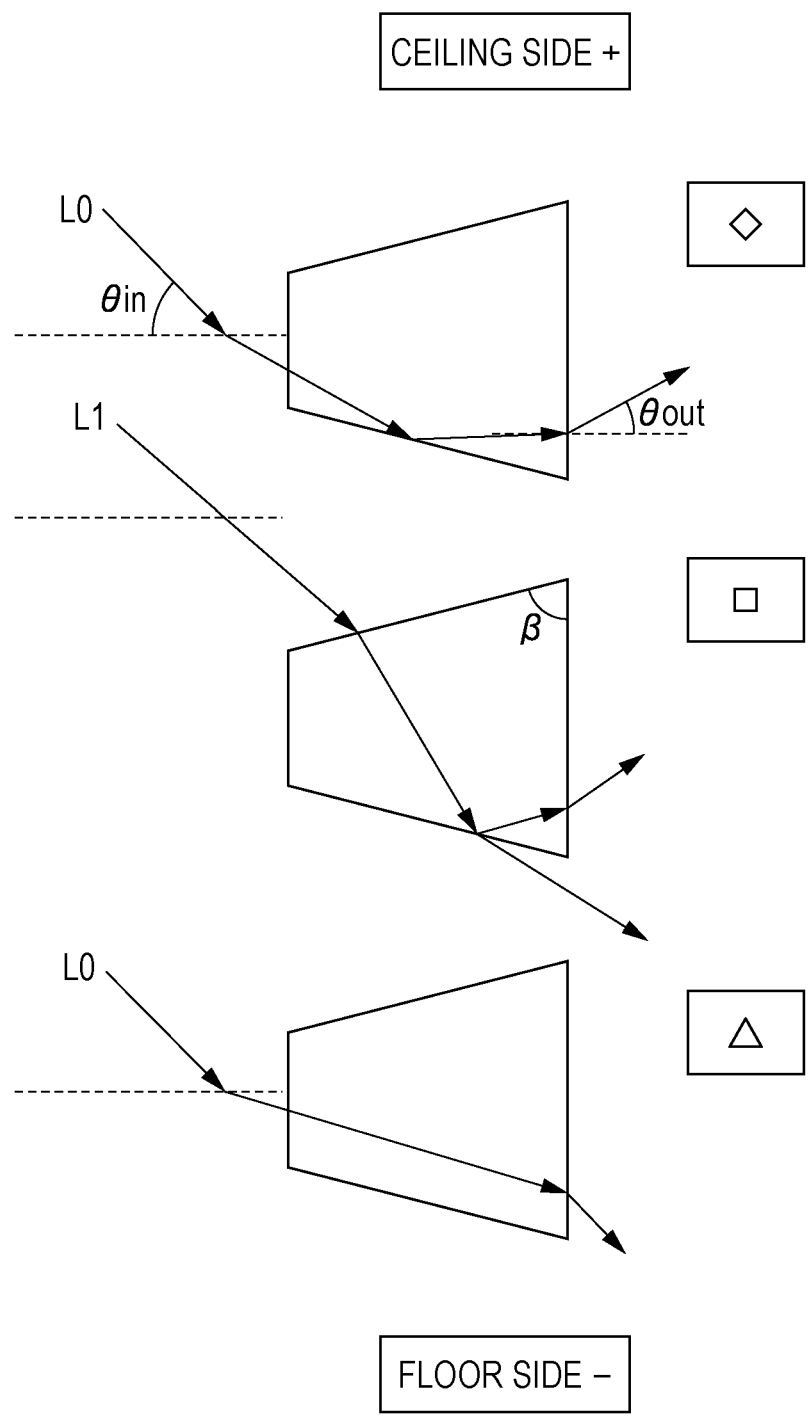
FIG. 43 is a diagram illustrating a light transmitting pattern when light transmits through the lighting film.

FIG. 43 is a diagram illustrating the light transmitting pattern when light transmits through the lighting film. The drawings on an upper side and a lower side of FIG. 43 correspond to drawings illustrating transmitting paths of the light ("resin in") L0 which has been incident to the light incidence end surface of the protrusion portion and the drawing on the middle of FIG. 43 corresponds to a drawing illustrating a transmitting path of the light ("air in") L1 which has been incident between the protrusion portions. In the drawing on the upper side of FIG. 43, the light beam L0 is totally reflected by the side surface of the protrusion portion. In the drawing on the lower side of FIG. 43, the light beam L0 is not incident to the side surface of the protrusion portion, but is emitted from the light emitting end surface of the protrusion portion to the floor side. Light which is incident to the light incidence end surface of the protrusion portion, and is emitted from the light emitting end surface of the protrusion portion without being totally reflected by the side surface of the protrusion portion (light tracing the transmitting path illustrated in the drawing on the lower side of FIG. 43) is referred to as "straightly passing" below.

In the drawing on the middle of FIG. 43, a traveling direction of the light beam L1 is divided into two directions from the side surface of the protrusion portion, but this means that there are a case where light is totally reflected by the side surface of the protrusion portion, and a case where the light is not totally reflected in accordance with the incident angle θin of the light beam L1.

Figure 44:
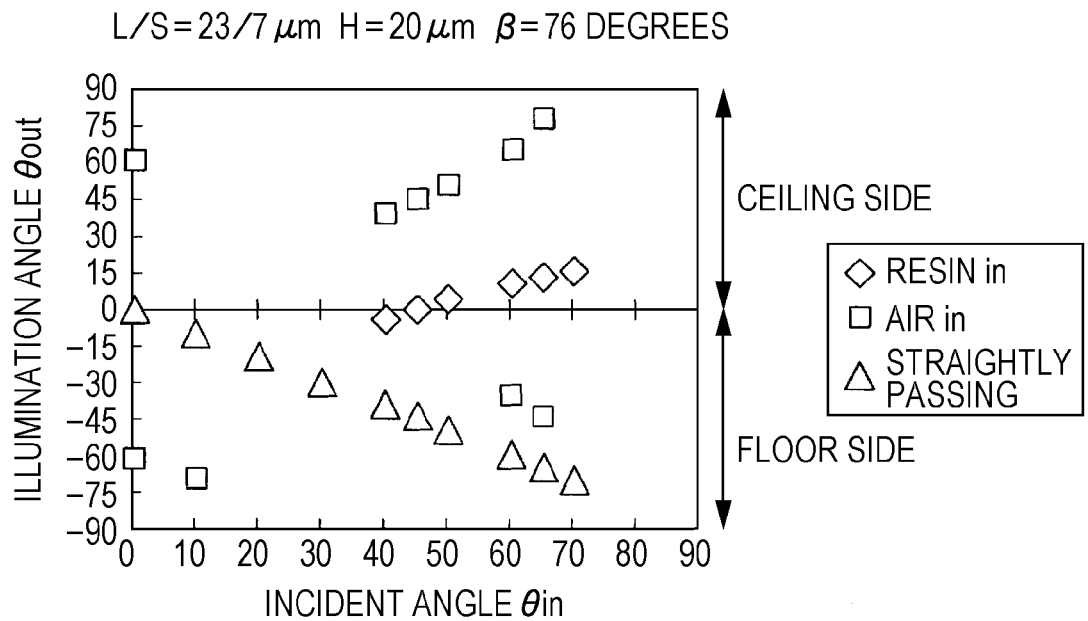
FIG. 44 is a diagram illustrating a relationship of an incident angle to the lighting film and the illumination angle of the lighting film.

FIG. 44 is a diagram illustrating a relationship of the incident angle θin to the lighting film and the illumination angle θout in the lighting film. The illumination angle θout is set to be positive when light is emitted to the ceiling side, and is set to be negative when light is emitted to the floor side. The width (length of the lower base) of the light emitting end surface in the protrusion portion is 23 µm, an interval (interval between the lower base) between the light emitting end surfaces of protrusion portions is 7 µm, and the height of the protrusion portion is 20 µm.

When the incident angle θin is in a range of 40° to 70°, three types of light, "air in", "straightly passing", and "resin in" illuminate each of the ceiling side, the floor side, and the inner part in a room. Accordingly, it is possible to illuminate the entire inside of a house brightly by taking in light in a day when the elevation angle of the sun is high, with high efficiency.

Figure 45:
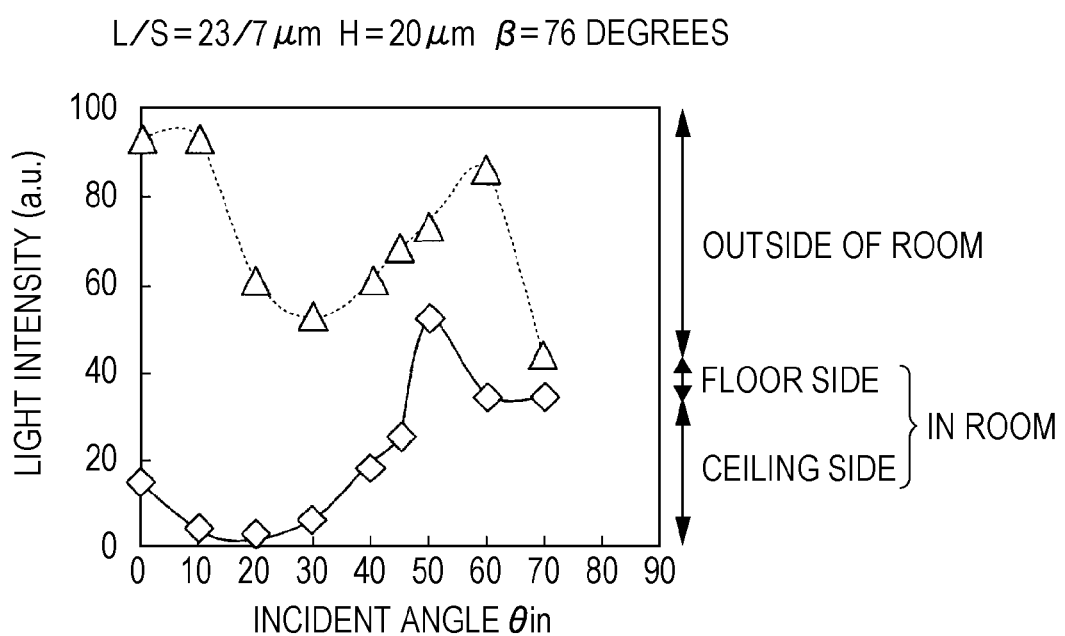
FIG. 45 is a diagram illustrating a relationship of proportions of light intensity of light which is directed to the ceiling side, the floor side, and the outside of a room, and the incident angle to the lighting film.

FIG. 45 is a diagram illustrating a relationship of proportions of light toward the ceiling side, the floor side, and the outside of a room, and the incident angle θin to the lighting film. Light intensity of light which is directed to the ceiling side, the floor side, and outside of the room is standardized by using light intensity of light which is incident to the lighting film as 100. The width of the light emitting end surface in the protrusion portion, the interval between the light emitting end surfaces of protrusion portions, the height of the protrusion portion, and the incident angle θin to the lighting film are the same as those used in FIG. 44.

The proportions of light which is directed to the ceiling side and the floor side become large when the taper angle β is in the range of 50° to 65°. When the incident angle θin is in the vicinity of 50°, the proportion of the light which is incident to the ceiling side becomes the most. Thus, if this lighting film is used at a district at which duration of sunshine is long when the elevation angle of the sun is 50° (for example, the district having the latitude of 5° illustrated in FIG. 30A), it is possible to show high illumination capacity.

18th Embodiment

Figure 46:
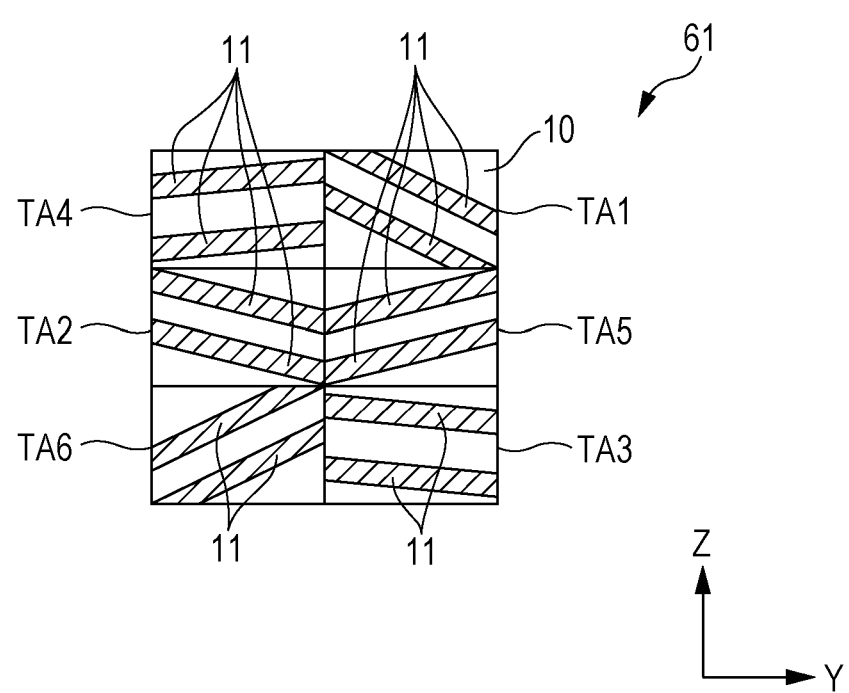
FIG. 46 is a partial plan view of a lighting film according to an 18th embodiment.

FIG. 46 is a partial plan view of a lighting film 61 according to an 18th embodiment.

The lighting film 61 may be applied to the window panes, the roll screens, the lighting louvers, and the like according to the seventh to 16th embodiments. The lighting film 61 may be provided as the web roll as illustrated in FIG. 3.

In this embodiment, the same components as those in the 17th embodiment are denoted by the same reference signs and detailed descriptions thereof will be omitted.

In the lighting film according to the first embodiment, the plurality of strip protrusion portions which have extension directions equal to each other are formed on the one surface of the base member. On the contrary, in the lighting film 61 according to this embodiment, the plurality of strip protrusion portions 11 which have different extension directions from each other are formed on the one surface of the base member 10.

A plurality of tiling areas (six tiling areas TA1 to TA6 in a case of this embodiment) are provided on one surface of the base member 10. The plurality of strip protrusion portions 11 which are disposed to be parallel with each other are formed in each of the plurality of tiling areas. The extension directions of the protrusion portions 11 in the two tiling areas which are adjacent to each other are different from each other.

In the case of this embodiment, six types of tiling areas (first tiling area TA1, second tiling area TA2, third tiling area TA3, fourth tiling area TA4, fifth tiling area TA5, and sixth tiling area TA6) are provided in the lighting film 61.

The six types of tiling areas form one unit area by arranging the tiling areas in a matrix of 3×2 in the Y direction and the Z direction. Such unit areas are arranged on the one surface of the base member 10 without a gap in the Y direction and the Z direction.

The extension direction of the plurality of protrusion portions 11 which are disposed in the first tiling area TA1 is a direction which is inclined to the Y direction by 25° clockwise. The extension direction of the plurality of protrusion portions 11 which are disposed in the second tiling area TA2 is a direction which is inclined to the Y direction by 15° clockwise. The extension direction of the plurality of protrusion portions 11 which are disposed in the third tiling area TA3 is a direction which is inclined to the Y direction by 5° clockwise. The extension direction of the plurality of protrusion portions 11 which are disposed in the fourth tiling area TA4 is a direction which is inclined to the Y direction by 5° counterclockwise. The extension direction of the plurality of protrusion portions 11 which are disposed in the fifth tiling area TA5 is a direction which is inclined to the Y direction by 15° counterclockwise. The extension direction of the plurality of protrusion portions 11 which are disposed in the sixth tiling area TA6 is a direction which is inclined to the Y direction by 25° counterclockwise.

Figure 47A:
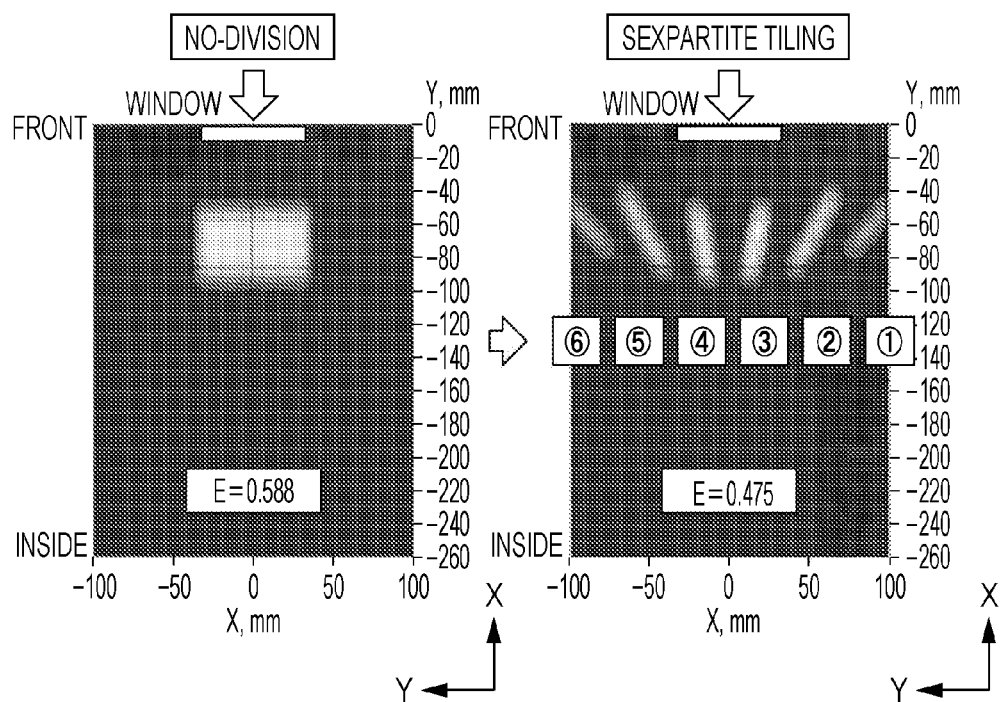
FIG. 47A is diagrams illustrating lighting characteristics of the lighting film when the lighting film is divided into a plurality of tiling areas and when the lighting film is not divided into the plurality of tiling areas.
Figure 47B:
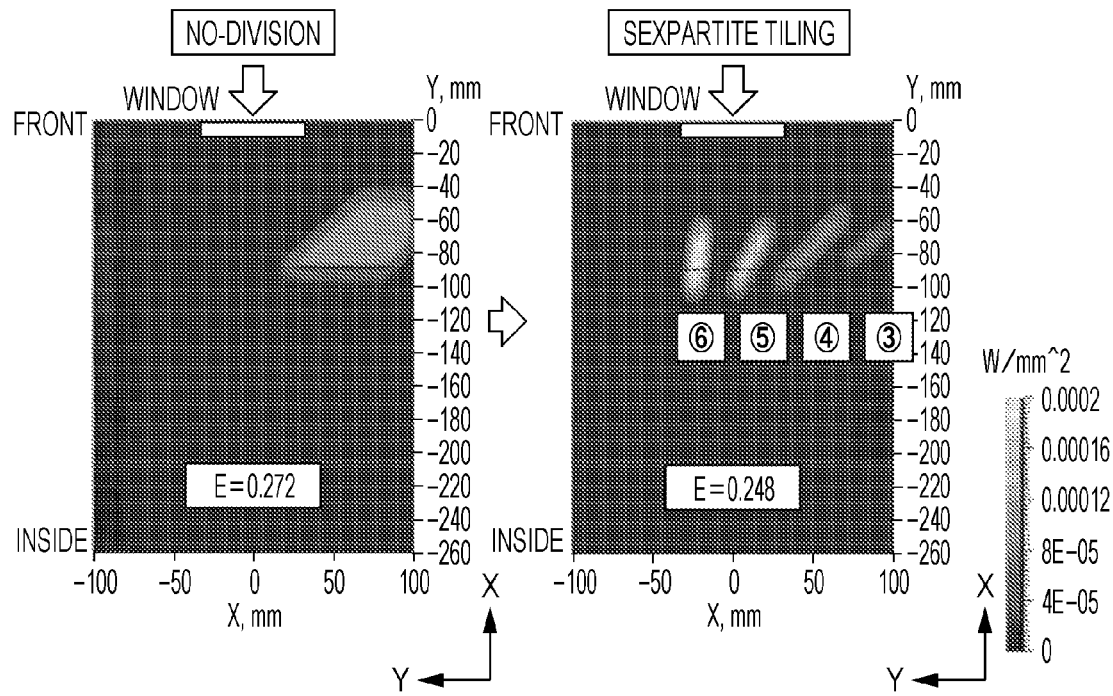
FIG. 47B is diagrams illustrating the lighting characteristics of the lighting film when the lighting film is divided into the plurality of tiling areas and when the lighting film is not divided into the plurality of tiling areas.

FIGS. 47A and 47B are diagrams illustrating the illuminance distributions in the ceiling when the lighting film is divided into the plurality of tiling areas, and when the lighting film is not divided. FIG. 47A illustrates simulation results when light is incident from a front direction of a window at the incident angle of 50°. FIG. 47B illustrates simulation results when light is incident from a direction of being inclined to the left by 45°, at the incident angle of 50°. In FIGS. 47A and 47B, the drawings on the left side illustrate simulation results when the lighting film is not divided into the plurality of tiling areas, and the drawings on the right side illustrate simulation results when the lighting film is divided into six tiling areas as in FIG. 46.

The cross-sectional shape of the protrusion portion is trapezoid in which an area of the light emitting end surface is larger than an area of the light incidence end surface, similarly to that illustrated in FIG. 27. The parameters of the protrusion portion are followings.

β1=β2=75°
S/L=100 μm/300 μm=0.33
H/L=350 μm/300 μm=1.17
n=1.49

In FIGS. 47A and 47B, numeric numbers of 1, 2, 3, 4, 5, and 6 in a circle represent the respective areas illuminated by the first tiling area TA1, the second tiling area TA2, the third tiling area TA3, the fourth tiling area TA4, the fifth tiling area TA5, and the sixth tiling area TA6. E represents a proportion (efficiency) of light which is incident to the ceiling.

When the lighting film is not divided into the plurality of tiling areas, an area in which light is incident to the ceiling is limited to a relatively narrow area of the ceiling. Since the extension direction of the protrusion portion is disposed in parallel with one side of the window, a traveling direction of light which is incident to the lighting film and a traveling direction of light which is emitted from the lighting film are the same directions when viewed from the ceiling side. For this reason, the area in which light is incident to the ceiling becomes an area having a narrow width of the same extent as the window, and a position at which the light is incident to the ceiling also varies largely in accordance with a bearing in which light is incident to the window.

When the lighting film is divided into the plurality of tiling areas, since a reflection direction of the protrusion portion is different for each tiling area, a traveling direction of light which is emitted from the lighting film is dispersed in a right and left direction. For this reason, the area in which the light is incident to the ceiling becomes an area having a larger width than that of the window, and a position at which the light is incident to the ceiling is unlikely to vary in accordance with a bearing in which light is incident to the window. The efficiency E of the lighting film is slightly reduced, but large degradation as much as being reduced does not occur. Thus, when such a lighting film is used, it is possible to illuminate a wide range in a room brightly, and even though the azimuth of the sun varies in accordance with a time zone, it can be unlikely to have an influence.

Figure 48:
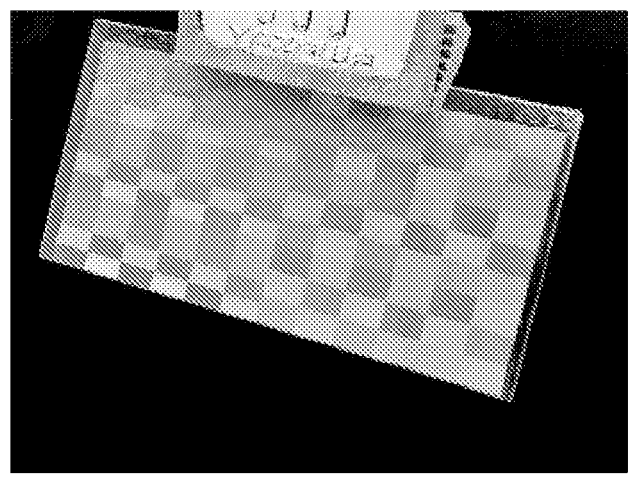
FIG. 48 is a view illustrating an appearance of the lighting film when the lighting film is divided into the plurality of tiling areas.

When the lighting film is divided into the plurality of tiling areas, it is possible to apply designability as in FIG. 48 to the lighting film by causing the size of each of tiling areas to be to an extent of enabling visibility. FIG. 48 illustrates an example in which the length of one side of the tiling area is set to be 10 mm. Since the reflection direction of the protrusion portion is different for each tiling area, a shade of a color in the tiling area is generated by a viewing angle. For this reason, it is viewed as if a plaid pattern is applied to the lighting film.

19th Embodiment

Figure 49A:
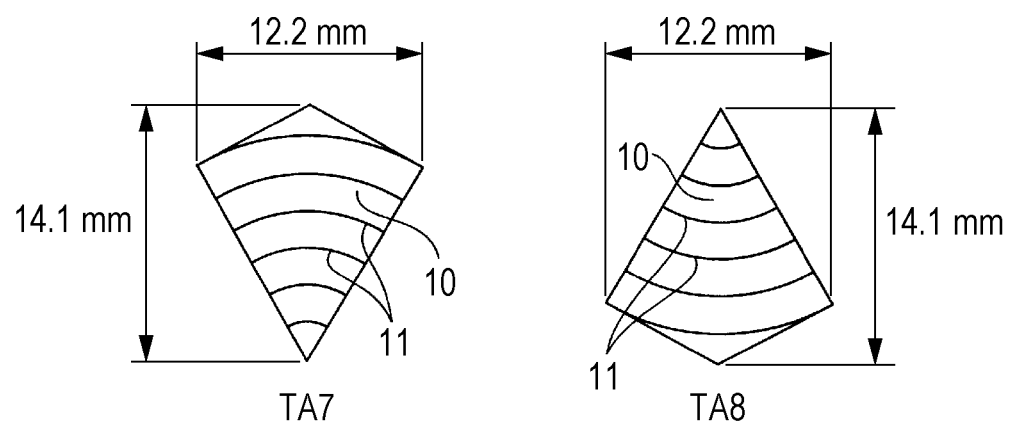
FIG. 49A is a partial plan view of a lighting film according to a 19th embodiment.
Figure 49B:
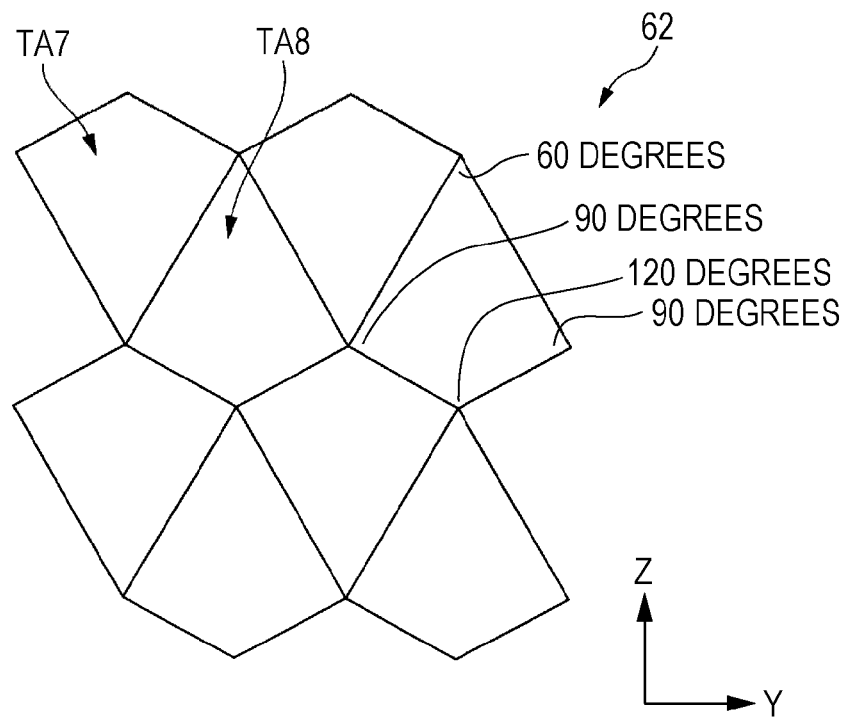
FIG. 49B is a partial plan view of the lighting film according to the 19th embodiment.

FIGS. 49A and 49B are partial plan views of a lighting film 62 according to a 19th embodiment. FIG. 49A is a plan view illustrating a plurality of tiling areas provided in the lighting film 62. FIG. 49B is a plan view illustrating a disposition of the plurality of tiling areas.

The lighting film 62 may be applied to the window panes, the roll screens, the lighting louvers, and the like according to the seventh to 16th embodiments. The lighting film 62 may be provided as the web roll as illustrated in FIG. 3.

In this embodiment, the same components as those in the 18th embodiment are denoted by the same reference signs and detailed descriptions thereof will be omitted.

In the lighting film according to the 18th embodiment, strip protrusion portions which are extended linearly when viewed from the normal direction of the base member are formed on one surface of the base member. The extension direction of the protrusion portion is not changed on the way, but is directed to the same direction constantly. On the contrary, in the lighting film 62 according to this embodiment, protrusion portions 11 which have changed extension directions when viewed from the normal direction of the base member 10 are formed on the one surface of the base member 10.

The plurality of tiling areas (two tiling areas TA7 and TA8 in a case of this embodiment) are provided on the one surface of the base member 10. A plurality of protrusion portions 11 which have an arc shape and are disposed concentrically when viewed from the normal direction of the base member 10 are formed in each of the plurality of tiling areas. Directions of a convex portion of the arc in two tiling areas which are adjacent to each other may be different from each other.

In the case of this embodiment, two types of tiling areas (seventh tiling area TA7 and eighth tiling area TA8) are provided in the lighting film 62. Each of the seventh tiling area TA7 and the eighth tiling area TA8 is kite-like. A kite-like shape is referred to a figure which is one type of square and has two sets, each set in which lengths of two sides which are adjacent to each other are equal to each other. In the case of this embodiment, as the kite-like shape, a shape in which four interior angles are 120°, 90°, 60°, and 90° is employed.

The plurality of concentric protrusion portions 11 (six in this embodiment) which have a vertex having an interior angle of 60° as a center are formed in the seventh tiling area TA7 and the eighth tiling area TA8. A cross-sectional shape of the protrusion portion 11 is trapezoid in which an area of the light emitting end surface is larger than an area of the light incidence end surface, similarly to that illustrated in FIG. 27. The plurality of protrusion portions 11 in which cross-sectional shapes are equal to each other are disposed concentrically at a constant interval in the base member 10.

The seventh tiling area TA7 and the eighth tiling area TA8 have the same shape except that the shapes are flipped upside down such that the directions of the convex portion of the arc are reverse to each other. The seventh tiling area TA7 and the eighth tiling area TA8 are arranged on the one surface of the base member 10 without a gap in the Y direction and the Z direction.

In the lighting film 62 according to this embodiment, since the extension direction of the protrusion portion 11 is changed in one protrusion portion, it is possible to disperse the traveling direction of light which is emitted from the lighting film 62 into multi-directions. For this reason, it is possible to illuminate a wide range in a room brightly, and even though the azimuth of the sun varies in accordance with a time zone, it can be unlikely to have an influence.

Figure 50:
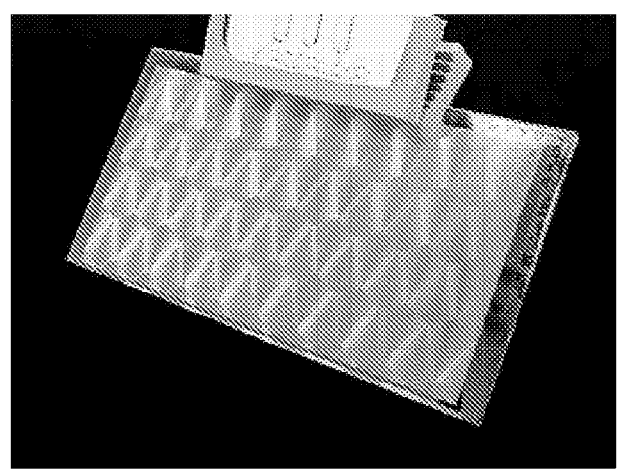
FIG. 50 is a view illustrating an appearance of the lighting film when the lighting film is divided into a plurality of tiling areas.

It is possible to apply designability as in FIG. 50 to the lighting film by causing the size of each of the tiling areas TA7 and TA8 to be to an extent of enabling visibility. FIG. 50 illustrates an example in which the size of the tiling area is set to be 12.2 mm×14.1 mm. Since the reflection direction of the protrusion portion is different for each tiling area, a shade of a color in the tiling area is generated by a viewing angle. For this reason, it is viewed as if a saw blade-like form is applied to the lighting film.

Figure 51:
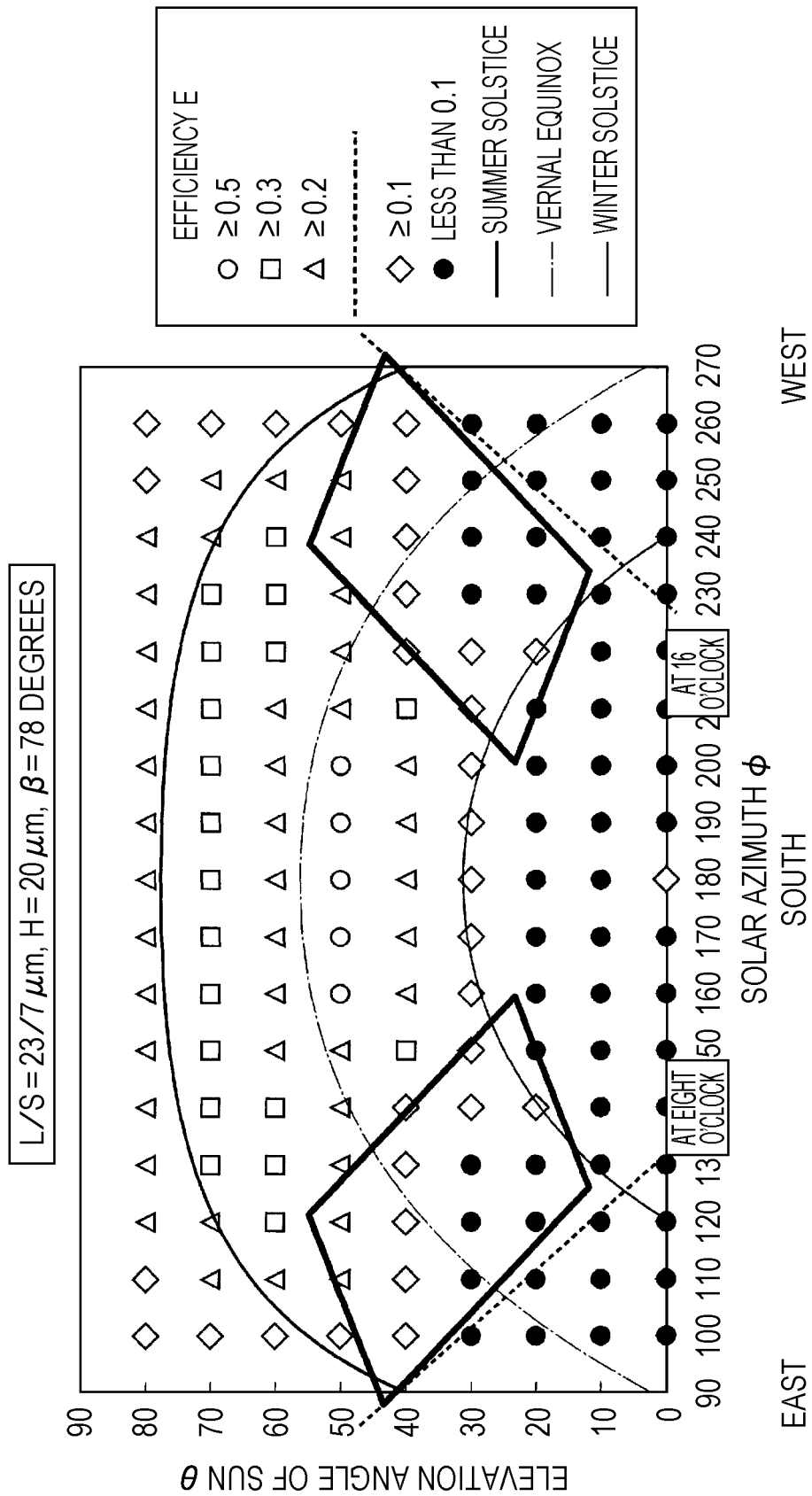
FIG. 51 is a diagram illustrating an efficiency of the lighting film when a solar azimuth and the elevation angle of the sun are changed.

FIGS. 51 and 52 are diagrams illustrating efficiency E of the lighting film when the solar azimuth and the elevation angle of the sun are changed. FIG. 51 illustrates a simulation result when the low aspect sample is used. FIG. 52 illustrates a simulation result when the high aspect sample is used.

The parameters of the protrusion portion in the low aspect sample and the high aspect sample are the followings.

<Low Aspect Sample>
$\beta 1 = \beta 2 = 78°$
S/L=7 μm/23 μm=0.30
H/L=20 μm/23 μm=0.87
n=1.56
<High Aspect Sample>
$\beta 1 = \beta 2 = 78°$
S/L=10 μm/30 μm=0.33
H/L=35 μm/30 μm=1.17
n=1.56

As illustrated in FIGS. 51 and 52, it is possible to illuminate the vicinity of the center portion in a room with high efficiency by using the arc protrusion portion even though light is incident from a slope (azimuth of southwest or southeast) inclined to a window. A proportion (efficiency E) of light which is reflected in a ceiling direction is preferably equal to or more than 0.2, but, in FIG. 51, the efficiency E at a portion illustrated with a square frame is less than 0.2. However, the efficiency E of such a portion may be improved by changing a shape of the protrusion portion. For example, as illustrated in FIG. 52, in the lighting film using the high aspect sample, the efficiency E of the portion illustrated with a square frame is improved, and high efficiency in a wide angle range is obtained.

In this embodiment, an arc protrusion portion having a central angle of 60° is used as the protrusion portion 11, but the shape of the protrusion portion 11 is not limited thereto. The central angle of the protrusion portion 11 may be less than 180° in order to reflect light which is incident from an upper part, upwardly. The central angle is less than 90°, more preferably. As a shape of the protrusion portion 11, a curved shape such as a sinusoidal waveform, other than an arc may be used. The shape of the protrusion portion 11 may be a shape in which the extension direction of the protrusion portion is changed stepwise in one protrusion portion, such as a shape obtained by combining a plurality of straight portions, and a shape obtained by combining a straight portion and a curved portion as long as the shape of the protrusion portion 11 is a curved shape in which the extension direction of the protrusion portion 11 is continuously changed in one protrusion portion.

Hitherto, preferred embodiments relating to the present invention are described with reference to the accompanying drawings, but the present invention is not limited to the relating example. Various shapes, combinations, and the like of components described in the above-described examples corresponds to only an example, various modifications may be applied based on design requirements and the like in a range without departing from a gist of the present invention.

EXAMPLES

Figure 53A:
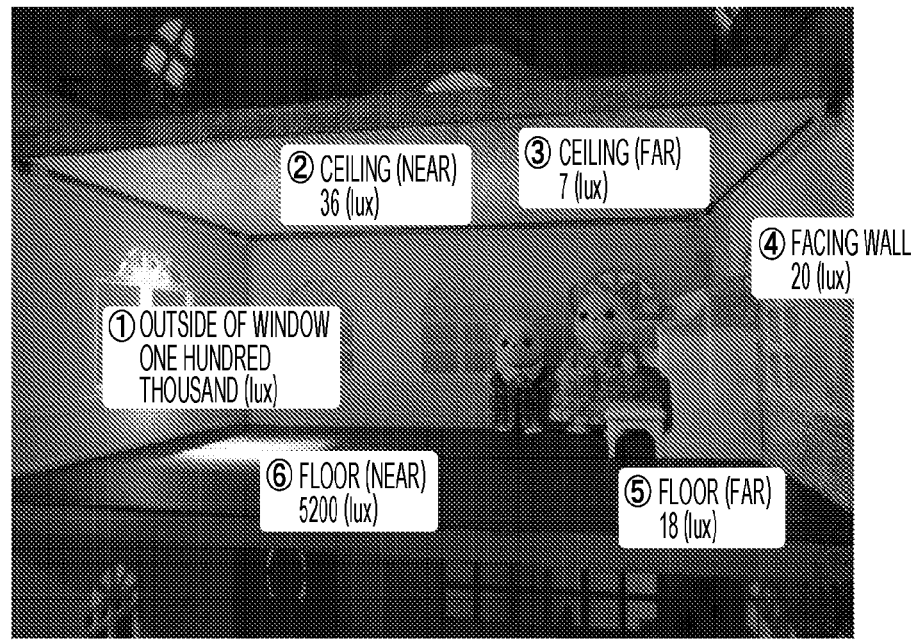
FIG. 53A is an explanation of Example.
Figure 53B:
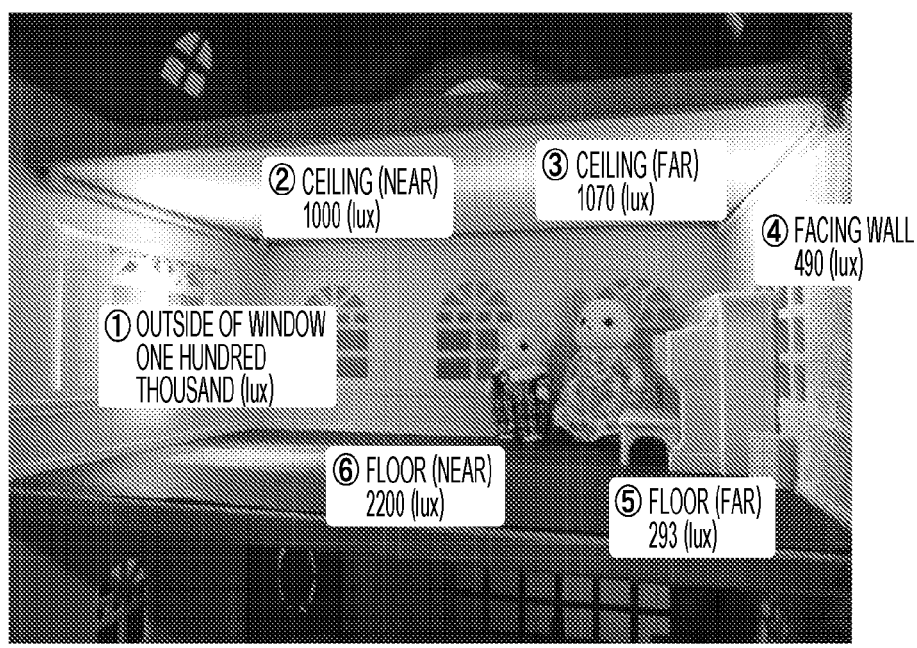
FIG. 53B is an explanation of Example.

FIGS. 53A and 53B are diagrams illustrating results obtained by measuring illuminance using a model house. FIG. 53A is a picture illustrating an illumination state in a model room when the lighting film is not installed on the window pane (comparative example). FIG. 53B is a picture illustrating an illumination state in a model room when the lighting film is installed on the window pane (example).

Illumination in the outside of the house is 100,000 lux. Light in the outside of the house is incident to the window pane at the incident angle of 60 degrees. Brightness of the inside in a model room of the comparative example and in a model room of the example are described as follows.

Comparative Example

Brightness of the ceiling at a portion near to a window: 36 (lux), brightness of the floor at a portion near to the window: 5200 (lux), brightness of the ceiling at a portion far from the window: 7 (lux), brightness of the floor at a portion far from the window: 18 (lux), and brightness of the floor at a portion farthest from the window: 20 (lux)

Example

Brightness of the ceiling at a portion near to a window: 1000 (lux), brightness of the floor at a portion near to the window: 1070 (lux), brightness of the ceiling at a portion far from the window: 2200 (lux), brightness of the floor at a portion far from the window: 293 (lux), and brightness of the floor at a portion farthest from the window: 490 (lux)

As described above, in the comparative example, even though the outside of the house is bright, only the floor in the vicinity of the window is bright. However, in the example, the light in the outside of the house is dispersed to the entirety of a room, and thus it is possible to cause the entirety of a room to be bright.

INDUSTRIAL APPLICABILITY

The present invention may be used in a lighting film, a web roll for the lighting film, a window pane, a roll screen, and a lighting louver.

REFERENCE SIGNS LIST

1 to 8 LIGHTING FILM
1*a* LONG LIGHTING FILM
10 BASE MEMBER
11 PROTRUSION PORTION

11a FIRST END SURFACE
11b SECOND END SURFACE
11c SIDE SURFACE
12 GAP PORTION
13 WEB ROLL
16 GLASS SUBSTRATE
17 ULTRAVIOLET LIGHT BLOCKING LAYER
18 PROTRUSION PORTION
19 GAP PORTION
25 PROTECTIVE SUBSTRATE (PROTECTIVE MEMBER)
26 PROTECTIVE FILM (PROTECTIVE MEMBER)
27 WINDING MECHANISM
27a SHAFT CENTER
31 PROTECTIVE FILM (PROTECTIVE MEMBER)
39 BASE MEMBER
40 to 43 LIGHTING FILM
44 LIGHT SCATTERING FILM
47 LIGHTING FILM
48 HEAT-INSULATING FILM
60 to 62 LIGHTING FILM
100 to 111 WINDOW PANE
200 ROLL SCREEN
300 LIGHTING LOUVER

The invention claimed is:

1. A lighting film comprising:
a base member which has light-transmitting properties;
a plurality of protrusion portions which have light-transmitting properties and are formed on one surface of the base member so as to be adjacent to each other; and
a gap portion which is formed between the plurality of protrusion portions,
wherein, in a protrusion portion of the plurality of protrusion portions, a first end surface on the base member side or a second end surface on an opposite side to the base member is configured as a light incidence end surface, and a side surface which comes into contact with the gap portion is configured as a reflective surface for totally reflecting light which is incident from the light incidence end surface,
the base member or a member that is formed on one surface of the base member and has light-transmitting properties is exposed in the gap portion, and
the plurality of protrusion portions are formed in each of a plurality of tiling areas, the plurality of tiling areas being adjacent to each other.

2. The lighting film according to claim 1, wherein
a light emitting end surface has an area larger than an area of the light incidence end surface.

3. The lighting film according to claim 2, wherein
light which is incident toward the gap portion between the plurality of protrusion portions is incident into the protrusion portion from one side surface of the protrusion portion, travels in the protrusion portion, and is incident to another side surface of the protrusion portion.

4. The lighting film according to claim 3, wherein
a half or more of light which is incident toward the gap portion at an incident angle of 30° is incident into the plurality of protrusion portions through the gap portion, and is totally reflected by side surfaces of the plurality of protrusion portions.

5. The lighting film according to claim 3, wherein
the light which is incident to another side surface of the protrusion portion is totally reflected by another side surface of the protrusion portion.

6. The lighting film according to claim 2, wherein
a half or more of light which is incident toward the light incidence end surface of the protrusion portion at an incident angle of 30° or 45° is incident into the protrusion portion from the light incidence end surface of the protrusion portion, travels in the protrusion portion, and is incident to the side surface of the protrusion portion.

7. The lighting film according to claim 1, wherein
the plurality of protrusion portions which have a strip shape and have different extension directions from each other are formed on the one surface of the base member.

8. The lighting film according to claim 1, wherein
the protrusion portion which continuously changes an extension direction when viewed from a normal direction of the base member is formed on the one surface of the base member.

9. The lighting film according to claim 8, wherein
the protrusion portion is an arc protrusion portion which has a central angle of less than 90°.

10. A web roll for a lighting film which is obtained by winding a long lighting film, the lighting film comprising:
a base member which has light-transmitting properties;
a plurality of protrusion portions which have light-transmitting properties and are formed on one surface of the base member so as to be adjacent to each other; and
a gap portion which is formed between the plurality of protrusion portions,
wherein in a protrusion portion of the plurality of protrusion portions, a first end surface on the base member side or a second end surface on an opposite side to the base member is configured as a light incidence end surface, and a side surface which comes into contact with the gap portion is configured as a reflective surface for totally reflecting light which is incident from the light incidence end surface,
the base member or a member that is formed on one surface of the base member and has light-transmitting properties is exposed in the gap portion, and
the plurality of protrusion portions are formed in each of a plurality of tiling areas, the plurality of tiling areas being adjacent to each other.

11. A window pane comprising:
a glass substrate;
a plurality of protrusion portions which have light-transmitting properties and are formed on one surface of the glass substrate so as to be adjacent to each other; and
a gap portion which is formed between the plurality of protrusion portions,
wherein, in a protrusion portion of the plurality of protrusion portions, a first end surface on the glass substrate side or a second end surface on an opposite side to the glass substrate is configured as a light incidence end surface, and a side surface which comes into contact with the gap portion is configured as a reflective surface for totally reflecting light which is incident from the light incidence end surface,
the glass substrate or a member that is formed on one surface of the glass substrate and has light-transmitting properties is exposed in the gap portion, and
the plurality of protrusion portions are formed in each of a plurality of tiling areas, the plurality of tiling areas being adjacent to each other.

* * * * *